United States Patent
Nomura et al.

(10) Patent No.: US 6,809,884 B2
(45) Date of Patent: Oct. 26, 2004

(54) ZOOM LENS BARREL ASSEMBLY

(75) Inventors: Hiroshi Nomura, Saitama (JP);
Takamitsu Sasaki, Saitama (JP);
Kazunori Ishizuka, Kanagawa (JP);
Maiko Takashima, Tokyo (JP)

(73) Assignee: PENTAX Corporation, Tokyo (JP)

( * ) Notice: Subject to any disclaimer, the term of this patent is extended or adjusted under 35 U.S.C. 154(b) by 148 days.

(21) Appl. No.: 10/101,618

(22) Filed: Mar. 21, 2002

(65) Prior Publication Data
US 2002/0135897 A1 Sep. 26, 2002

(30) Foreign Application Priority Data
Mar. 22, 2001 (JP) .................................... 2001-082094

(51) Int. Cl.⁷ ......................... G02B 15/14; G02B 7/02; G03B 17/00
(52) U.S. Cl. .................. 359/699; 359/694; 359/696; 359/701; 359/704; 359/826; 396/72; 396/74; 396/79; 396/85; 396/87; 396/542
(58) Field of Search ................. 359/699, 694, 359/696, 698, 700, 701, 704, 819, 82.3, 826; 396/72, 74, 79, 85, 87, 83, 236, 456, 542

(56) References Cited

U.S. PATENT DOCUMENTS

| 4,227,792 A | 10/1980 | Rentschler .................. 396/460 |
| 4,390,262 A | 6/1983 | Hirohata et al. |
| 4,416,527 A | 11/1983 | Okura |
| 4,426,145 A | 1/1984 | Hashimoto .................. 396/132 |
| 4,484,800 A | 11/1984 | Tamura |
| 4,576,446 A | 3/1986 | Kamata |
| 4,595,081 A | 6/1986 | Parsons |
| 4,662,241 A | 5/1987 | Edwards |
| 4,834,514 A | 5/1989 | Atsuta et al. |
| 4,839,680 A | 6/1989 | Amada et al. .............. 396/451 |
| 4,922,274 A | 5/1990 | Yamamoto et al. ......... 396/508 |
| 4,971,427 A | 11/1990 | Takamura et al. |
| 4,993,815 A | 2/1991 | Yamazaki et al. |
| 5,037,187 A | 8/1991 | Oda et al. |
| 5,126,883 A | 6/1992 | Sato et al. |
| 5,164,757 A | 11/1992 | Nomura ....................... 396/80 |
| 5,166,829 A | 11/1992 | Iizuka |
| 5,177,638 A | 1/1993 | Emura et al. |
| 5,196,963 A | 3/1993 | Sato et al. |
| 5,231,449 A | 7/1993 | Nomura ....................... 396/542 |
| 5,241,422 A | 8/1993 | Shimada et al. |
| 5,262,898 A | 11/1993 | Nomura ....................... 359/700 |
| 5,268,794 A | 12/1993 | Chan |
| 5,270,868 A | 12/1993 | Nomura ....................... 359/700 |
| 5,301,066 A | 4/1994 | Higuchi et al. |
| 5,373,397 A | * 12/1994 | Satoh et al. ................ 359/699 |

(List continued on next page.)

FOREIGN PATENT DOCUMENTS

JP 4-340907 11/1992

OTHER PUBLICATIONS

English Language Abstract of JP 4–340907.

Primary Examiner—Loha Ben
(74) Attorney, Agent, or Firm—Greenblum & Bernstein, P.L.C.

(57) ABSTRACT

A zoom lens barrel assembly includes a first lens group including first and second sub-lens groups; a second lens group; a sub-lens group switching mechanism for moving the first or second sub-lens group away from the other in a short focal length photographing range, and toward the other in a long focal length photographing range; and a zoom cam mechanism having front and rear lens group cam grooves. The rear lens group cam groove includes first and second portions corresponding to the short and long focal length photographing ranges, respectively, the first and the second portions connected to each other via a discontinuous portion. The front lens group cam groove includes a non-linear portion which corresponds to the short focal length photographing range and provides a non-linear path, and a linear portion which corresponds to the long focal length photographing range and provides a linear path.

9 Claims, 38 Drawing Sheets

U.S. PATENT DOCUMENTS

| | | | |
|---|---|---|---|
| 5,461,443 A | 10/1995 | Nakayama et al. | |
| 5,488,513 A | 1/1996 | Tanaka | 359/699 |
| 5,559,571 A | 9/1996 | Miyamoto et al. | |
| 5,589,987 A * | 12/1996 | Tanaka | 359/701 |
| 5,646,790 A | 7/1997 | Kohmoto et al. | 359/823 |
| 5,699,200 A * | 12/1997 | Uno et al. | 359/700 |
| 5,701,208 A | 12/1997 | Sato et al. | |
| 5,708,533 A | 1/1998 | Hamasaki | 359/700 |
| 5,739,962 A | 4/1998 | Asakura et al. | |
| 5,771,409 A * | 6/1998 | Nishimura | 396/72 |
| 5,774,266 A | 6/1998 | Otani et al. | |
| 5,774,748 A | 6/1998 | Ito et al. | 396/80 |
| 5,793,537 A | 8/1998 | Nomura et al. | 359/700 |
| 5,812,889 A | 9/1998 | Nomura et al. | |
| 5,842,057 A | 11/1998 | Nomura et al. | 396/87 |
| 5,861,998 A * | 1/1999 | Nishimura | 359/694 |
| 5,870,232 A | 2/1999 | Tsuji et al. | |
| 5,892,998 A | 4/1999 | Kodaira et al. | 396/448 |
| 5,933,285 A | 8/1999 | Sato et al. | |
| 5,991,097 A | 11/1999 | Nomura et al. | 359/700 |
| 6,055,116 A | 4/2000 | Nomura et al. | 359/822 |
| 6,069,745 A | 5/2000 | Fujii et al. | |
| 6,089,760 A | 7/2000 | Terada | 396/463 |
| 6,115,189 A | 9/2000 | Nomura et al. | 359/694 |
| 6,118,666 A | 9/2000 | Aoki et al. | |
| 6,125,237 A | 9/2000 | Park | 396/79 |
| 6,160,670 A | 12/2000 | Nakayama et al. | |
| 6,176,627 B1 | 1/2001 | Suh | 396/451 |
| 6,195,211 B1 | 2/2001 | Iwasaki | |
| 6,369,955 B1 | 4/2002 | Enomoto et al. | |
| 6,369,956 B1 | 4/2002 | Nomura et al. | 359/700 |
| 6,369,962 B1 | 4/2002 | Nomura et al. | 359/822 |
| 6,392,828 B1 | 5/2002 | Nomura et al. | 359/827 |
| 6,424,469 B2 | 7/2002 | Hirai | |
| 6,424,807 B2 * | 7/2002 | Nomura et al. | 396/72 |
| 6,429,979 B2 | 8/2002 | Enomoto et al. | |
| 6,437,922 B2 | 8/2002 | Enomoto et al. | |
| 6,437,924 B1 | 8/2002 | Azegami | |
| 6,456,442 B1 | 9/2002 | Enomoto | |
| 6,456,445 B2 * | 9/2002 | Nomura et al. | 359/699 |
| 6,469,840 B2 | 10/2002 | Nomura et al. | |
| 6,469,841 B2 * | 10/2002 | Nomura et al. | 359/699 |
| 6,493,511 B2 | 12/2002 | Sato | |
| 6,512,638 B2 | 1/2003 | Sato et al. | |
| 6,516,148 B1 * | 2/2003 | Kim et al. | 396/72 |
| 6,522,478 B2 | 2/2003 | Nomura et al. | |
| 6,522,481 B2 * | 2/2003 | Nomura et al. | 359/699 |
| 6,522,482 B2 | 2/2003 | Nomura et al. | |
| 2002/0012178 A1 | 1/2002 | Noguchi | |
| 2002/0036836 A1 | 3/2002 | Hagimori | |

* cited by examiner

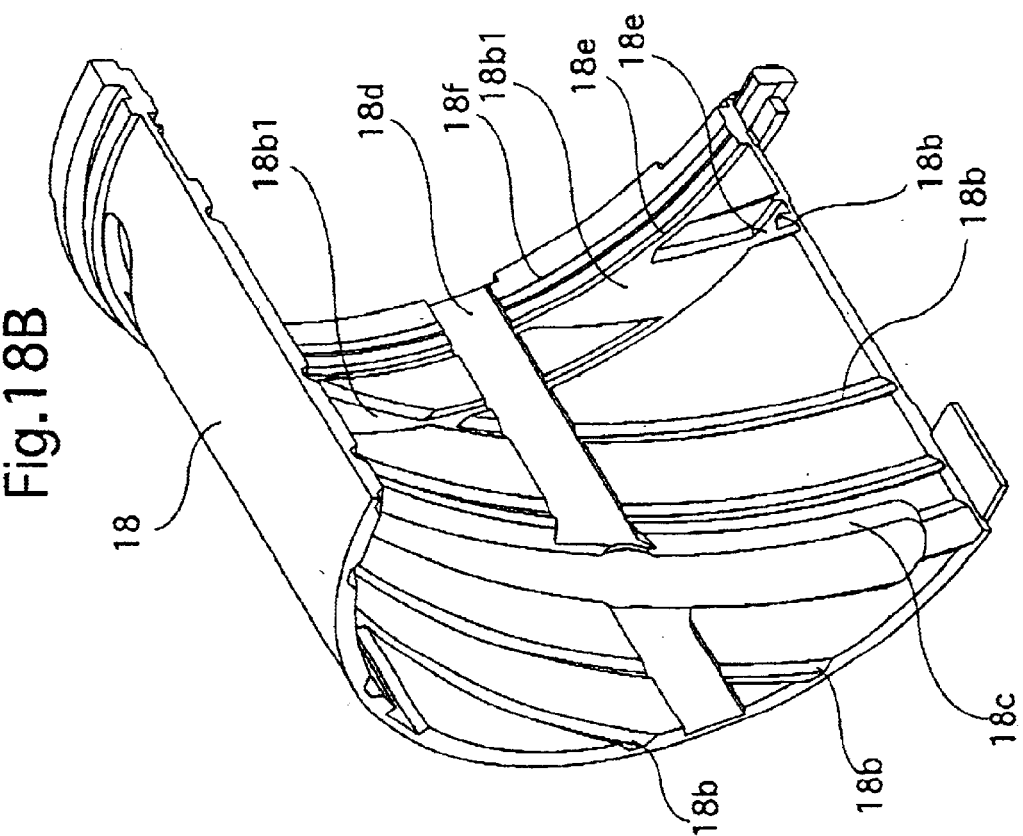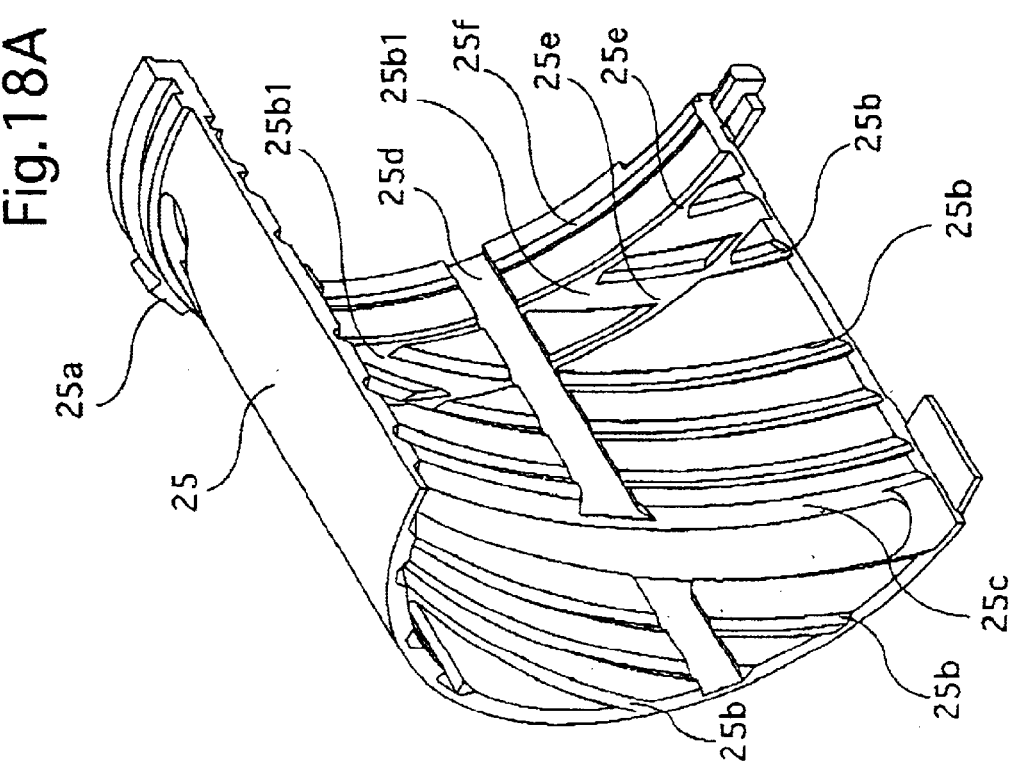

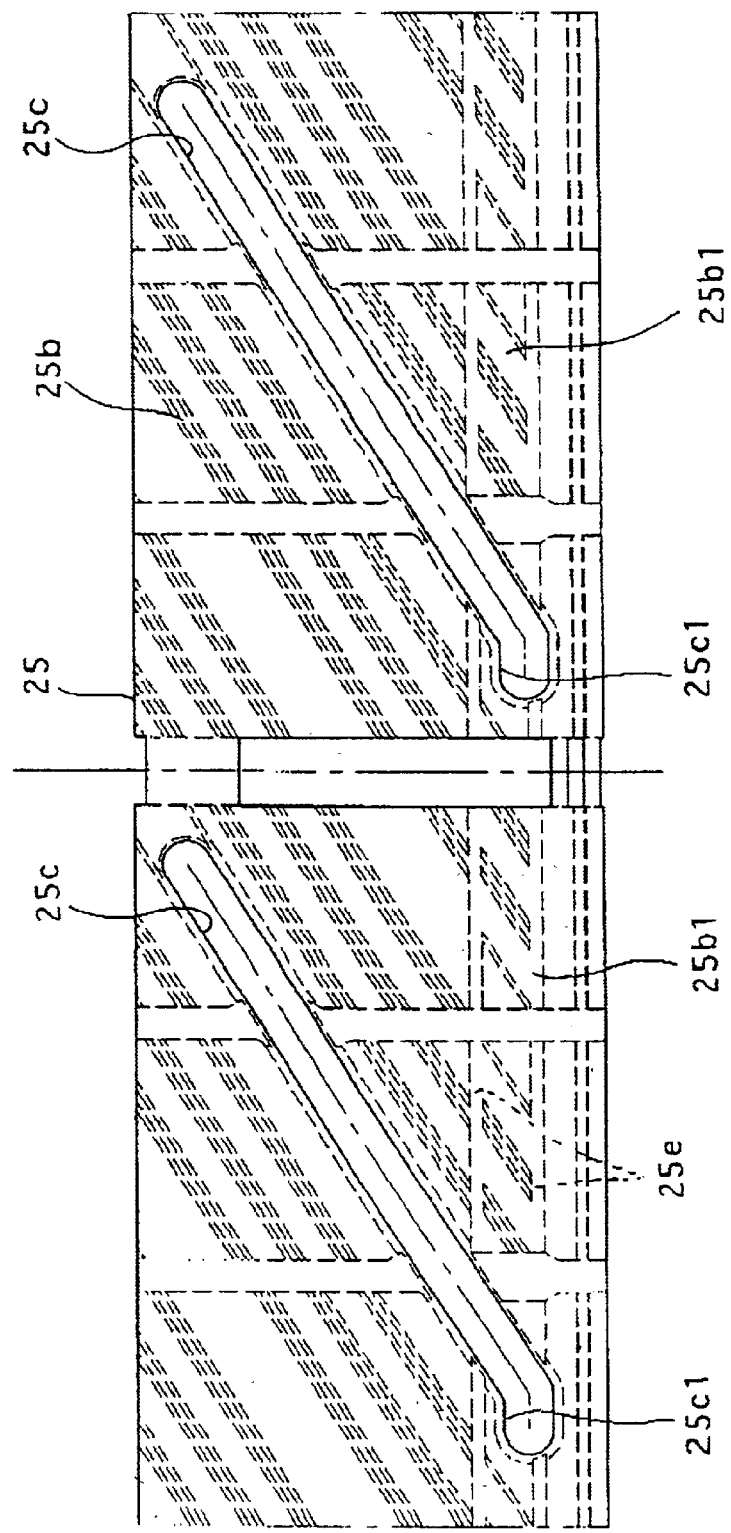

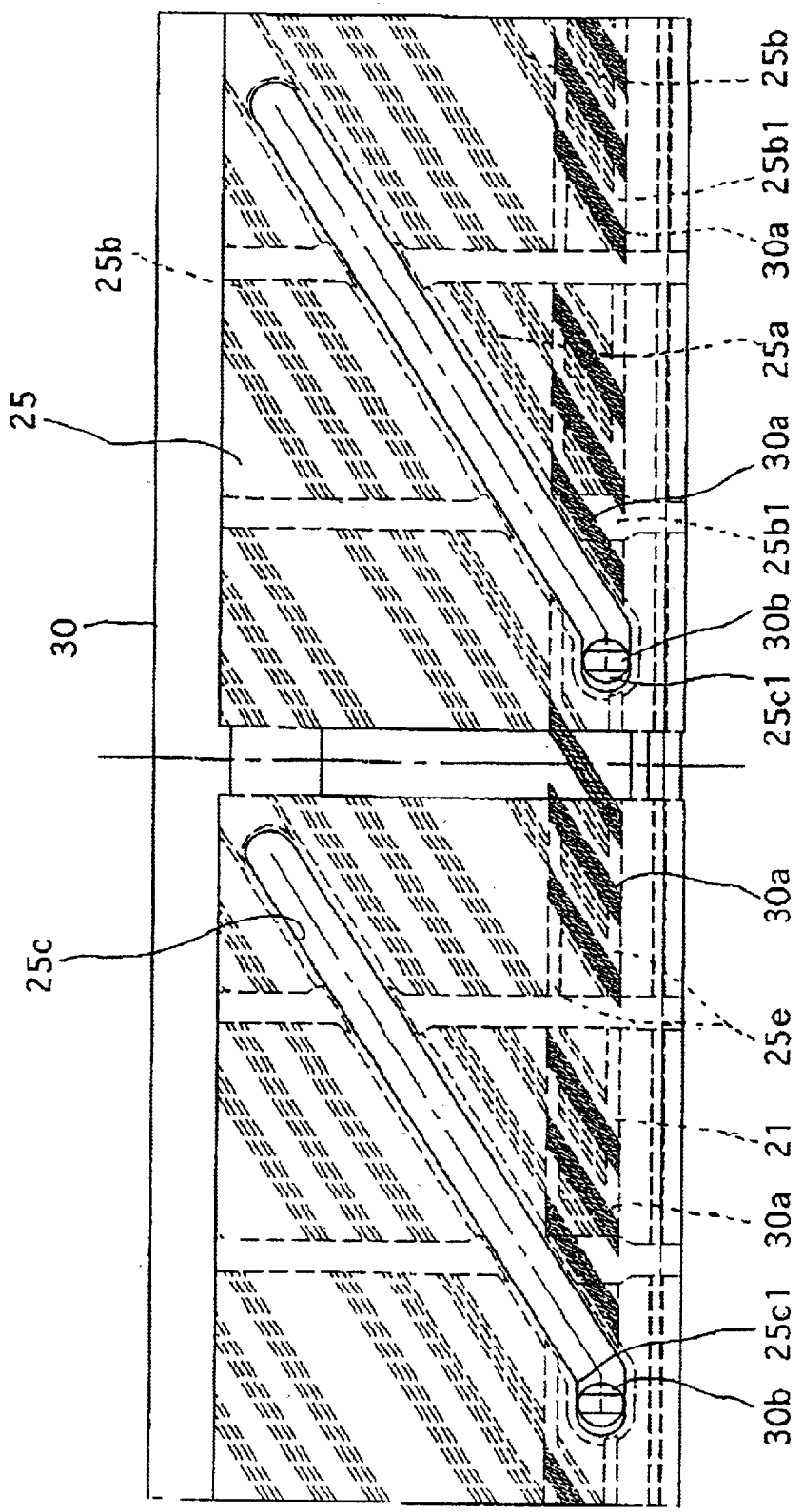

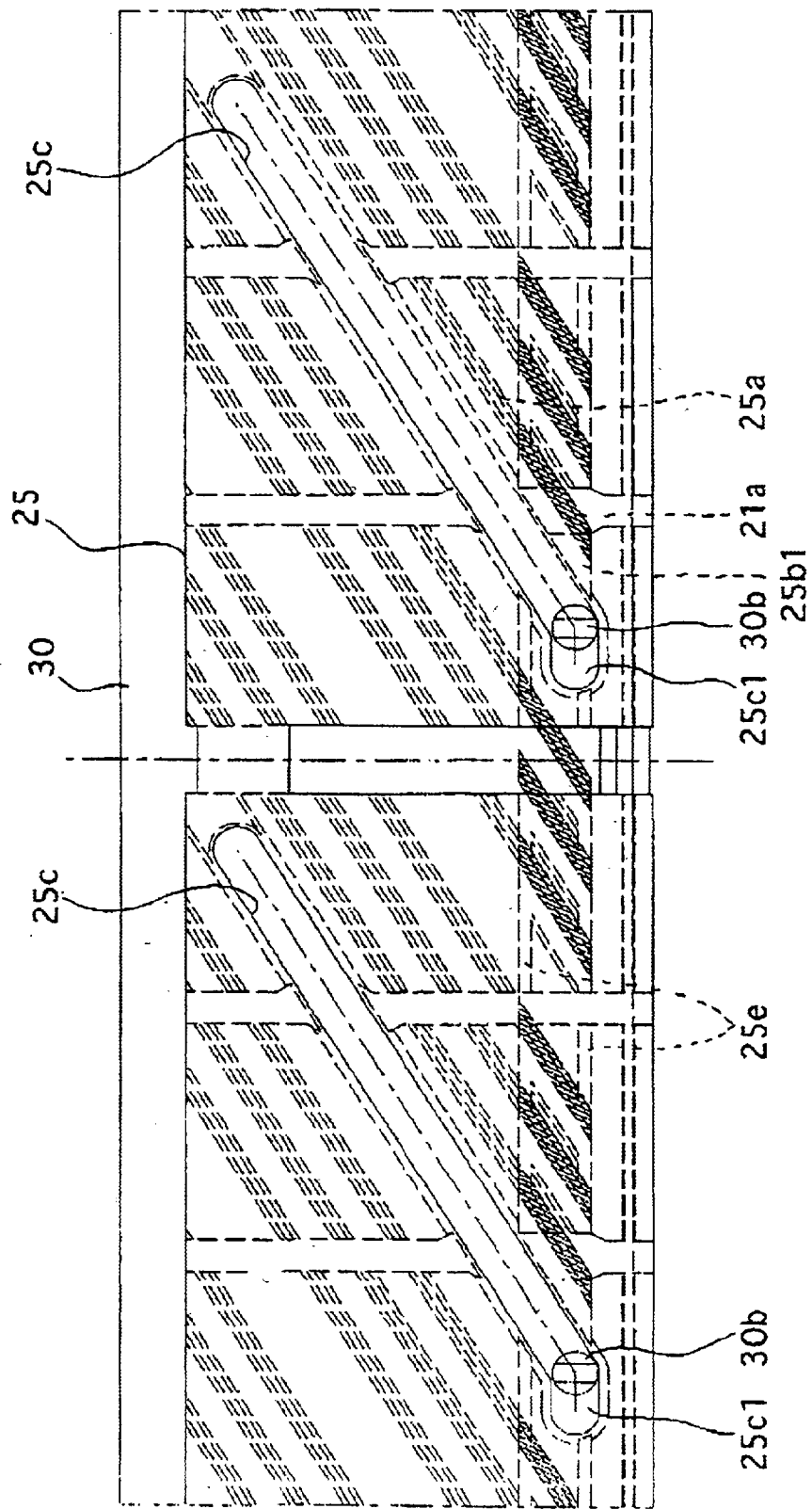

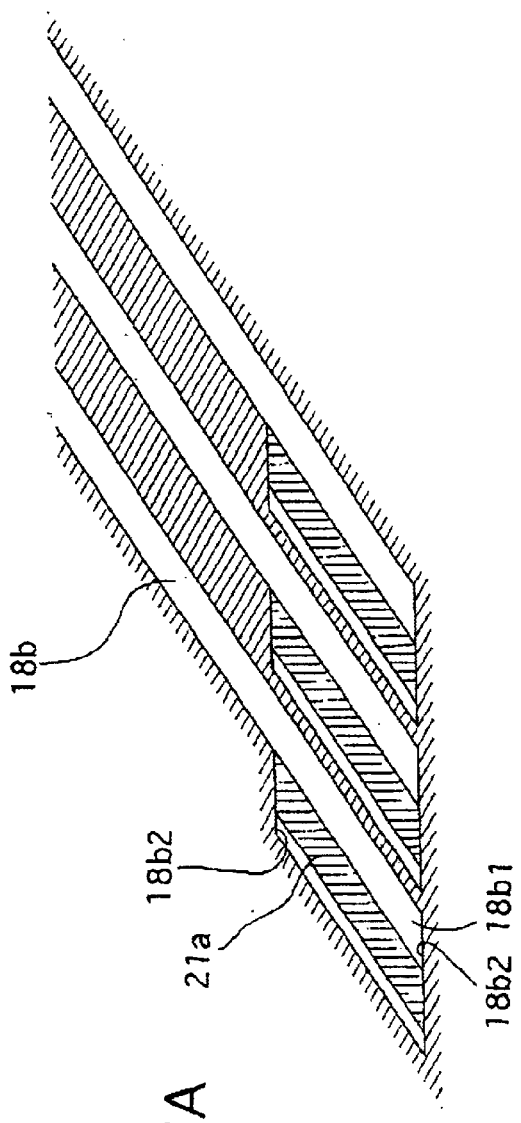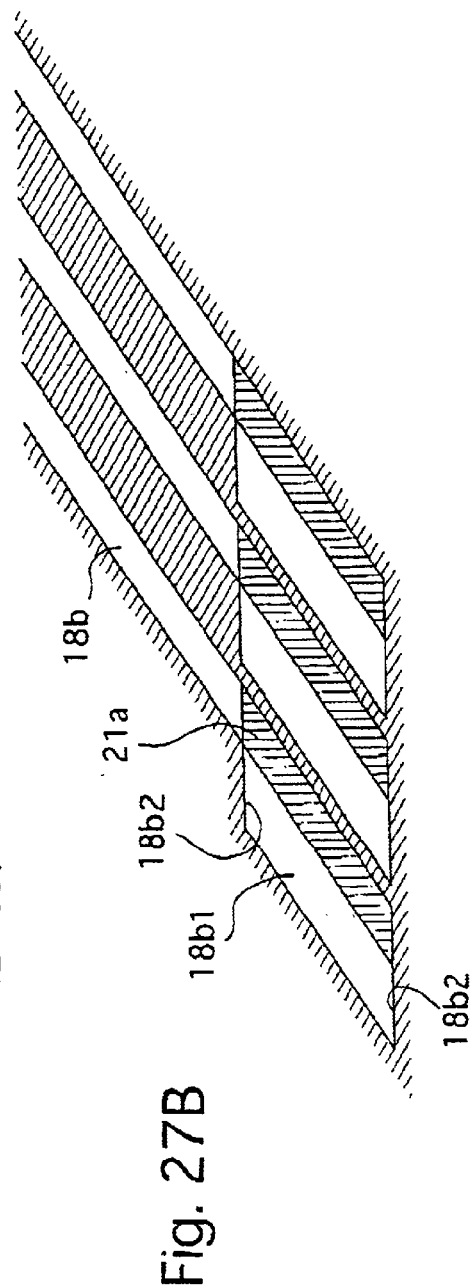
Fig. 27A
Fig. 27B

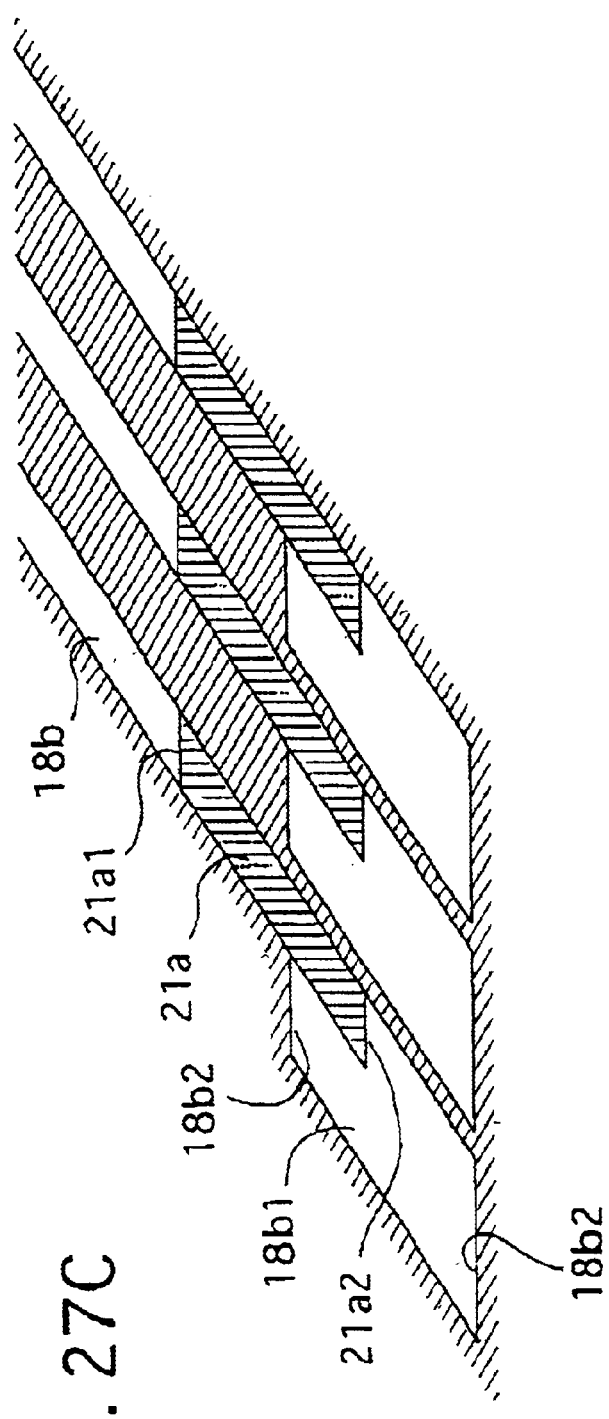

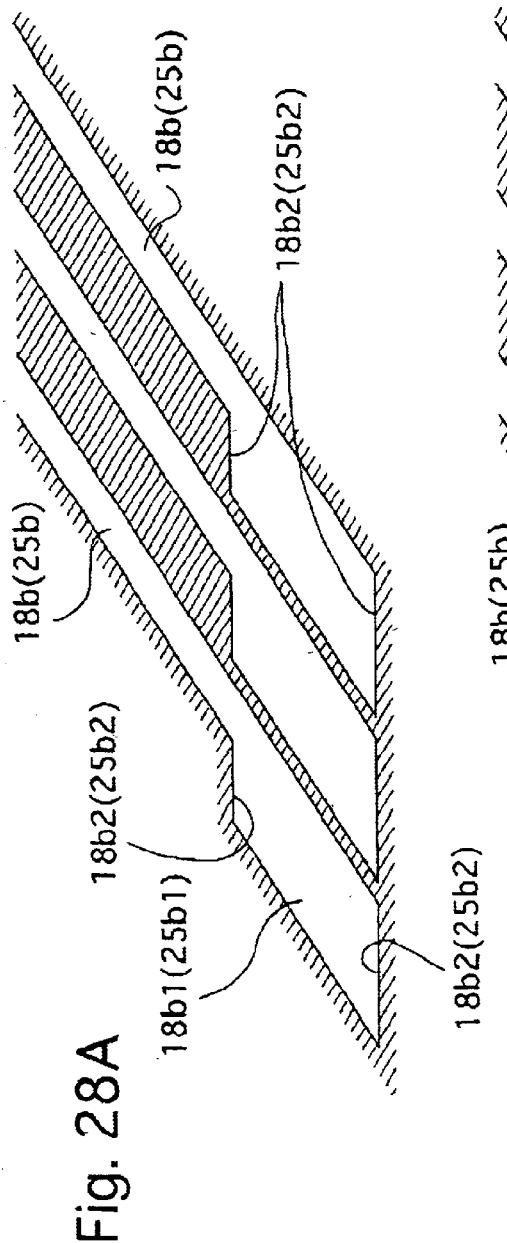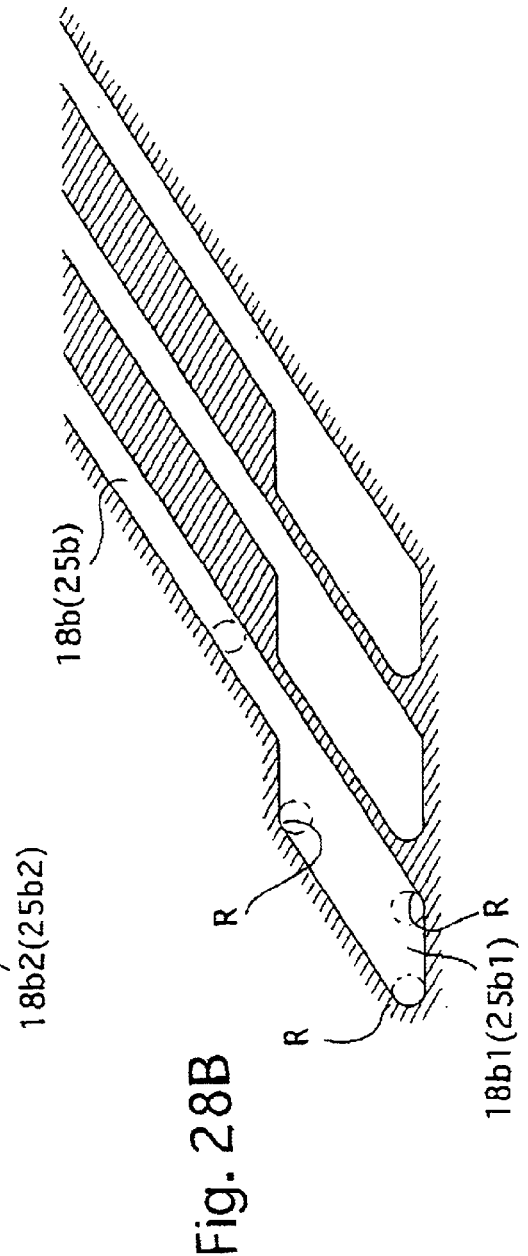

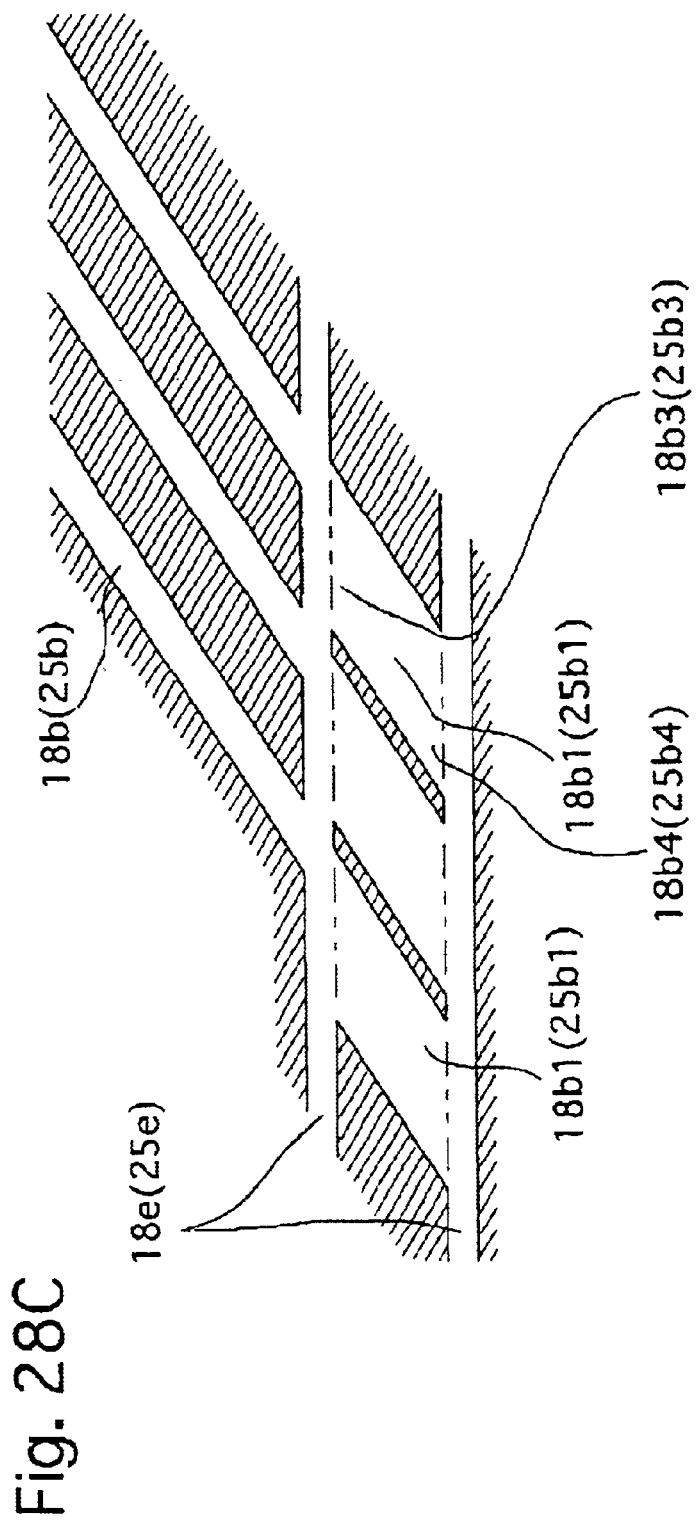

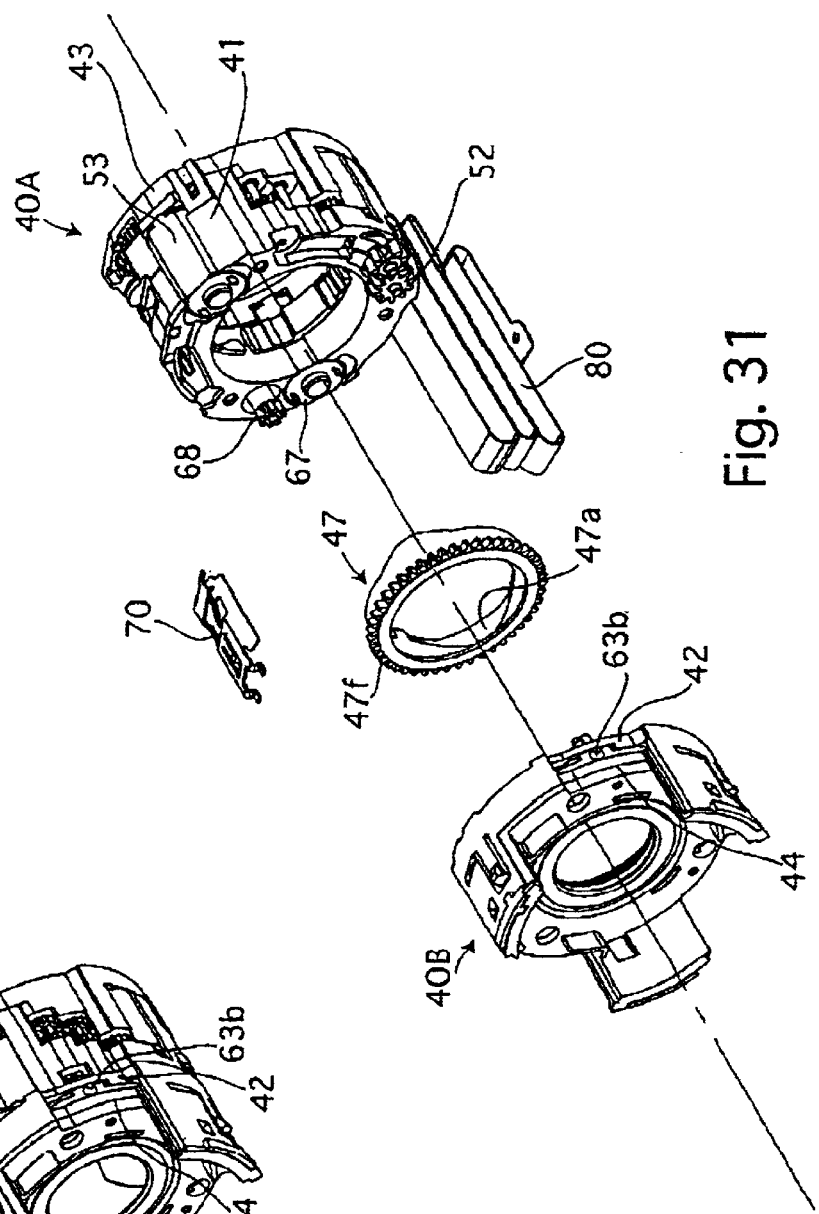
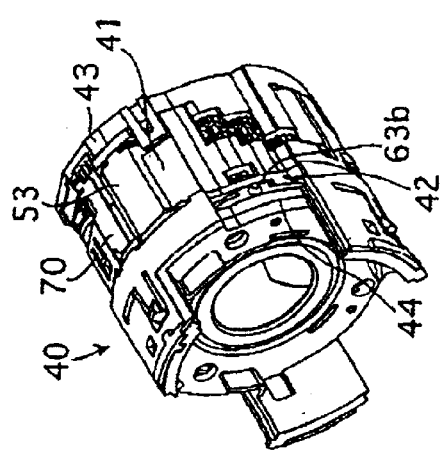

ZOOM LENS BARREL ASSEMBLY

BACKGROUND OF THE INVENTION

1. Field of the Invention

The present invention relates to a zoom lens barrel assembly.

2. Description of the Related Art

In conventional zoom lens barrel assemblies, two types of mechanisms have been used for causing the lens-supporting barrel provided at the front of the lens barrel assembly to extend: linear telescopic mechanisms that function via helicoids and lead cams, and non-linear mechanisms that function via cams.

A zooming optical system proposed in Japanese Patent Application No. Hei 11-79572 is constructed based on a two-lens group optical system including a front lens group and a rear lens group. In this optical system, the front lens group includes a first sub-lens group and a second sub-lens group that are provided in a lens-supporting barrel and are moved relative to each other to switch between a wide-angle photographing range and a telephoto photographing range. Accordingly, the optical system achieves widely variable focal lengths. When it is desired to further reduce the size of the zooming optical system, the length of each lens barrel can be reduced and the number of telescopic barrels may be increased. However, reduction in the length of each lens barrel considerably reduces the rotation angle of a helicoid required to extend the lens barrel, and as a result, curvature of the cam ring becomes undesirably large. This makes the design of the cam grooves complicated. Furthermore, smooth movement of the lens barrel may be interrupted due to a large variation in the torque which occurs when the lens barrel is extended.

SUMMARY OF THE INVENTION

The present invention provides a zoom lens barrel assembly which includes lens groups separated by a distance which is switched between a short focal length range and a long focal length range and can ensure smooth telescopic movement of lens barrels.

For example, in an embodiment, a zoom lens barrel assembly is provided, including a first lens group including a first sub-lens group and a second sub-lens group which move integrally during zooming; a second lens group, the first and the second lens groups moving relative to each other along the optical axis during zooming; a sub-lens group switching mechanism for moving one of the first and the second sub-lens groups away from the other of the first and second sub-lens groups in a short focal length photographing range and toward the other of the first and second sub-lens groups in a long focal length photographing range; and a zoom cam mechanism having a front lens group cam groove and a rear lens group cam groove for moving the first lens group and the second lens group toward and away from each other during zooming. The rear lens group cam groove includes a first portion corresponding to the short focal length photographing range and a second portion corresponding to the long focal length photographing range, the first and the second portions connected to each other via a discontinuous portion. The front lens group cam groove includes a non-linear portion which corresponds to the short focal length photographing range and provides a non-linear path, and a linear portion which corresponds to the long focal length photographing range and provides a linear path.

It is desirable for the linear portion of the front lens group cam groove to be aligned with a tangent of the non-linear portion at an end of the non-linear portion which corresponds to the long focal length side of the short focal length photographing range.

The discontinuous portion of the rear lens group cam groove can be constructed so that the first portion causes the second lens group to move toward the first lens group and the second portion causes the second lens group to move away from the first lens group.

It is desirable for a lead angle of the linear portion of the front lens group cam groove to extend parallel to the slope of a tangent of the non-linear portion of the front lens group cam groove.

It is desirable for the discontinuous portion of the rear lens group cam groove to correspond to an intermediate focal length photographing range which lies between the short focal length photographing range and the long focal length photographing range, wherein the discontinuous portion is not used in a photographing operation.

The zoom lens barrel assembly can include a multi-stage-extension zoom lens barrel assembly which extends and retreats between a first position and a second position, the first position and the second position corresponding to a short focal length extremity and a long focal length extremity, respectively. The multi-stage-extension zoom lens barrel assembly extends out from the most retracted position thereof by a predetermined amount to the first position and extends to a maximum position to corresponding to the second position, the discontinuous portion of the rear lens group cam groove corresponding to an intermediate focal length photographing range which lies between the short focal length photographing range and the long focal length photographing range and is not used in a photographing operation.

The sub-lens group switching mechanism can be mounted on a shutter unit secured to a frontmost barrel of the zoom lens barrel assembly, wherein the sub-lens group switching mechanism moves the first sub-lens group away from the second sub-lens group in the short focal length photographing range to bring the first and second sub-lens groups into a mutually distant position on the short focal length side, and wherein the sub-lens group switching mechanism moves the first sub-lens group toward the second sub-lens group on the long focal length photographing range to bring the first and second sub-lens groups into a mutually close position on the long focal length side.

The sub-lens group switching mechanism can include a first lens frame and a second lens frame supporting the first sub-lens group and the second sub-lens group, respectively, and a lens frame shift mechanism for moving the first and the second lens frames toward and away from each other along the optical axis and moving the lens frames integrally along the optical axis according to a rotation of a bi-directional motor mounted on the shutter unit.

The shutter unit can be secured to the frontmost barrel of the zoom lens barrel assembly. The frontmost barrel advances and retreats along the optical axis, without rotating, while following the front lens group cam groove of the zoom cam mechanism. The second lens group is supported in the rear lens group frame, which advances and retreats along the optical axis, without rotating, while following the rear lens group cam groove of the zoom cam mechanism.

The present disclosure relates to subject matter contained in Japanese Patent Application No. 2001-82094 (filed on Mar. 22, 2001) which is expressly incorporated herein by reference in its entirety.

BRIEF DESCRIPTION OF THE DRAWINGS

The present invention will be discussed below in detail with reference to the accompanying drawings, in which:

FIG. 18A is a perspective view showing a longitudinal cross-section of the second linear guide ring 25 of the zoom lens barrel assembly;

FIG. 18B is a perspective view showing a longitudinal cross-section of the third linear guide ring 18 of the zoom lens barrel assembly;

FIG. 19 is a developed view showing the second linear guide ring of the zoom lens barrel assembly;

FIG. 20 is a developed view showing engagement of female helicoids of the second linear guide ring with male helicoids of the third outer barrel in the retracted position of the zoom lens barrel assembly;

FIG. 21 is a developed view showing engagement of the female helicoids of the second linear guide ring with the male helicoids of the third outer barrel, when the zoom lens barrel assembly extends to a slip section boundary position;

FIG. 27A is an explanatory view showing engagement of the female helicoids and the helicoid slip section of the first linear guide ring, and the male helicoids of the second helicoid ring of the zoom lens barrel assembly when the lens barrel assembly is in the retracted state;

FIG. 27B is an explanatory view showing engagement of the female helicoids and the helicoid slip section of the first linear guide ring, and the male helicoids of the second helicoid ring of the zoom lens barrel assembly when the lens barrel assembly is in the slip section boundary section;

FIG. 27C is an explanatory view showing engagement of the female helicoids and the helicoid slip section of the first linear guide ring, and the male helicoids of the second helicoid ring of the zoom lens barrel assembly when the lens barrel assembly is in the wide-angle extremity position;

FIG. 28A is an explanatory view showing profile of the female helicoids and the helicoid slip section of the first linear guide ring;

FIG. 28B is an explanatory view illustrating the problem that arises upon manufacturing of a mold;

FIG. 28C is an explanatory view illustrating a solution to the problem proposed by an embodiment of the present invention;

FIG. 31 is a rear perspective view showing a shutter unit divided into a front unit and a rear unit;

FIG. 32 is a rear perspective view showing the front unit and the rear unit assembled;

DETAILED DESCRIPTION OF THE PREFERRED EMBODIMENTS

Figure 1:
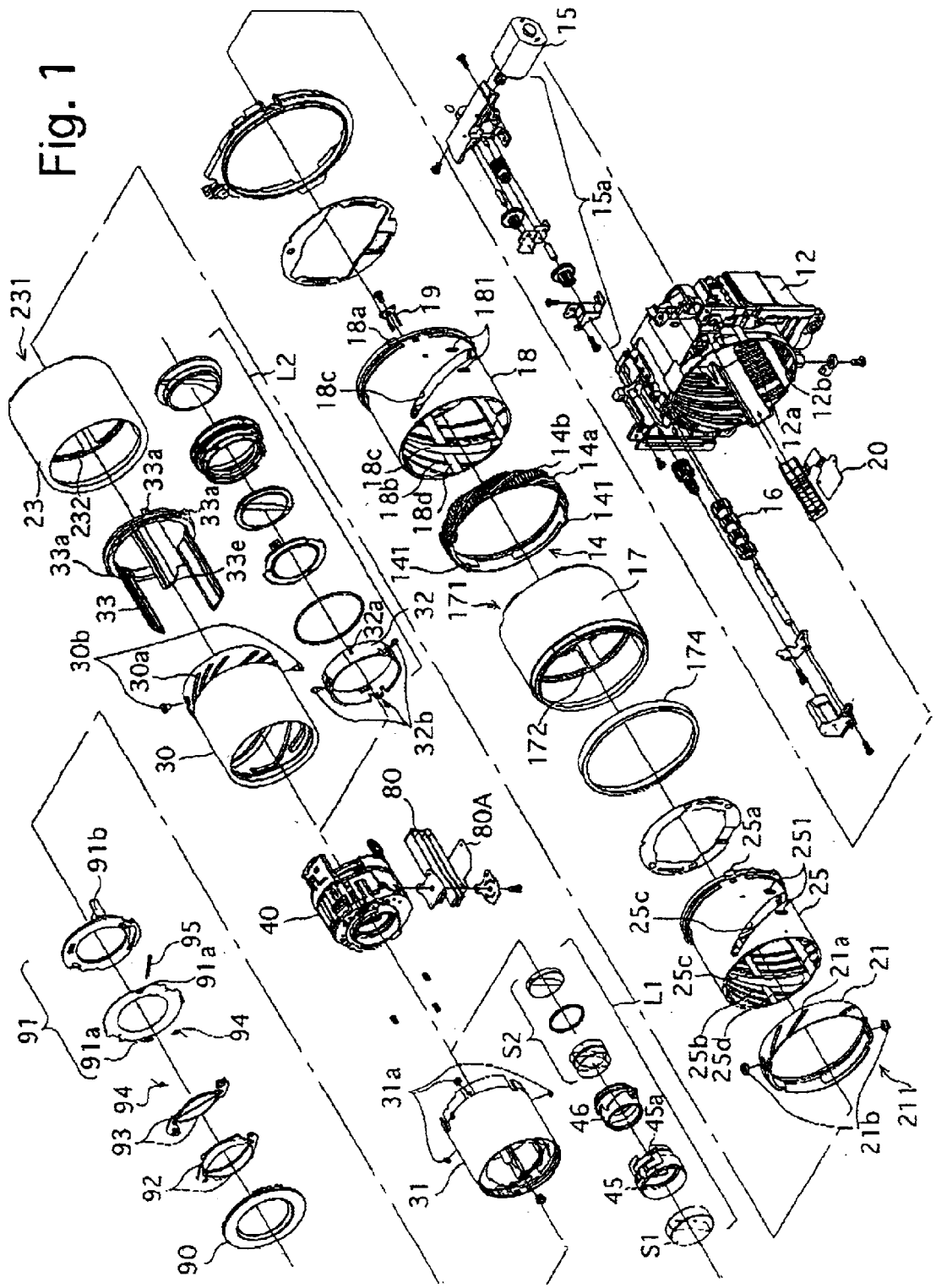
FIG. 1 is an exploded perspective view showing components of an embodiment of a zoom lens barrel assembly of the present invention.

The present invention will now be described in detail hereinafter with reference to the accompanying drawings. In one embodiment, the present invention is applied to a four-stage-extension zoom lens barrel assembly (multi-stage-extension zoom lens barrel assembly).

As shown in FIGS. 1 through 5, the zoom lens barrel assembly is constructed as a four-stage-extension zoom lens barrel assembly and includes a fixed barrel (rearmost barrel) 12 secured to a camera body, and a four-stage barrel unit which is retained in the fixed barrel 12 and advances and retreats along the optical axis relative to the fixed barrel 12. The four-stage lens unit includes a first outer barrel 17 which is the rearmost barrel, a second outer barrel 23 which is the second rearmost barrel, a third outer barrel 30 which is the third rearmost barrel and is constructed as a cam ring, and a fourth outer barrel (frontmost barrel) 31 which is the fourth rearmost barrel and serves as a lens-retaining barrel.

In the zoom lens barrel assembly, the fixed barrel 12 is connected to the first outer barrel 17, which in turn is connected to the second outer barrel 23, which in turn is connected to the third outer barrel 30, with each connection provided by a helicoid structure (mechanism). The helicoid mechanisms allow the barrels 17, 23 and 30 to extend outward from, or into, each other. The fourth outer barrel 31 is connected to the third outer barrel 30 through a cam structure.

In the zoom lens barrel assembly of the present embodiment, the first outer barrel 17 and the second outer barrel 23 are made separately from helicoid rings. Furthermore, the zoom lens barrel assembly is constructed so as to be extended past the telephoto extremity position, which is the most extended position of the barrel assembly in normal operation, to an assembly/disassembly position, at which the first outer barrel 17 and the second outer barrel 23 can be removed from and mounted onto the zoom lens barrel assembly. In this embodiment, the barrel assembly is brought into the assembly/disassembly position by rotating it by an additional rotation angle of 8° from the telephoto extremity position.

Lens barriers 92 and 93 are mounted on the fourth outer barrel 31 in the front portion thereof. The lens barriers 92 and 93 are opened and closed as the fourth outer barrel 31 and the third outer barrel 30 move along the optical axis relative to each other when the barrel assembly moves between the retracted position and the minimally extended photographing position (which corresponds to the wide-angle extremity position in this embodiment).

In the zoom lens barrel assembly of the present embodiment, the helicoid structure to move the second outer barrel 23 and the third outer barrel 30 includes a slip section which permits rotation of the second and the third outer barrels 23 and 30 but does not permit relative movement thereof along the optical axis when the lens barrel assembly moves between the retracted position and the wide-angle position. In other words, the path of the telescopic movement of the lens barrel assembly from the retracted position toward the wide-angle position includes a slip section in which the second outer barrel 23 and the third outer barrel 30 rotate at the same speed and do not move relative to each other along the optical axis. In the slip section, the first outer barrel 17 rotates while moving along the optical axis, whereas the fourth outer barrel 31 does not rotate but moves relative to the third outer barrel 30 along the optical axis. This relative movement between the fourth outer barrel 31 and the third outer barrel 30 along the optical axis causes opening/closing of the barriers 92 and 93.

The entire structure of the zoom lens barrel assembly will now be described with reference to FIGS. 1 through 7. Referring to FIG. 1, major components of the zoom lens barrel assembly are shown in an exploded view. Hereinafter, "front" refers to the direction toward an object to be photographed and "rear" refers to the direction toward the camera body (film).

Female helicoids 12a are formed on the inner periphery of the fixed barrel 12 which is secured to a camera body 11. The female helicoids 12a engage with male helicoids 14a formed on the outer periphery of a first helicoid ring 14. Arranged on the outside of the fixed barrel 12 is a pinion 16, which is rotated by a zooming motor 15. The pinion 16 engages with gear teeth 14b, which are formed on the outer periphery of the first helicoid ring 14 and extend along the male helicoids 14a where some of the male helicoids 14a have been removed (cut-away). The first outer barrel 17 is connected to the first helicoid ring 14 at the front end of the helicoid ring 14.

Engagement portions 141 (see FIGS. 1 and 34) formed on the front end of the first helicoid ring 14 engage with engagement portions 171 formed on the rear end of the first outer barrel 17, so that the first helicoid ring 14 integrally rotates with the first outer barrel 17. The engagement portions 141 and 171 can be brought into disengagable engagement by sliding the first helicoid ring 14 and the first outer barrel 17 along the optical axis toward each other when the first helicoid ring 14 and the first outer barrel 17 are in a predetermined relative rotational position (assembly/disassembly position). A first linear guide ring 18, which is supported within the first outer barrel 17, can be rotated relative to the first outer barrel 17 and moves along the optical axis together with the first outer barrel 17 (i.e., no relative displacement permitted along the optical axis). Linear guide projections 18a formed on the first linear guide ring 18 engage with respective linear guide slots 12b formed on the fixed barrel 12, so that the first linear guide ring 18, while being supported within the first outer barrel 17, can only move along the optical axis (i.e., can advance and retreat) and cannot rotate relative to the fixed barrel 12.

A pair of circumferential grooves 172 are formed on the inner periphery of the first outer barrel 17 and are separated from each other by a predetermined distance along the optical axis. A pair of keys 181, formed on the outer periphery of the first linear guide ring 18, engage with the respective circumferential grooves 172. Engagement of the keys 181 with the respective circumferential grooves 172 permits rotation of the first outer barrel 17 relative to the first linear guide ring 18 while preventing the relative movement between them along the optical axis.

Thus, upon activation of the zooming motor 15, a driving force therefrom is transmitted through a series of reduction gears 15a and the pinion 16 to the gear teeth 14b, to cause the first helicoid ring 14 to rotate. The rotation of the first helicoid ring 14 in turn causes the connected unit of the first helicoid ring 14, the first outer barrel 17 and the first linear guide ring 18, to advance and retreat along the optical axis. Consequently, the first helicoid ring 14, together with the first outer barrel 17, advances or retreats along the optical axis while rotating as the male helicoids 14a mesh with the female helicoids 12a, whereas the first linear guide ring 18 advances or retreats along the optical axis together with the first helicoid ring 14 and the first outer barrel 17 without rotating.

The engagement portions 141 and the engagement portions 171, and the keys 181 and the circumferential grooves 172, are respectively configured so that when the first helicoid ring 14 and the first outer barrel 17, and the first outer barrel 17 and the first linear guide ring 18, are in their respective predetermined relative rotational positions (assembly/disassembly positions), the first helicoid ring 14 and the first outer barrel 17, and the first outer barrel 17 and the first linear guide ring 18, can be moved along the optical axis toward and away from each other for engagement/disengagement.

The first helicoid ring 14, together with the first outer barrel 17, advances and retreats along the optical axis while rotating as the male helicoids 14a mesh with the female helicoids 12a, whereas the first linear guide ring 18 advances and retreats along the optical axis together with the first helicoid ring 14 and the first outer barrel 17 without rotating. A brush 19 and a code plate 20, which are secured to the first linear guide ring 18 and to the fixed barrel 12, respectively, detect predetermined stepped zoom positions (1(Wide-extremity position) through 7 (Tele-extremity position)) of the first linear guide ring 18 along the optical axis with respect to the fixed barrel 12, wherein each of the stepped zoom positions are separated by a predetermined distance. A cosmetic ring 174 is secured to the front end of the first outer barrel 17. The brush 19 and the code plate 20 constitute a focal detecting device.

Figure 6:
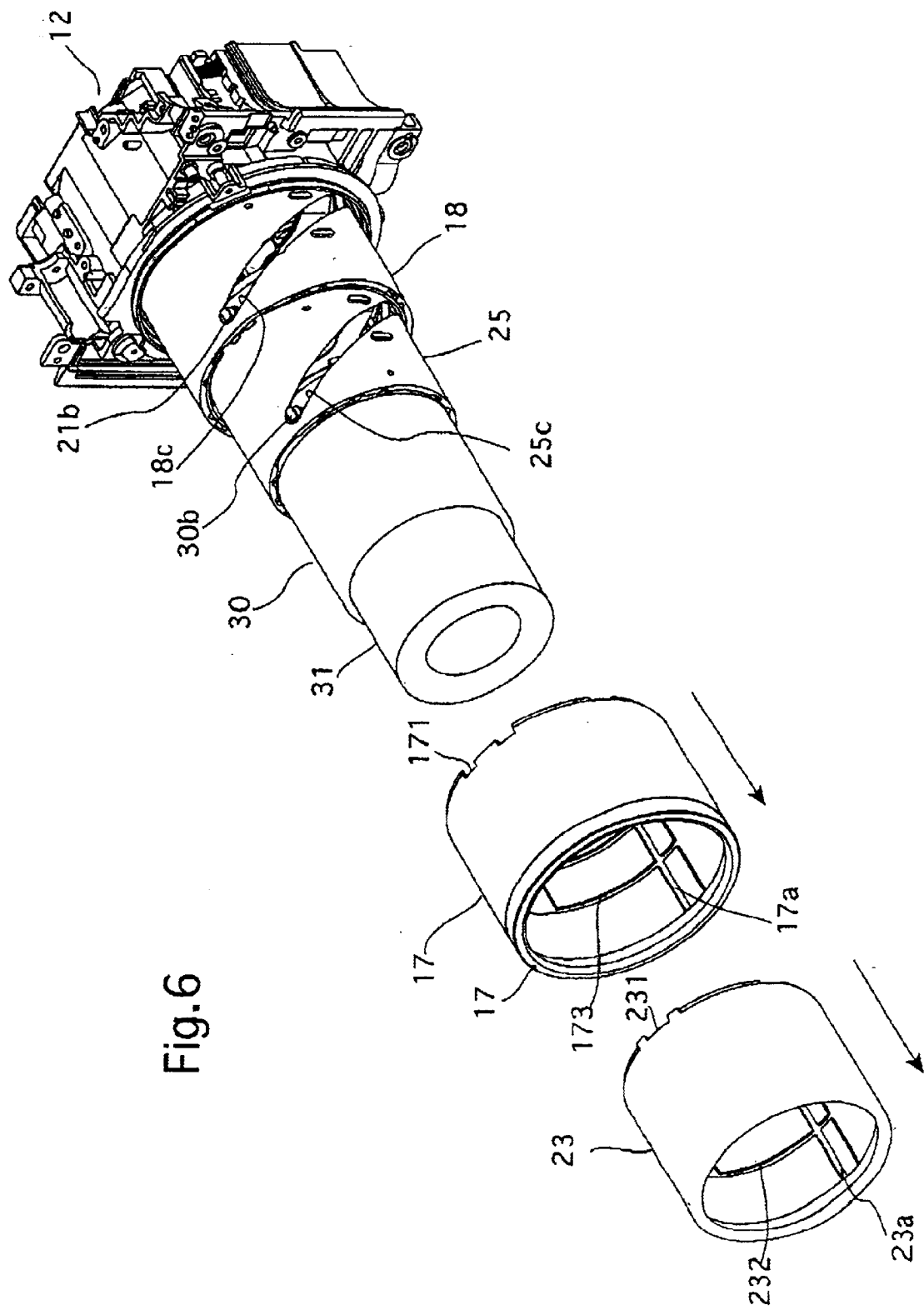
FIG. 6 is a perspective view showing the zoom lens barrel assembly of FIG. 5 with some of the lens barrels removed.
Figure 7:
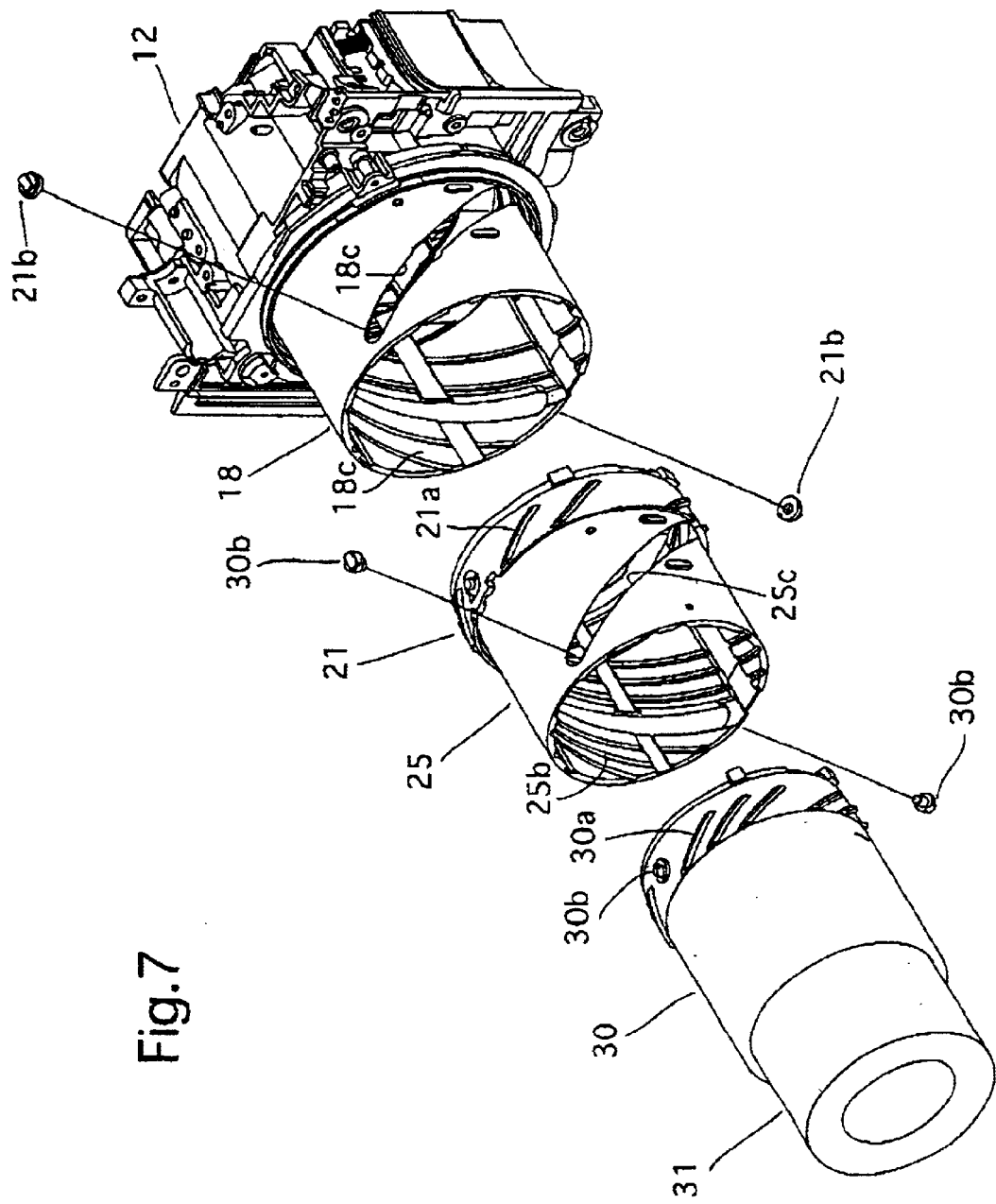
FIG. 7 is a perspective view of the zoom lens barrel assembly of FIG. 6 in a further disassembled state.
Figure 8:
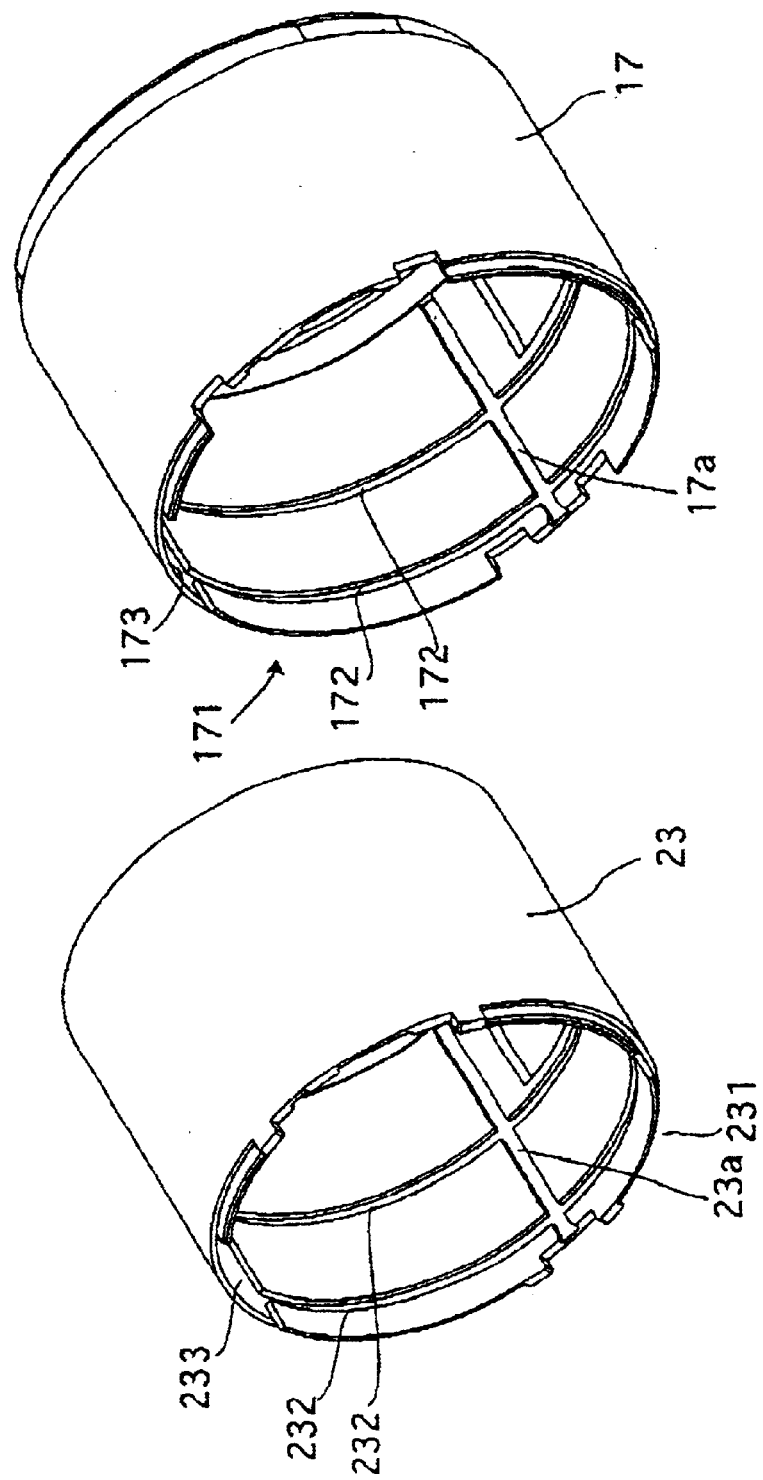
FIG. 8 is a perspective view showing elements of a first outer barrel and a second outer barrel.

Female helicoids 18b are formed on the inner periphery of the first linear guide ring 18, and engage with male helicoids 21a formed on the outer periphery of a second helicoid ring 21. The second helicoid ring 21 includes on the outer periphery thereof a pair of guide heads 21b, which are placed through a pair of guide slots 18c formed in the first linear guide ring 18 and received in a pair of head guide grooves 17a formed on the inner periphery of the first outer barrel 17 (FIGS. 6 and 7). The guide slots 18c are each formed as an elongate through hole that has the same angle of inclination as the female helicoids 18b. As shown in FIG. 8, each head guide groove 17a is a straight groove that extends parallel to the optical axis O of the zoom lens system. While part of each guide head 21b that is placed through the guide slot 18c is formed to have a cylindrical shape with a circular cross-section, an end of the guide head 21b that is received in the head guide groove 17a is formed as a rectangular key that extends along the head guide groove 17a.

The second outer barrel 23 is connected to the second helicoid ring 21 at the front end of the helicoid ring 21. As with the first helicoid ring 14 and the first outer barrel 17, the second helicoid ring 21 and the second outer barrel 23 are connected to each other through the engagement between engagement portions (recesses) 211 formed on the front end of the helicoid ring 21 and engagement portions (projections) 231 formed on the rear end of the second outer barrel 23 such that the second helicoid ring 21 integrally rotates with the second outer barrel 23 and can integrally retreat and advance. As with the engagement portions 141 and 171, the engagement portions 211 and 231 can be brought into disengagable engagement when the second helicoid ring 21 and the second outer barrel 23 are in a predetermined relative rotational position (assembly/disassembly position).

A second linear guide ring 25 is supported within the second outer barrel 23, and can be rotated relative to the second outer barrel 23 and moves along the optical axis together with the second outer barrel 23 (i.e., no relative displacement thereof is permitted along the optical axis). Linear guide projections 25a formed on the second linear guide ring 25 engage with respective linear guide slots 18d formed on the first linear guide ring 18, so that the second linear guide ring 25 can only move along the optical axis relative to the first linear guide ring 18.

A pair of circumferential grooves 232 are formed on the inner periphery of the second outer barrel 23 and are separated from each other by a predetermined distance along the optical axis. A pair of keys 251, formed on the outer periphery of the second linear guide ring 25, engage with the respective circumferential grooves 232. Engagement of the keys 251 with the respective circumferential grooves 232 permits rotation of the second outer barrel 23 relative to the second linear guide ring 25 while preventing the relative movement between them along the optical axis.

Thus, upon activation of the zooming motor 15, a driving force therefrom is transmitted through the series of the reduction gears 15a and the pinion 16, to cause the first helicoid ring 14 and the first outer barrel 17 to advance or retreat while rotating and the first guide ring 18, to advance or retreat along the optical axis without rotating. This in turn causes the connected unit including the second helicoid ring 21, the second outer barrel 23 and the second linear guide ring 25, to advance and retreat along the optical axis. Consequently, the second helicoid ring 21 and the second outer barrel 23 advance or retreat along the optical axis relative to the first outer barrel 17 due to the engagement of the guide heads 21b with the respective guide slots 18c and the head guide grooves 17a, while rotating along with the first outer barrel 17 as the male helicoids 21a mesh with the female helicoids 18b. On the other hand, the second linear guide ring 25 advances or retreats together with the second helicoid ring 21 and the second outer barrel 23 without rotating, due to the engagement of the linear guide projections 25a with the respective linear guide slots 18d.

The engagement portions 211 and the engagement portions 231, and the keys 251 and the circumferential grooves 232, are respectively configured so that when the second helicoid ring 21 and the second outer barrel 23, and the second outer barrel 23 and the second linear guide ring 25, are in their respective predetermined relative rotational positions (assembly/disassembly positions), the second helicoid ring 21 and the second outer barrel 23, and the second outer barrel 23 and the second linear guide ring 25, can be moved along the optical axis toward and away from each other for engagement/disengagement.

As with the first linear guide ring 18, female helicoids 25b are formed on the inner peripheral of the second linear guide ring 25. The female helicoids 25b engage with male helicoids 30a formed on the rear outer periphery of the third outer barrel (cam ring) 30. The third outer barrel 30 also serves as a third helicoid ring and includes a pair of guide heads 30b on the rear outer surface thereof. The pair of the guide heads 30b are placed through a pair of guide slots 25c formed in the second linear guide ring 25 and are received in a pair of head guide grooves 23a formed on the inner periphery of the second outer barrel 23 (see FIGS. 8 and 14). While part of each guide head 30b that is placed through the guide slot 25c is formed to have a cylindrical shape with a circular cross-section, an end of the guide head 30b that is received in the head guide groove 23a is formed as a rectangular shape that extends along the head guide groove 23a.

The guide slots 25c are each formed as an elongate through hole that has the same angle of inclination as the female helicoids 25b. Each head guide groove 23a is a straight groove that extends parallel to the optical axis O.

A third linear guide ring 33 is supported within the third outer barrel 30, which can be rotated relative to the third outer barrel 30 and moves integrally with the third outer barrel 30 along the optical axis (i.e., no relative displacement thereof is permitted along the optical axis). The third linear guide ring 33 includes on the outer periphery thereof a plurality of linear guide projections 33a, each of which engages with a linear guide slot 25d formed on the inner periphery of the second linear guide ring 25, allowing the third linear guide ring 33 to move only along the optical axis.

Thus, upon activation of the zooming motor 15, the first helicoid ring 14 and the first outer barrel 17 advance or retreat along the optical axis while rotating. The first linear guide ring 18 advances or retreats along the optical axis together with the first helicoid ring 14 and the first outer barrel 17 without rotating. The second helicoid ring 21 and the second outer barrel 23 advance or retreat relative to each other along the optical axis while rotating together at the same rotation speed with respect to the first outer barrel 17. The second linear guide ring 25 advances or retreats together with the second helicoid ring 21 and the second outer barrel 23 without rotating. As a result, as the male helicoids 30a mesh with the female helicoids 25b, the third outer barrel 30 and the third linear guide ring 33 advance or retreat along the optical axis with respect to the second outer barrel 23, while rotating together with the second outer barrel 23 at the same rotation speed due to the engagement of the guide heads 30b with the guide slots 25c and the head guide grooves 23a. The third linear guide ring 33, with the restriction of the linear guide projections 33a engaging the linear guide slots 25d, advances or retreats along the optical axis together with the third outer barrel 30 without rotating. A portion of the third outer barrel 30 in front of the helicoids 30a extends from the second outer barrel 23 and is exposed outside to form a part of the external appearance of the lens barrel.

Figure 9:
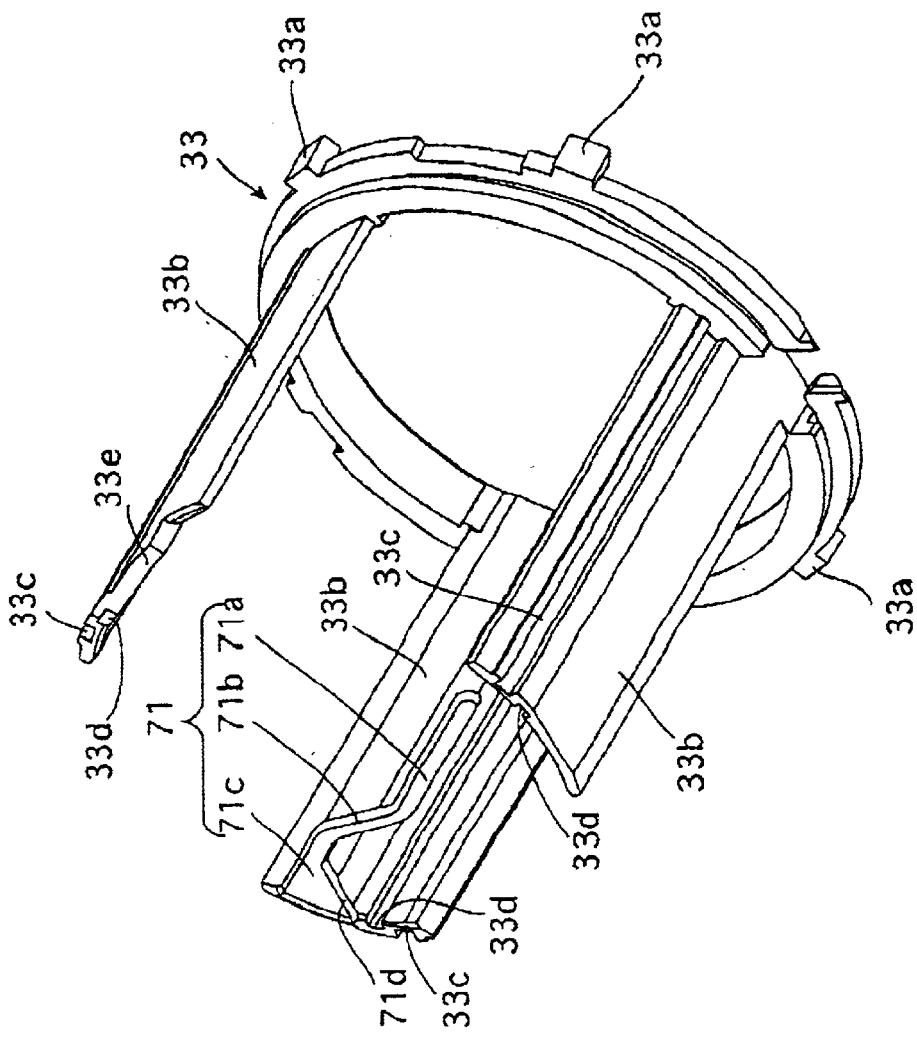
FIG. 9 is a perspective view showing an element of a third linear guide ring.
Figure 10:
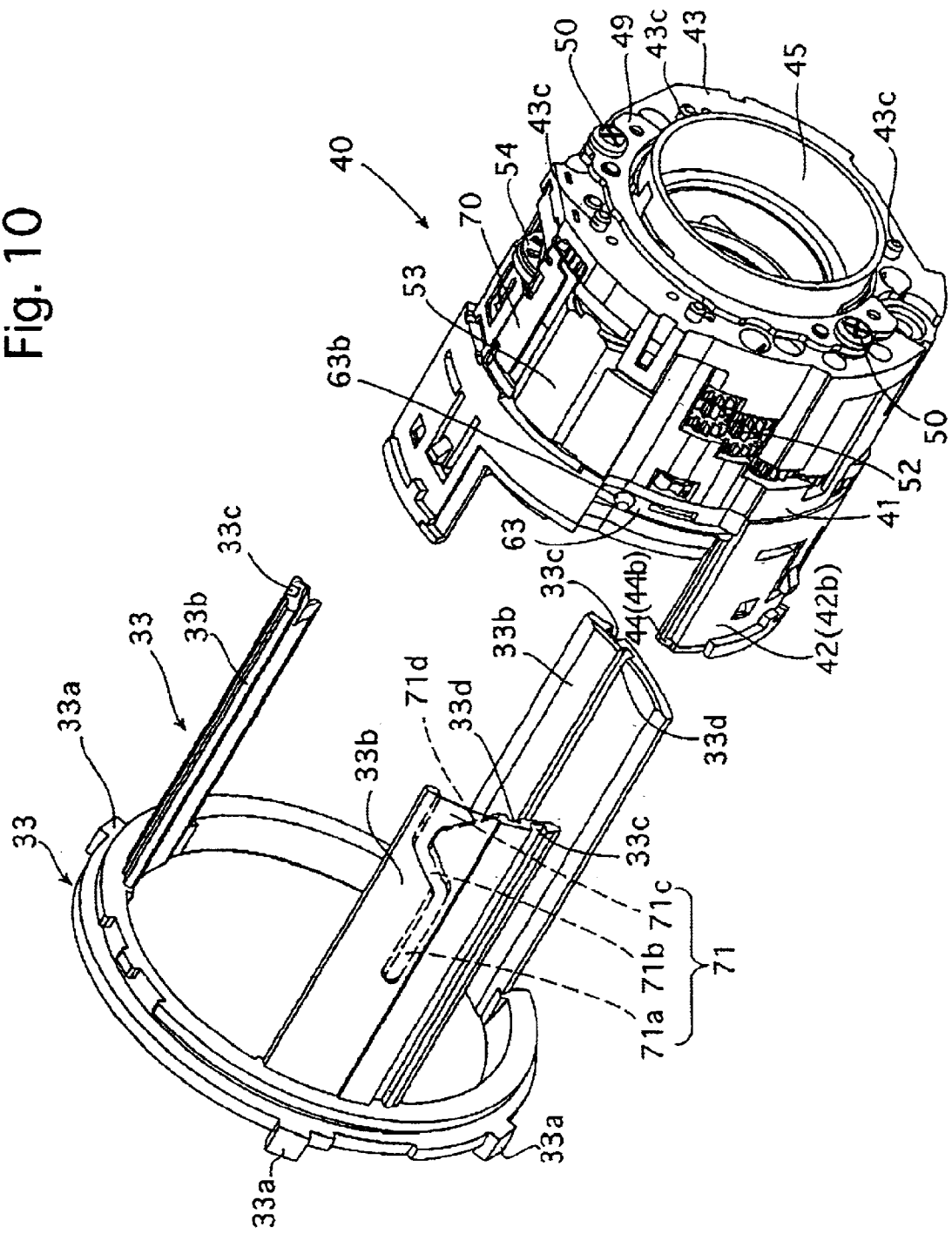
FIG. 10 is an exploded perspective view showing the third linear guide ring along with a shutter unit.

The fourth outer barrel (lens-retaining barrel) 31, which holds a first lens group L1 (which includes a first sub-lens group S1 and a second sub-lens group S2), and a rear lens group frame 32 including a secured second lens group L2, are supported within the third outer barrel 30, with the fourth outer barrel 31 being in front of the rear lens group frame 32. The fourth outer barrel 31 and the rear lens group frame 32 are guided along the optical axis by the third linear guide ring 33. Specifically, the third linear guide ring 33 includes three arm members 33b, each having a partial cylindrical shape as shown in FIGS. 9 and 10. Each arm member 33b includes on respective sides thereof (i.e., the outer periphery and the inner periphery) linear guide slots 33c and 33d, each of which extends parallel to the optical axis O. Each guide slot 33c slidably receives a linear guide projection (not shown) provided on the inner periphery of the fourth outer barrel 31, whereas each guide slot 33d slidably receives a linear guide projection 32a provided on the outer periphery of the rear lens group frame 32.

Figure 12:
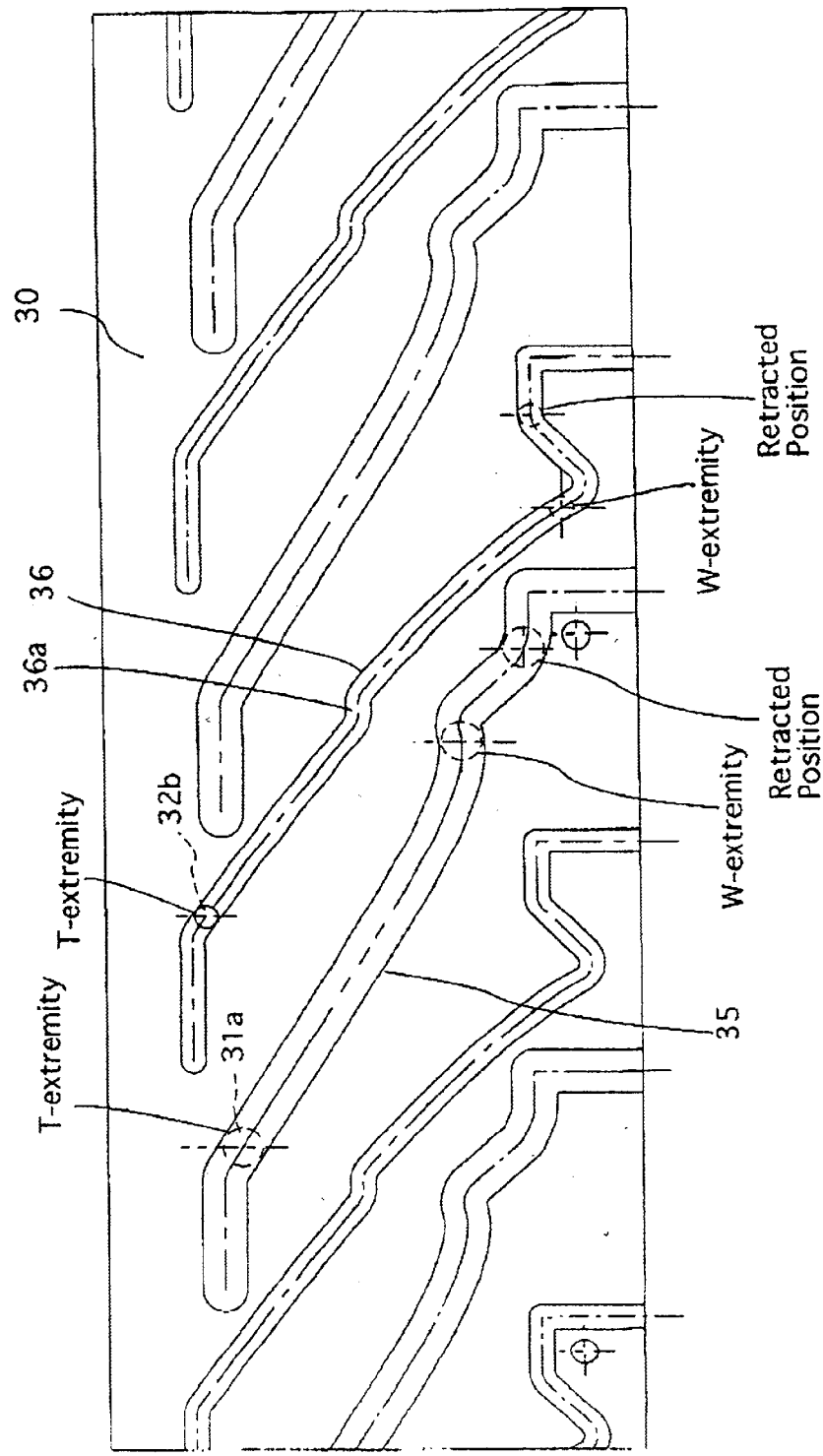
FIG. 12 is an developed view of a cam ring showing profiles of cam grooves on the inner surface of the cam ring.

Front lens group cam grooves 35 for the fourth outer barrel 31 and rear lens group cam grooves 36 for the rear lens group frame 32 are formed on the inner periphery of the third outer barrel 30. The front lens group cam grooves 35 and the rear lens group cam grooves 36 are shown in a developed view in FIG. 12. As shown in FIG. 12, three front lens group cam grooves 35 and three rear lens group cam grooves 36 are alternately arranged in the circumferential direction and are equally spaced from each other. Front lens group follower projections 31a and rear lens group follower projections 32b radially protrude from the fourth outer barrel 31 and the rear lens group frame 32, respectively, for engaging the front lens group cam grooves 35 and the rear lens group cam grooves 36, respectively.

Accordingly, when the zooming motor 15 is activated and the third outer barrel 30 advances or retreats along the optical axis while rotating together with the first outer barrel 17 and the second outer barrel 23, and the third linear guide ring 33 advances or retreats along the optical axis together with the third outer barrel 30 without rotating, the fourth outer barrel 31 and the rear lens group frame 32, while being prevented from rotating by the engagement of the linear guide projections (not shown) with the linear guide slots 33c, advance or retreat along the optical axis on a predetermined path with respect to the third outer barrel 30 due to the engagement of the follower projections 31a and 32b with the respective cam grooves 35 and 36.

The follower projections 31a and 32b and the respective cam grooves 35 and 36, which cause the fourth outer barrel 31 and the rear lens group frame 32 to move toward and away from each other along the optical axis, constitute a zoom cam mechanism.

A portion of the fourth outer barrel 31 in front the follower projections 31a extends from the third outer barrel 30 and is exposed outside to form a part of the external appearance of the lens barrel.

The above-described zoom lens barrel has a construction in which the first linear guide ring 18, the second linear guide ring 25, the third linear guide ring 33, and the fourth outer barrel 31 advance and retreat linearly along the optical axis with respect to the fixed barrel 12, without rotating.

As shown in FIG. 12, the region of each front lens group cam groove 35 and the region of each rear lens group cam groove 36 extending between respective telephoto extremity positions (indicated as T-extremity) and retracted positions (indicated as retracted) are used in normal operations. During photographing, the follower projection 31a and the follower projections 32b are each guided over the normal operation region between the telephoto extremity position (T-extremity) and the wide-angle extremity position (W-extremity). The rear lens group cam groove 36 has an intermediate discontinuous position 36a between the telephoto extremity position (T-extremity) and the wide-angle extremity position. Between the telephoto extremity position and the wide-angle extremity position, the first lens group L1, retained within the fourth outer barrel 31, which is guided over the front lens group groove 35, has a switching function in which the first sub-lens group S1 and the second sub-lens group S2 is switched between a mutually close position (tele mode) and a mutually distant position (wide mode). Upon switching in the first lens group L1, the second lens group L2 passes the intermediate discontinuous position 36a in the rear lens group cam groove 36. The zoom lens system is controlled such that the intermediate discontinuous position 36a is not used as an actual zooming range during a photographing operation (i.e., the third outer barrel 30 does not come to a stop thereat).

The lens group cam grooves 35 and 36 include an assembly/disassembly position beyond the telephoto extremity position, to which the zoom lens barrel needs to be rotated for assembly/disassembly.

As shown in FIGS. 1 through 4, a shutter unit 40 is arranged within the fourth barrel 31. The shutter unit 40 includes a front unit ring 41, a rear unit ring 42, a gear-holding ring 43 and a sector-holding ring 44 and is generally divided into a front unit 40A having the front unit ring 41 and the gear-holding ring 43, which are integrated with each other, and a rear unit 40B having the rear unit ring 42 and the sector-holding ring 44, which are integrated with each other (FIG. 31).

Figure 33:
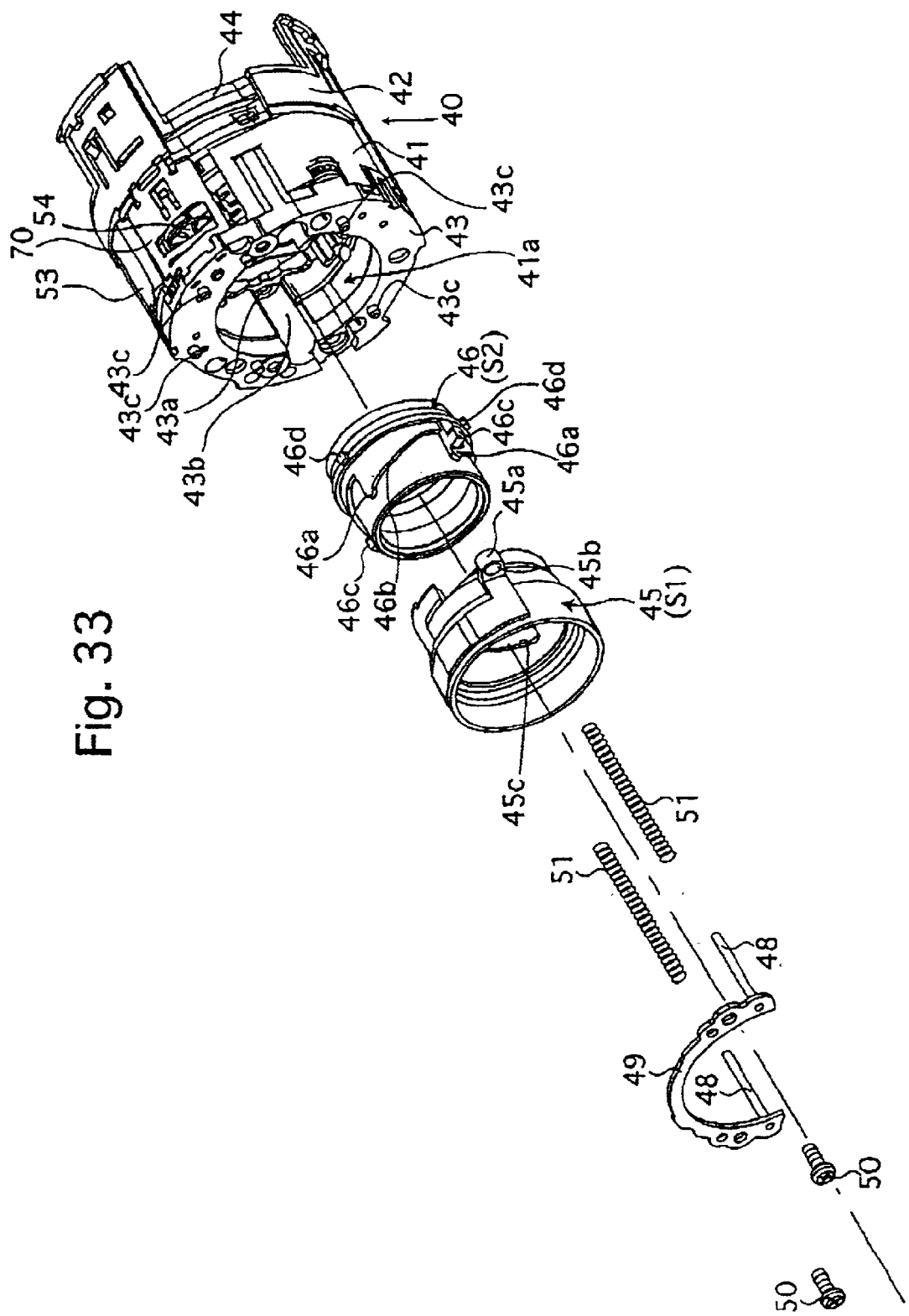
FIG. 33 is an exploded perspective view showing components associated with the first lens group and the shutter unit.

First, the front unit 40A is described. As shown in FIG. 33, a front sub-lens group frame 45 and a rear sub-lens group frame 46 are fitted in a central opening 41a formed in the front unit ring 41. The front sub-lens group frame 45 retains a first sub-lens group S1 and the rear sub-lens group frame 46 retains a second sub-lens group S2. The front sub-lens group frame 45 and the rear sub-lens group frame 46 (thus, the first sub-lens group S1 and the second sub-lens group S2) can be moved along the optical axis relative to each other to switch between a mutually close position for short focal length (wide-angle) shooting and a mutually close position for long focal length (telephoto) shooting as the zoom lens barrel assembly moves between the wide-angle extremity and the telephoto extremity. A drive ring 47, shown in FIGS. 31, 34 and 35, drives the front sub-lens group frame 45 and the rear sub-lens group frame 46 so as to move toward, or away from, each other to perform the switching process, and also drives the front sub-lens group frame 45 and the rear sub-lens group frame 46 to move together along the optical axis for focusing.

The drive ring 47 abuts against a receiving surface (not shown) of the rear unit ring 42, and is rotatably supported between the front unit ring 41 and the rear unit ring 42.

The front sub-lens group frame 45 has a cylindrical shape and includes a pair of linear guide ribs 45a arranged on diametrically opposite ends on the periphery thereof. As shown in FIG. 33, a guide bore 45b is formed in each linear guide rib 45a. A linear guide rod 48 is loosely inserted (moveably fitted) in the guide bore 45b. The rear end of the linear guide rod 48 is fixed into a fixing bore 43a formed at a rearmost portion of the gear-holding ring 43 while the front end of the linear guide rod 48 is secured to the front surface of the gear-holding ring 43 by a bracket 49 and a screw 50. A coil spring 51 is placed over an outer periphery of each of the linear guide rods 48 between the bracket 49 and the corresponding linear guide rib 45a so that each coil spring 51 biases the front sub-lens group frame 45 toward the rear sub-lens group frame 46. A U-shaped recess 43b is provided on the gear-holding ring 43 to receive each linear guide rod 48 and the spring 51. The recess 43b is communicatively connected with the central opening 41a of the front unit ring 41.

Figure 34:
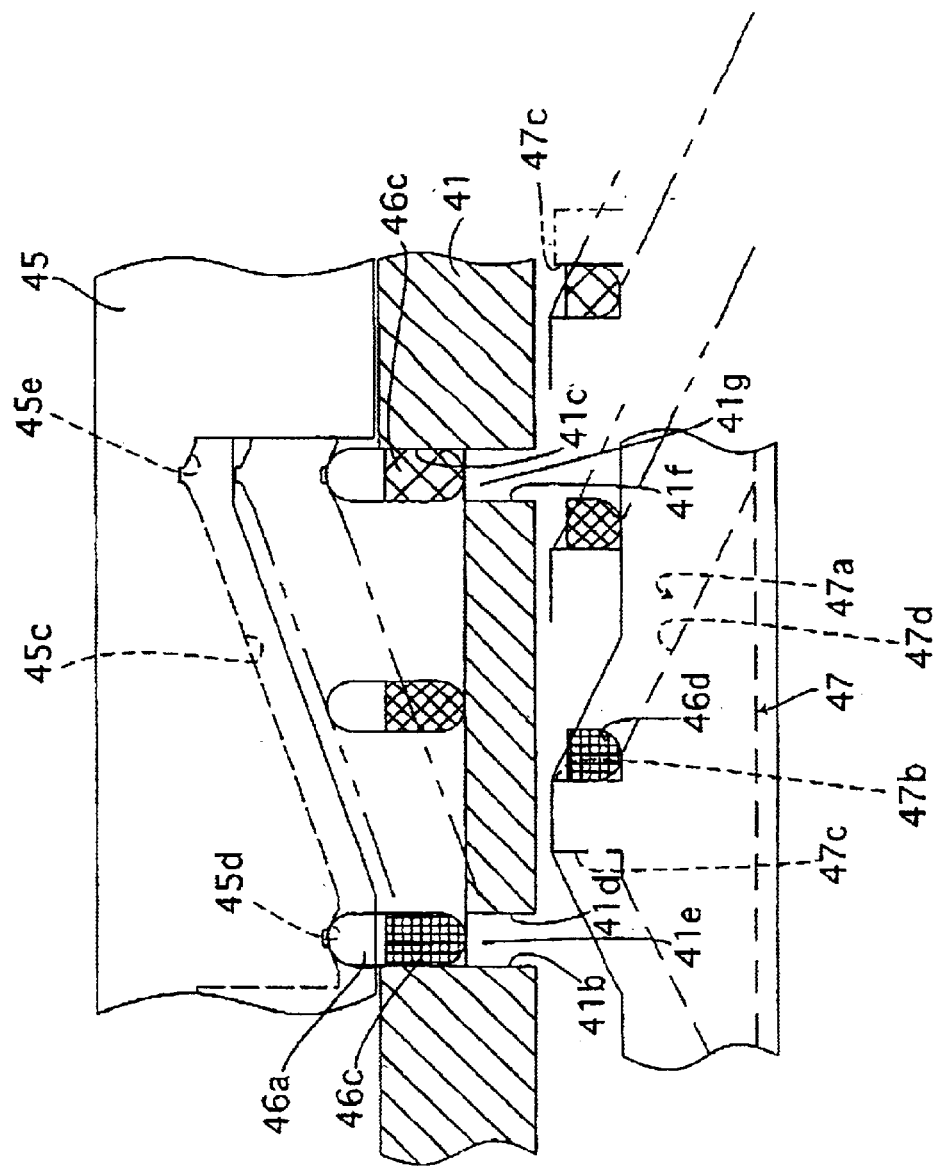
FIG. 34 is an enlarged expanded view showing engagement of the front sub-lens group frame, the rear sub-lens group frame and the drive ring with the front support ring.

As shown in FIGS. 33 and 34, the front sub-lens group frame 45 is provided with four leading surfaces (shift cam surfaces) 45c which are formed circumferentially at equi-angular intervals on the end-face of the front sub-lens group frame 45. Each leading surface 45c is provided with a pair of follower stabilizing recesses 45d and 45e on either end thereof. Only one leading surface 45c is shown in FIGS. 33 and 34. The rear sub-lens group frame 46 is provided on the outer periphery with four follower projections 46a, each corresponding to each of the four leading surfaces 45c of the front sub-lens group frame 45. A sloped surface 46b is provided for each corresponding leading surface 45c of the front sub-lens group frame 45, and each follower projection 46a is provided on one end of each corresponding sloped surface 46b that is the closest to the leading surface 45c. The leading surfaces 45c formed on the front sub-lens group frame 45 and the follower projections 46a formed on the rear sub-lens group frame 46 together constitute a shift cam mechanism (sub-lens group switching mechanism) which enables the front sub-lens group frame 45 and the rear sub-lens group frame 46 to move toward and away from each other.

Furthermore, the rear sub-lens group frame 46 is also provided with a pair of linear guide projections 46c which are located at the same circumferential positions as two of the four follower projections 46a that are diametrically opposed, and are provided behind the two follower projections 46a in the axial direction. Also formed on the outer periphery of the rear sub-lens group frame 46 are three lugs 46d, which are spaced at equi-angular intervals in the circumferential direction and behind the linear guide projections 46c in the axial direction.

As shown in FIG. 34, a pair of rotation-limiting surfaces 41b and 41c are formed on the inner periphery of the front unit ring 41 in order to define the range of rotation of the rear sub-lens group frame 46 relative to the non-rotating front unit ring 41. The rotation-limiting surfaces 41b and 41c are arranged to correspond to the linear guide projections 46c of the rear sub-lens group frame 46. The limiting surfaces 41b and 41c each engage the linear guide projection 46c to prevent further rotation of the rear sub-lens group frame 46 at the rotational movement extremities thereof when the rear sub-lens group frame 46 is rotated in the forward and reverse directions. The rotation-limiting surfaces 41b and guide surfaces 41d together form wide-angle linear guide slots 41e, and the rotation-limiting surfaces 41c and guide surfaces 41f together form telephoto linear guide slots 41g. The linear guide projections 46c slidably fit into the guide slots 41e and 41g with a minimal tolerance therebetween.

The drive ring 47 has on the front end surface thereof three control recesses 47a that correspond to the respective three lugs 46d of the rear sub-lens group frame 46 (see FIGS. 31 and 34). Each of the control recesses 47a has a shape that is symmetrical with respect to the optical axis and includes a pair of effective surfaces 47b and 47c, each of which engages with the lugs 46d. The control recess 47a also includes a pair of telephoto and wide-angle focus leading surfaces 47d and 47e (focus cam surfaces) on the telephoto side and on the wide-angle side, respectively. The telephoto and wide-angle focus leading surfaces 47d and 47e each engage with the semicircular end surface of the lugs 46d. The telephoto focus leading surfaces 47d and the wide-angle focus leading surfaces 47e are defined by end cam surfaces having open ends between the effective surfaces 47b and 47c. The telephoto and wide-angel focus leading surfaces 47d and 47e are inclined with respect to the circumferential direction in opposite directions and at an equal inclination angle. The telephoto and wide-angle focus leading surfaces 47d and 47e of the drive ring 47 and the lugs 46d formed on the rear sub-lens group frame 46 constitute a focus cam mechanism.

The coil springs 51, which bias the front sub-lens group frame 45 rearward, cause the shift leading surfaces 45c of the front sub-lens group frame 45 to be always in contact with the follower projections 46a of the rear sub-lens group frame 46, and cause the lugs 46d of the rear sub-lens group frame 46 to be always in contact with the telephoto and wide-angle focus leading surfaces 47d and 47e. As described above, the drive ring 47 abuts at the rear end surface thereof against the aforementioned receiving surface of the rear support ring 42. As a result, the front sub-lens group frame 45, the rear sub-lens group frame 46, the drive ring 47, and the rear unit ring 42 can be held in contact by the spring force exerted by the spring 51. When these components are in engagement, the front end of the rear sub-lens group frame 46 is placed inside the front sub-lens group frame 45, and the drive ring 47 is situated on the outer periphery of the rear sub-lens group frame 46.

In the wide-angle region (W-region), the first sub-lens group S1 and the second sub-lens group S2 shift to a wide-angle mutually distant position in which the first sub-lens group S1 is relatively spaced apart from the second sub-lens group S2 along the optical axis, whereas in the telephoto region (T-region), they shift to a telephoto-side mutually close position in which the first sub-lens group S1 is relatively close to the second sub-lens group S2 along the optical axis.

Figure 35:
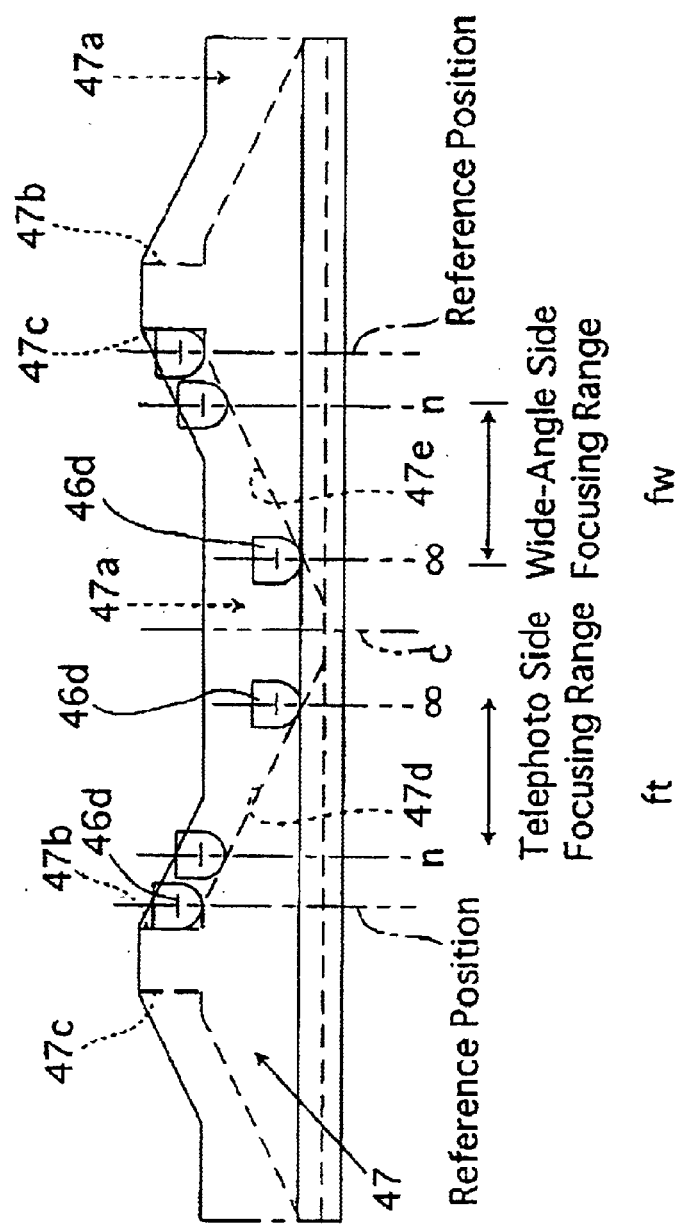
FIG. 35 is an explanatory view illustrating how focusing is carried out by the drive ring.

At the mutually distant position at the wide-angle side of the first sub-lens group S1 and the second sub-lens group S2, the effective surfaces 47b of the drive ring 47 abut against the lugs 46d, and the linear guide projections 46c of the rear sub-lens group frame 46 are disengaged from the wide-angle linear guide slots 41e (see FIGS. 34 and 35). As the drive ring 47 rotates in the direction to cause a shift to the telephoto mutually close position (moves rightward in FIGS. 34 and 35 (rotates clockwise)), the effective surface 47b press against the lugs 46d and rotate the rear sub-lens group frame 46 in the same direction, so that the linear guide projections 46c abut against the rotation-limiting surfaces 41c. During this movement, the front sub-lens group frame 45 (first sub-lens group S1) moves rearward with the leading surfaces 45c remaining in contact with the follower projections 46a and comes close to the rear sub-lens group frame 46 (second sub-lens group S2). Consequently, the follower-stabilizing recesses 45e engage with the follower projections 46a to stabilize the sub-lens group frames.

This completes the switching process from the mutually distant position on the wide-angle side to the mutually close position on the telephoto side, with the first sub-lens group S1 positioned close to the second sub-lens group S2 (mutually close extremity/close position for long focal length photographing). The drive ring 47 cannot rotate in this direction any further since the front unit ring 41 does not rotate.

When focusing is carried out in this state, in which switching process to the mutually close position on the telephoto side has been completed, the drive ring 47 rotates in the direction to cause a shift to the wide-angle close position. This in turn causes the lugs 46d (rear sub-lens group frame 46) to move rearward while following the telephoto focus leading surfaces 47d. As a result, the guide projections 46c engage with the telephoto linear guide slots 41g, which permits only linear movement along the optical axis. Focusing on the telephoto side, which covers from an intermediate focal length to a long focal length extremity (telephoto extremity), is carried out by moving the rear sub-lens group frame 46 and the front sub-lens group 45 integrally at the mutually close extremity via the telephoto focus leading surfaces 47d. Specifically, as shown in FIG. 35, when the drive ring 47 moves within the telephoto focusing range ft (which covers from the infinite photographing position _‡ to a closest photographing position n) with the lugs 46d of the rear sub-lens group frame 46 held in contact with the telephoto focus leading surfaces 47d, the rear sub-lens group frame 46, rotation of which is restricted by the linear guide projections 46c engaging with the telephoto linear guide slots 41g, and the front sub-lens group frame 45, rotation of which is restricted by the linear guide rod 48 engaging the guide bore 45b, and thus the first sub-lens group S1 and the second sub-lens group S2, together advance and retreat along the optical axis to perform focusing. When photographing is finished, the drive ring 47 is rotated in a direction to cause a shift to the telephoto mutually close position until the effective surface 47b engages with the lugs 46d.

When the drive ring 47 rotates in the direction for causing a shift to the wide-angle mutually distant position until the effective surface 47c engages with the lugs 46d, the linear guide projections 46c of the rear sub-lens group frame 46 disengage from the telephoto linear guide slots 41g. As the drive ring 47 rotates further in the direction for causing a shift to the wide-angle mutually distant position (counterclockwise direction), the effective surface 47c moves the lugs 46d to rotate the rear sub-lens group frame 46 in the same direction, and consequently, the linear guide projections 46c engage with the rotation-limiting surfaces 41b. During this movement, the front sub-lens group frame 45 advances as the follower projections 46a of the rear sub-lens group frame 46 slides against the leading surfaces 45c and moves away from the rear sub-lens group frame 46. Consequently, the follower-stabilizing recesses 45d engage the follower projections 46a to stabilize the sub-lens group frames. This completes the switching process from the mutually close position on the telephoto side to the mutually distant position on the wide-angle side, with the first sub-lens group S1 spaced apart from the second sub-lens group S2 (mutually distant extremity/mutually distant position for short focal length photographing). The drive ring 47 cannot rotate in this direction any further since the front unit ring 41 does not rotate.

When focusing is carried out in this state, in which switching process to the mutually distant position on the wide-angle side has been completed, the drive ring 47 rotates in the direction to cause a shift to the telephoto mutually close position. This in turn causes the lugs 46d (rear sub-lens group frame 46) to move rearward while following the wide-angle focus leading surface 47e. As a result, the linear guide projections 46c engage with the wide-angle linear guide slots 41e, which permit only linear movement along the optical axis. Focusing on the wide-angle side, from an intermediate focal length to a short focal length extremity, is carried out by moving the rear sub-lens group frame 46 and the front sub-lens group 45 integrally at the spaced-apart extremity by means of the wide-angle focus leading surface 47e. Specifically, as shown in FIG. 35, when the drive ring 47 moves within the wide-angle focusing range fw (from the infinite photographing position _‡ to the closest photographing position n) with the lugs 46d held in contact with the wide-angle focus leading surface 47e, the rear sub-lens group frame 46, rotation of which is restricted by the linear guide projections 46c engaging the wide-angle linear guide slots 41e, and the front sub-lens group frame 45, rotation of which is restricted by the linear guide rod 48 engaging the guide bore 45b, and thus the first sub-lens group S1 and the second sub-lens group S2, together advance and retreat along the optical axis to effect focusing.

When the drive ring 47 rotates in the direction to cause a shift to the telephoto mutually close position until the telephoto focus leading surfaces 47d engage with the lugs 46d, the linear guide projections 46c of the rear sub-lens group frame 46 disengage from the wide-angle linear guide slots 41e, and as a result, the sub-lens groups resumes the initial state.

As shown in FIG. 31, gear teeth 47f are formed on the entire circumference of the drive ring 47 at the rear end thereof. The gear teeth 47f engage a series of reduction gears 52, and the drive ring 47 is rotated in either direction by a bi-directional motor 53. The bi-directional motor 53 has a pinion provided on the front side of the front unit ring 41, and the gear teeth 47f of the drive ring 47 are located between the front unit ring 41 and the rear unit ring 42 provided at the rear end of the front unit ring 41. Accordingly, the series of the reduction gears 52 for transmitting the drive force from the pinion to the gear teeth 47f are sequentially arranged on the outside of the front unit ring 41 between the front unit ring 41 and the gear-holding ring 43 from the front of the front unit ring 41 to the rear.

As shown in FIG. 33, a rotary slit disk 54 is arranged in the vicinity of the pinion of the bi-directional motor 53 and serves as a component of an encoder for detecting the amount of rotation of the bi-directional motor 53. The rotary slit disk 54 is connected to the pinion via connection gears.

Figure 13:
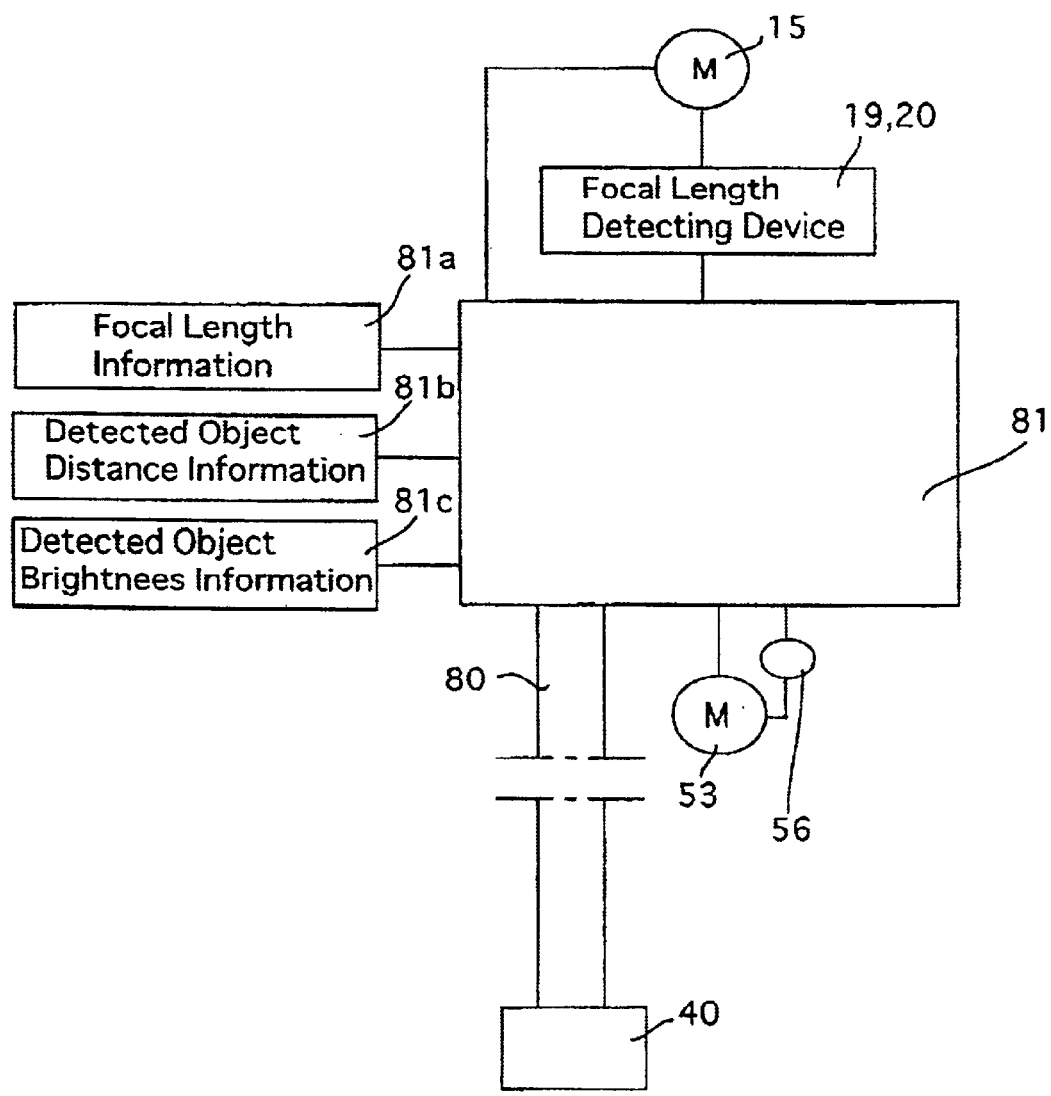
FIG. 13 is a block diagram showing a control system of the zoom lens barrel assembly, the overall structure of which is shown in FIGS. 2 through 4.

The rotary slit disk 54 serves as a photo-interrupter 56 (see FIG. 13) for detecting the amount of driving for switching and focusing and generates pulses as it is rotated and the slits are passed through the detection light. The pulses are counted by the control circuit 81 to detect the rotation angle (rotation amount) of the rotary slit disk 54, and hence the driving amount of the bi-directional motor 53.

As described above, by controlling the rotation of the drive ring 47, the front unit 40A of the shutter unit 40 serves to provide the movement of the first sub-lens group S1 and the second sub-lens group S2 toward or away from each other as they move between the mutually close position for short focal length photographing and the mutually close position for long focal length photographing, and to provide the focusing movement in which the entire first lens group L1 moves along the optical axis. Focusing on the telephoto side and on the wide-angle side is carried out by controlling the number of pulses generated by a pulser (i.e., photo-interrupter 56) in the drive system for driving the drive ring 47 with respect to the standard position where the linear guide projections 46c of the rear sub-lens group frame 46 come into engagement with the rotation-limiting surfaces 41b or the rotation-limiting surfaces 41c (or where rotation of the drive ring 47 is reversed). For example, the number of the pulses required for shifting the focusing lens group, i.e., the first lens group L1 including the first sub-lens group S1 and the second sub-lens group S2, from a reference position to the closest photographing position n, to the infinite photographing position _‡ and to any photographing position for focusing on an object at any distance can be determined by taking into account parameters such as the lead angles of the telephoto and wide-angle focus leading surfaces 47d and 47e. Accordingly, by controlling the pulse numbers, focusing can reliably be carried out depending on the information on the distance of the object.

Figure 2:
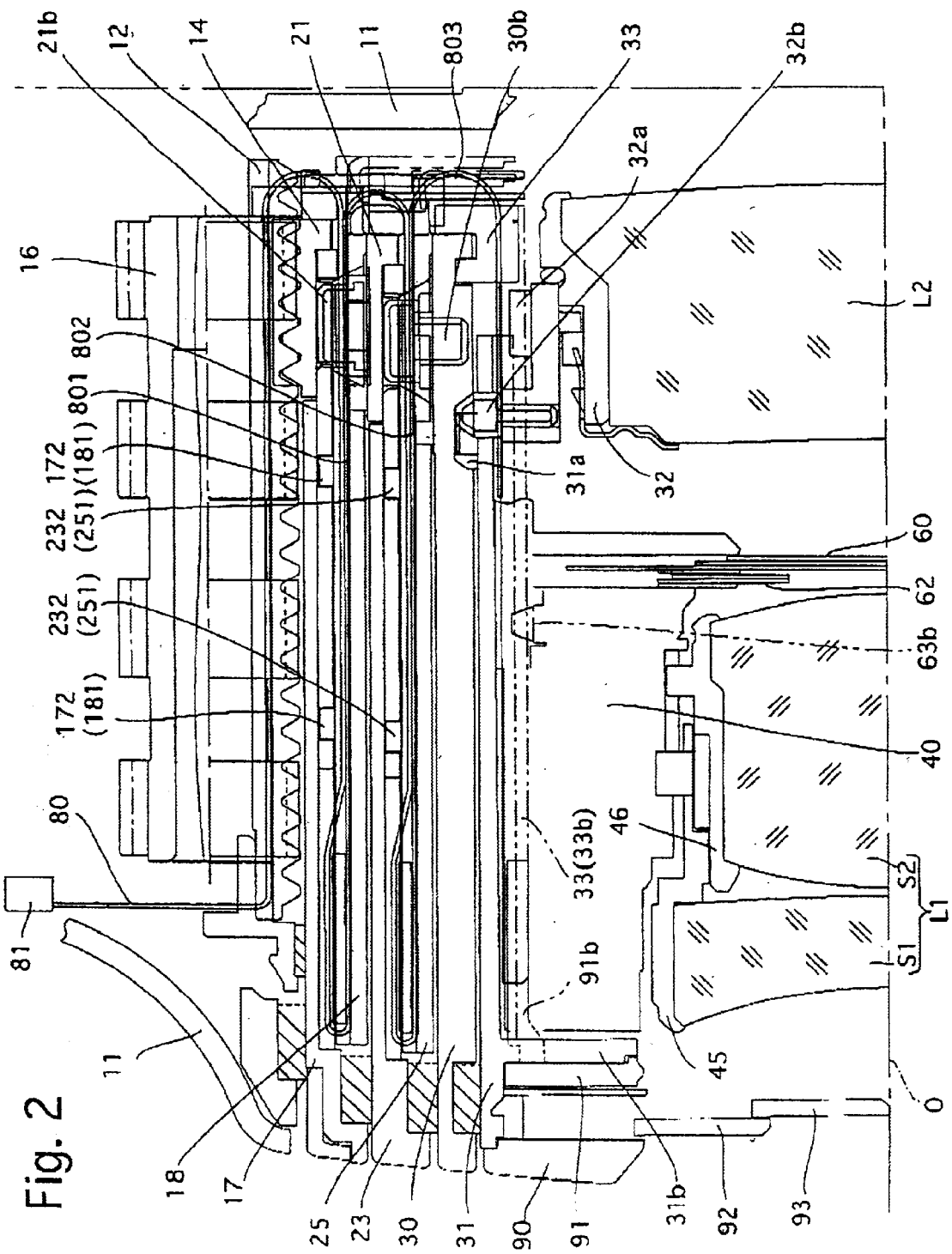
FIG. 2 is a cross-section showing an upper half of the zoom lens barrel assembly in a retracted state.
Figure 3:
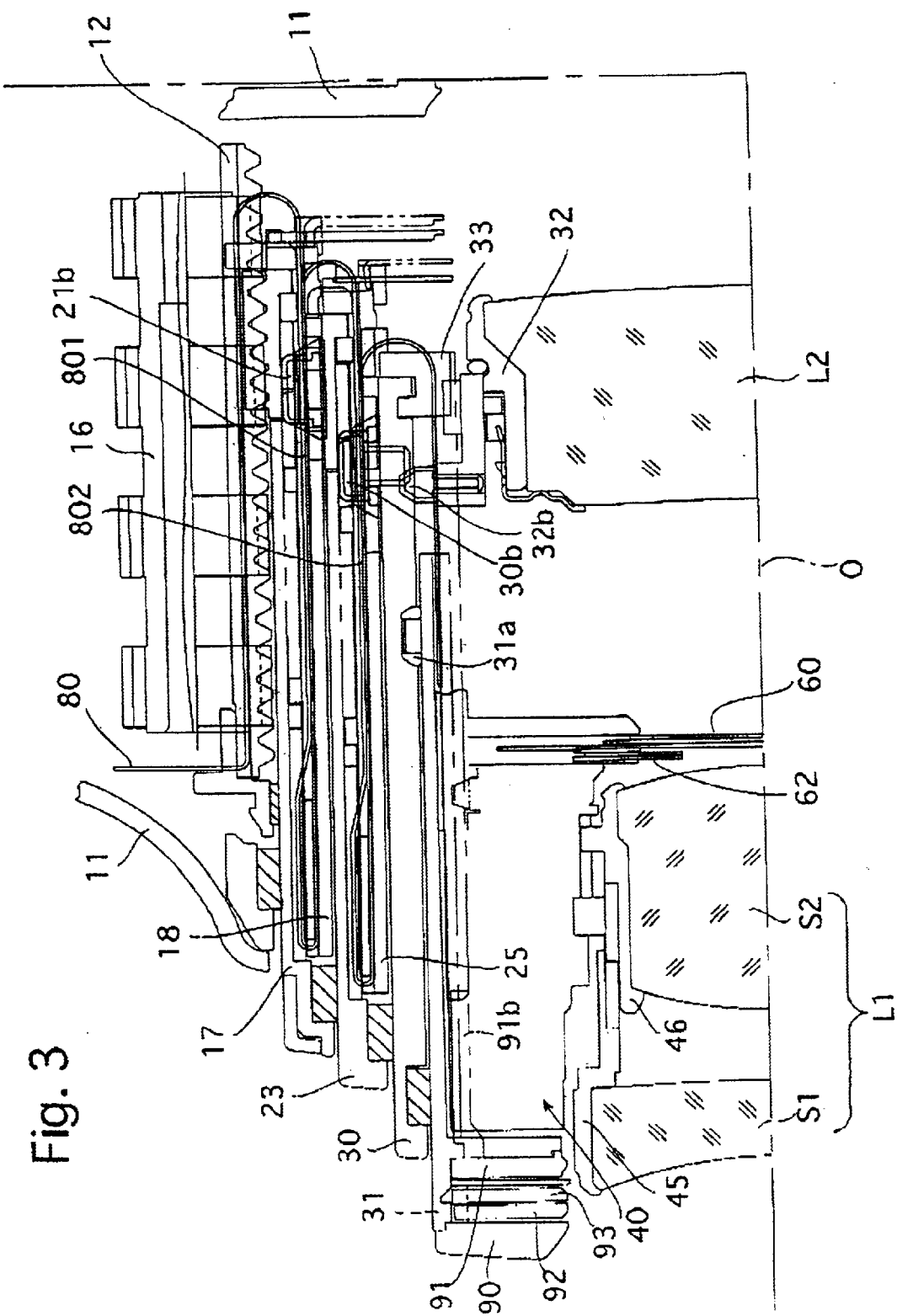
FIG. 3 is a cross-section showing the upper half of the zoom lens barrel assembly in a photographing position at the wide-angle extremity.

The shutter unit 40 is also provided behind the second sub-lens group S2 with a lens shutter device which includes shutter sectors 60, and a diaphragm mechanism which includes diaphragm sectors 62 (see FIGS. 2 and 3). In the zoom lens barrel of the present embodiment, the shutter sectors 60 are blades that serve both as a variable aperture to determine an f-number, and as a shutter. The shutter sectors 60 are electrically controlled by a control circuit 81 so that when the shutter is released, the degree of opening of the shutter sectors 60 (f-number) and time that the shutter sectors 60 remain open (shutter speed) vary depending on the exposure. On the other hand, the diaphragm sectors 62 are provided for the purpose of limiting the maximum aperture size especially during wide-angle photographing. The degree of opening of the diaphragm sectors 62 is mechanically varied depending on how far the entire zoom lens barrel needs to extend outward. In other words, the diaphragm sectors 62 limit the aperture size so that unwanted light is not collected during wide-angle photographing.

A diaphragm drive ring 63 for opening and closing the diaphragm sectors 62 includes on the periphery thereof a lug 63b, which engages with a diaphragm-controlling cam slot 71 formed on the inner periphery of the partial cylindrical arm member 33b of the third linear guide ring 33 (see FIG. 10). Upon zooming, the third linear guide ring 33 and the shutter unit 40 (diaphragm drive ring 63) move relative to each other along the optical axis. This causes the lug 63b to follow the diaphragm-controlling cam slot 71 and move in the circumferential direction. This in turn causes the diaphragm drive ring 63 to rotate and, as a result, the size of the aperture formed by the diaphragm sectors 62 is varied.

Figure 11:
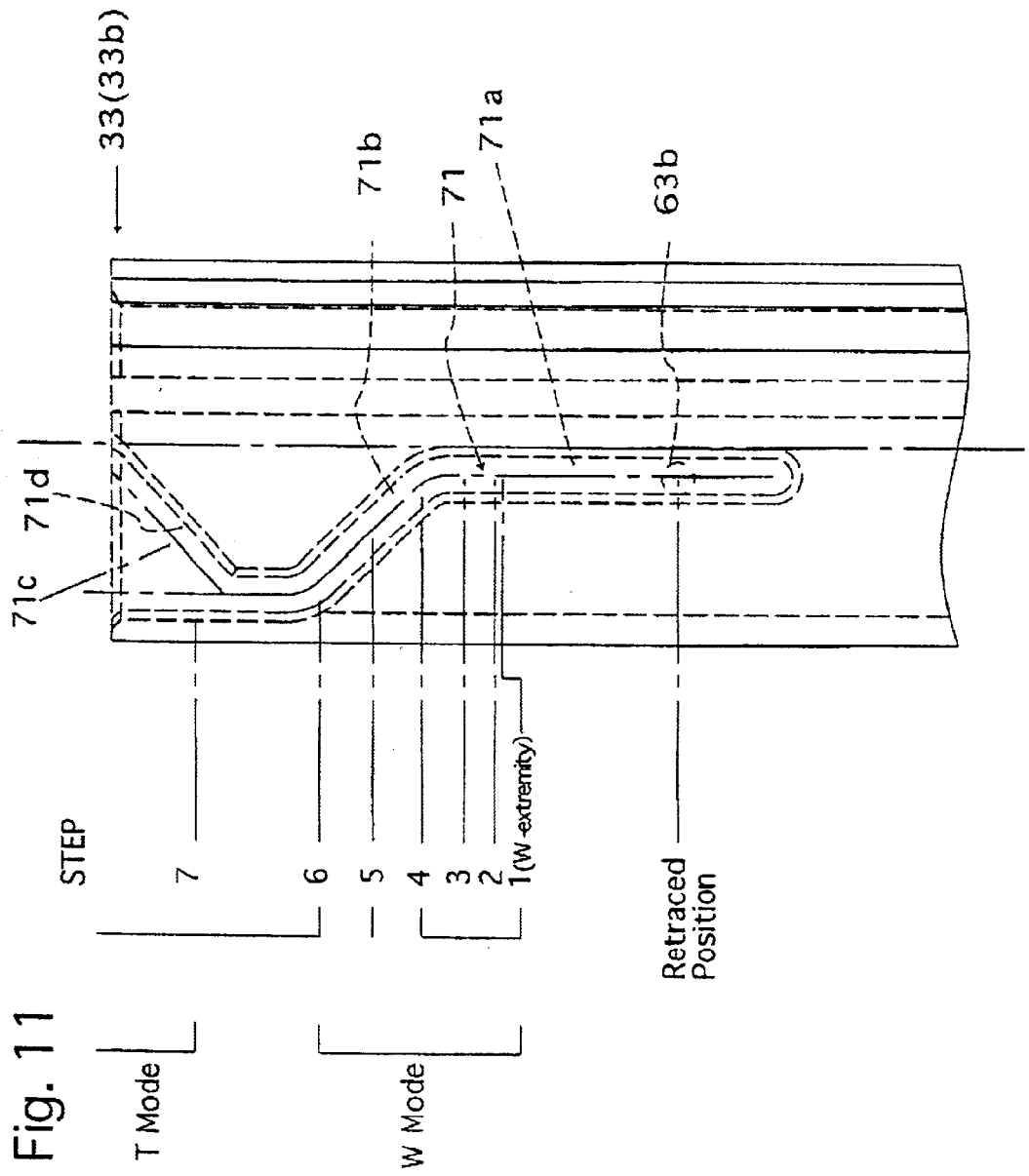
FIG. 11 is a developed view of the third linear guide ring showing a cam groove for adjusting a diaphragm.

As shown in FIG. 11, the diaphragm-controlling cam slot 71 includes a straight portion 71a extending parallel to the optical axis O, a sloped portion 71b sloped with respect to the optical axis O, and an opening portion 71c opening to the front of the third linear guide ring 33. The straight portion 71a and the sloped portion 71b each have substantially the same width as the lug 63b so that the lug 63b engages therewith with substantially no play.

Electric components of the shutter unit 40 are connected to the control circuit 81 (see FIG. 13) in the camera body via a flexible printed circuit board (FPC) 80. The positions of folds in the FPC 80 move depending on the change in the relative position of the shutter unit 40 with respect to the control circuit 81 as the zoom lens barrel advances and retreats. The FPC 80 is folded into a z-shape to avoid interference with the other components of the barrel and is inserted between the outer barrels.

In the present embodiment, the FPC 80 is folded on top of itself and forms overlapped portions 801 and 802 (see FIGS. 2 and 3). The overlapped portions 801 and 802 are inserted from the rear side of the zoom lens barrel assembly into a gap formed between the first outer barrel 17 and the first linear guide ring 18 and a gap formed between the second outer barrel 23 and the second linear guide ring 25, respectively. The portion of the FPC 80 that comes out from between the second outer barrel 23 and the second linear guide ring 25 extends across the third outer barrel 30 into the fourth outer barrel 31 and is connected to the shutter unit 40 at one end thereof.

The above-described zoom lens barrel assembly of the present invention operates in the following manner. Upon the zooming motor 15 driving the pinion 16, the first helicoid ring 14 and the first outer barrel 17 advance or retreat while rotating. The first linear guide ring 18 advances or retreats together with the first helicoid ring 14 and the first outer barrel 17 along the optical axis without rotating.

The second helicoid ring 21 and the second outer barrel 23, while rotating together at the same rotation speed with respect to the first outer barrel 17, advance or retreat relative to each other along the optical axis. The second linear guide ring 25 advances or retreats along the optical axis together with the second helicoid ring 21 and the second outer barrel 23 without rotating.

The third outer barrel 30 advances or retreats along the optical axis with respect to the second outer barrel 23, while rotating at the same rotation speed. The third linear guide ring 33 advances or retreats along the optical axis together with the third outer barrel 30 without rotating.

The fourth outer barrel 31 advances or retreats along the optical axis without rotating (The third outer barrel 30 rotates with respect to the fourth outer barrel 31).

As a result, the fourth outer barrel 31 (first lens group L1) and the rear lens group frame 32 (second lens group L2), each guided along the optical axis in the third outer barrel 30, move relative to each other along the optical axis on a predetermined path provided by the front lens group cam grooves 35 and the rear lens group cam grooves 36.

Figure 4:
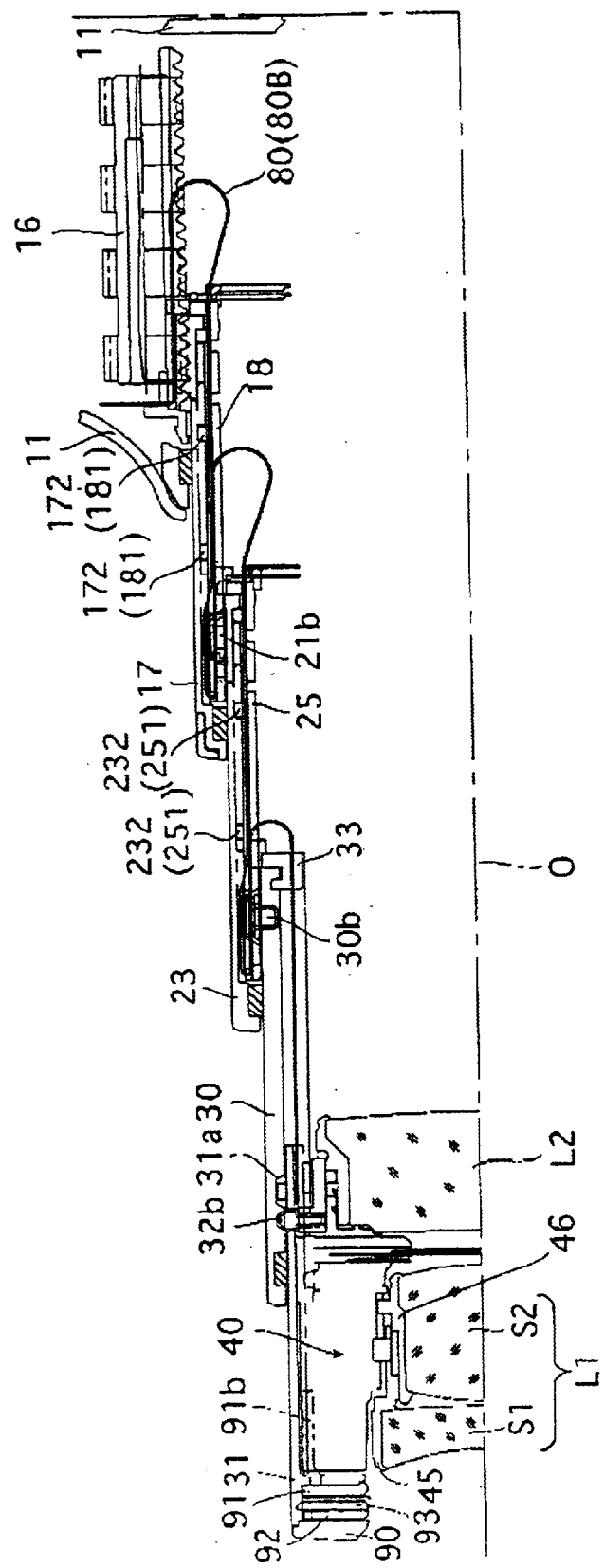
FIG. 4 is a cross-section showing the upper half of the zoom lens barrel assembly in a photographing position at the telephoto extremity.
Figure 5:
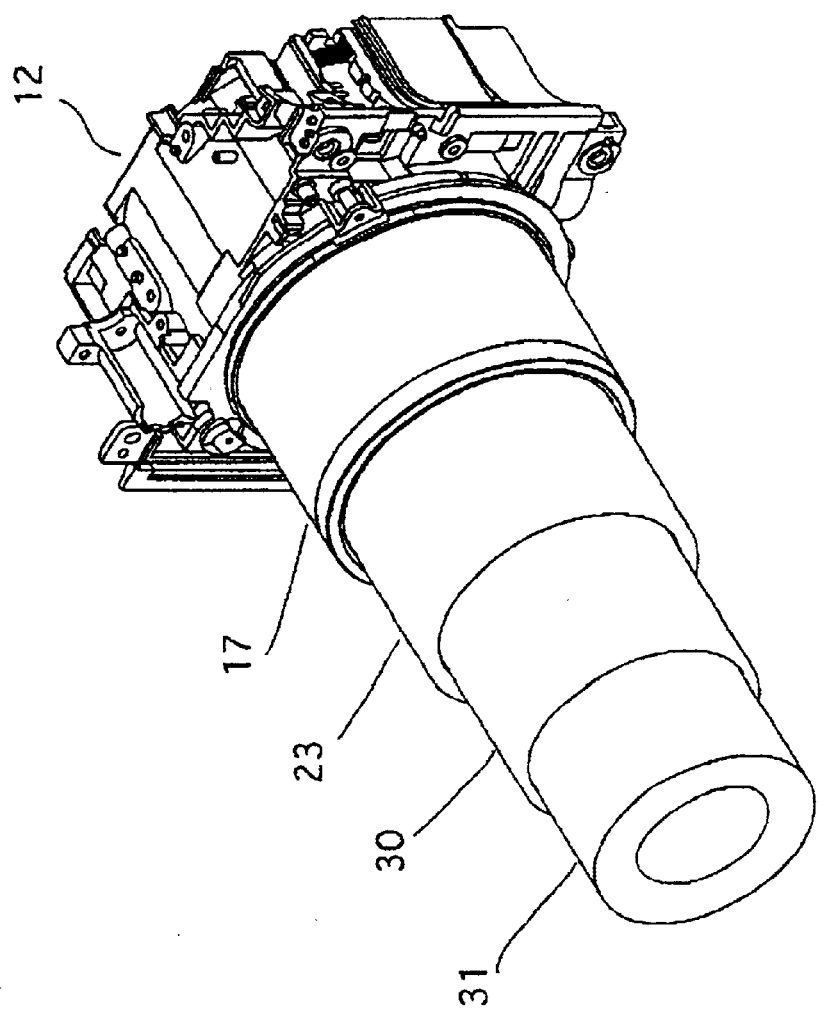
FIG. 5 is a perspective view showing the zoom lens barrel assembly in a fully extended position.

For example, in the retracted state of the zoom lens barrel assembly as shown in FIG. 2, the zoom lens barrels are substantially retracted into the camera body 11. When the zooming motor 15 is driven in the direction to extend the barrels, the zoom lens barrel assembly extends outward to assume the photographing position at the wide-angle extremity as shown in FIG. 3. By further driving the zooming motor 15 in the direction to extend the barrels, the zoom lens barrel assembly extends outward from the wide-angle photographing position to the photographing position at the telephoto extremity as shown in FIG. 4.

By driving the zooming motor 15 in the reverse direction to retreat the barrels, the zoom lens barrel assembly is made to retreat from the assembly/disassembly position, to the telephoto photographing position, then to the wide-angle photographing position, and then to the retracted position. In practice, zooming is controlled in a stepwise manner: several focal length steps are provided between the wide-angle extremity and the telephoto extremity, and the zooming motor 15 is stopped at each focal length step to perform focusing and exposure. As described above, the region assigned to the switching of the movement of the first sub-lens group S1 and the second sub-lens group S2 toward and away from each other is not used for photographing. For this reason, no step is provided in this region so that the third outer barrel 30 (thus, the zooming motor 15) does not come to a stop in this region.

Figure 14:
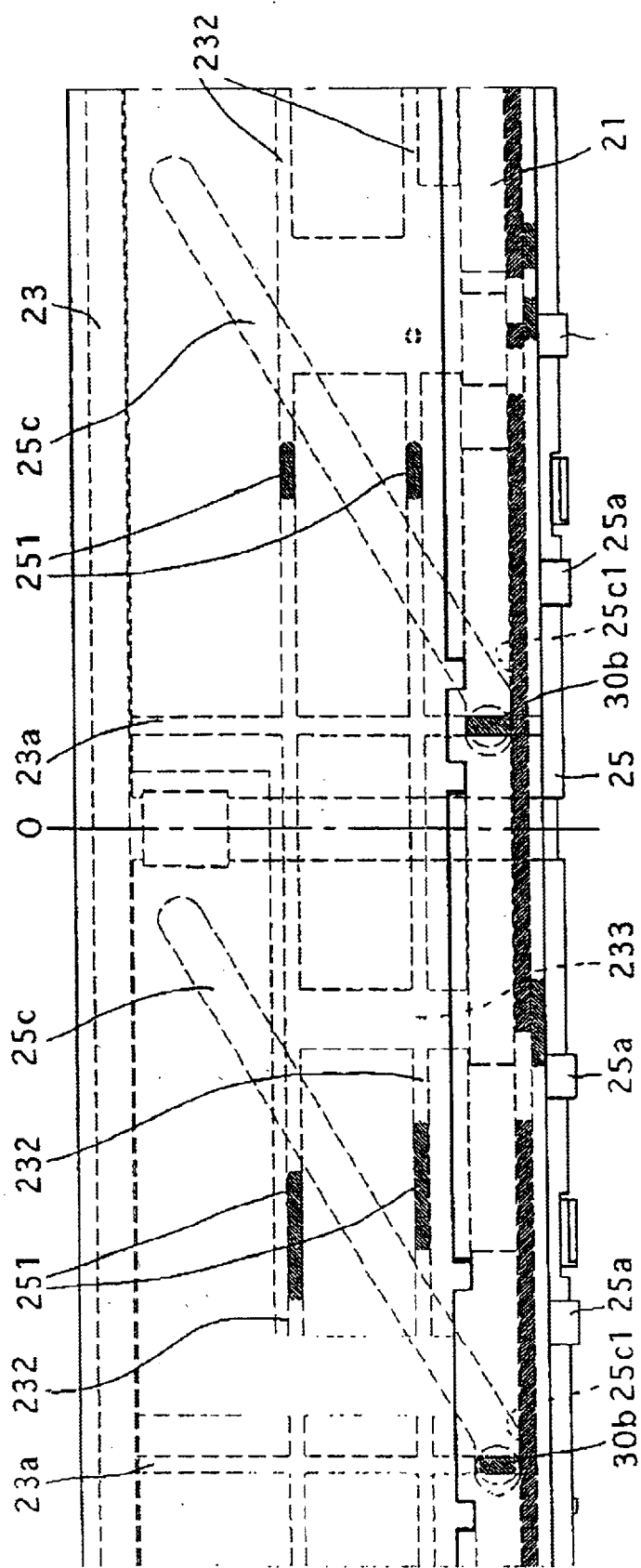
FIG. 14 is an explanatory developed view showing engagement of the second outer barrel, the second helicoid ring, the second linear guide ring and guide heads, in a retracted position of the zoom lens barrel assembly.

In FIG. 14, the second outer barrel 23, the second helicoid ring 21, the second linear guide ring 25 and the guide heads 30b in the retracted position are shown in a developed view as viewed from outside. In the retracted position, keys 251, which extend in the circumferential direction on the outer periphery of the second linear guide ring 25, engage with respective inner peripheral grooves 232, which extend circumferentially on the inner periphery of the second outer barrel 23, so that the second outer barrel 23 and the second helicoid ring 21 can rotate relative to each other and move together along the optical axis. A total of four keys 251 are provided on the outer circumference of the linear guide ring 25. Two keys 251 are provided at the same circumferential position spaced apart by a predetermined length along the optical axis, and the other two keys 251 are provided at a diametrically opposite circumferential position to the other keys 251 and are spaced apart by the same predetermined length along the optical axis as that of the other two keys 251. The guide heads 30b are each placed in a slip region 25c1 of the guide slot 25c.

The slip region 25c1 of the guide slot 25c serves as a slip section for allowing the third outer barrel 30 to rotatably slip. In other words, when the guide head 30b is in the slip region 25c1 and moves along the slip region 25c1, rotation of the third outer barrel 30 with respect to the second linear guide ring 25 does not cause relative movement between the third outer barrel 30 and the second linear guide ring 25 along the optical axis. The slip region 25c1 is provided in the section between the retracted position and the wide angle extremity position of the zoom lens barrel assembly.

Figure 15:
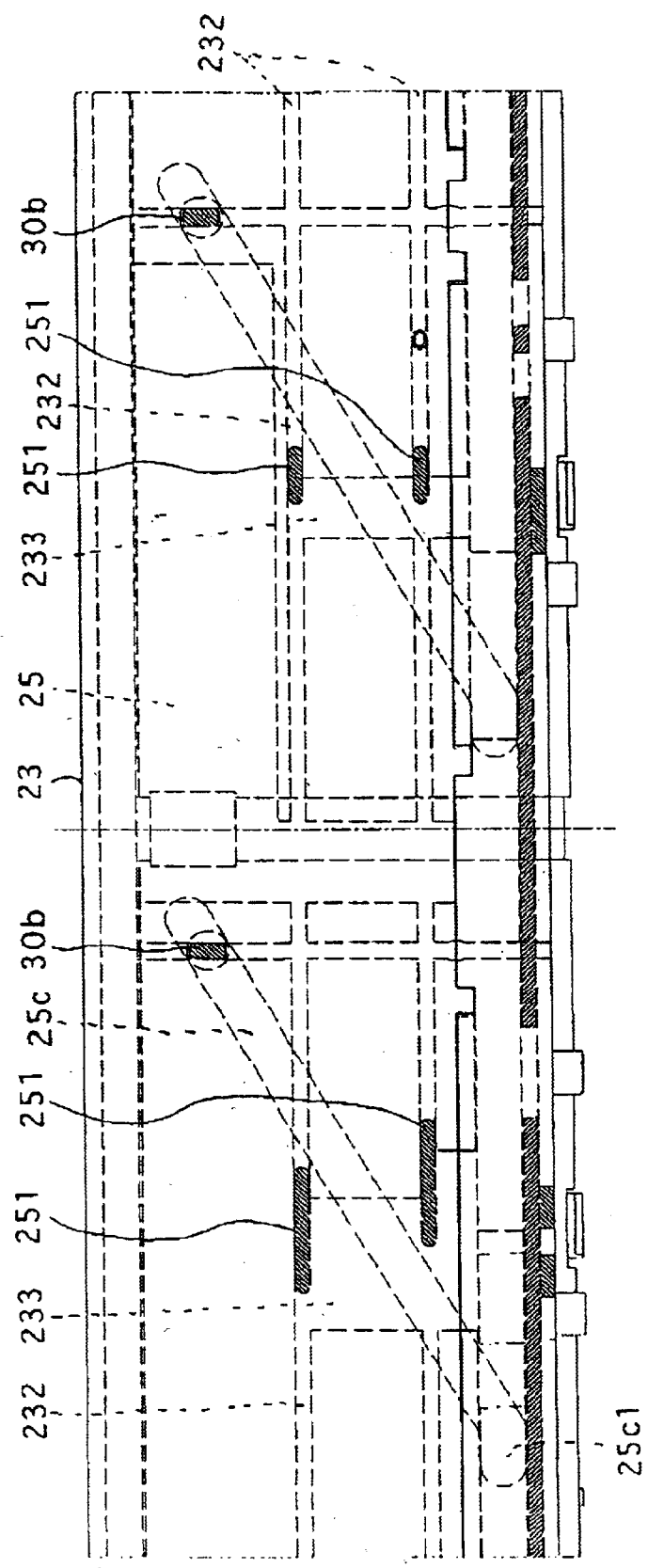
FIG. 15 is an explanatory developed view showing engagement of the second outer barrel, the second helicoid ring, the second linear guide ring and the guide heads, in a telephoto extremity position of the zoom lens barrel assembly.

By further driving the zooming motor 15 in the direction to extend the barrels, the zoom lens barrel assembly is brought into the telephoto extremity position. The second outer barrel 23, the second helicoid ring 21, the second linear guide ring 25 and the guide heads 30b in the telephoto extremity position are shown in FIG. 15 in a developed view similar to FIG. 14. In the telephoto extremity position, while a portion of each key 251 has come out from the circumferential groove 232 into a free space 233, a portion of each key 251 still remains in the circumferential groove 232. Accordingly, the second outer barrel 23 is prevented from moving with respect to the second linear guide ring 25 along the optical axis (thus, the second outer barrel 23 does not come off the second linear guide ring 25). In other words, the second outer barrel 23 and the second linear guide ring 25 can rotate relative to each other but advance or retreat together along the optical axis.

Figure 16:
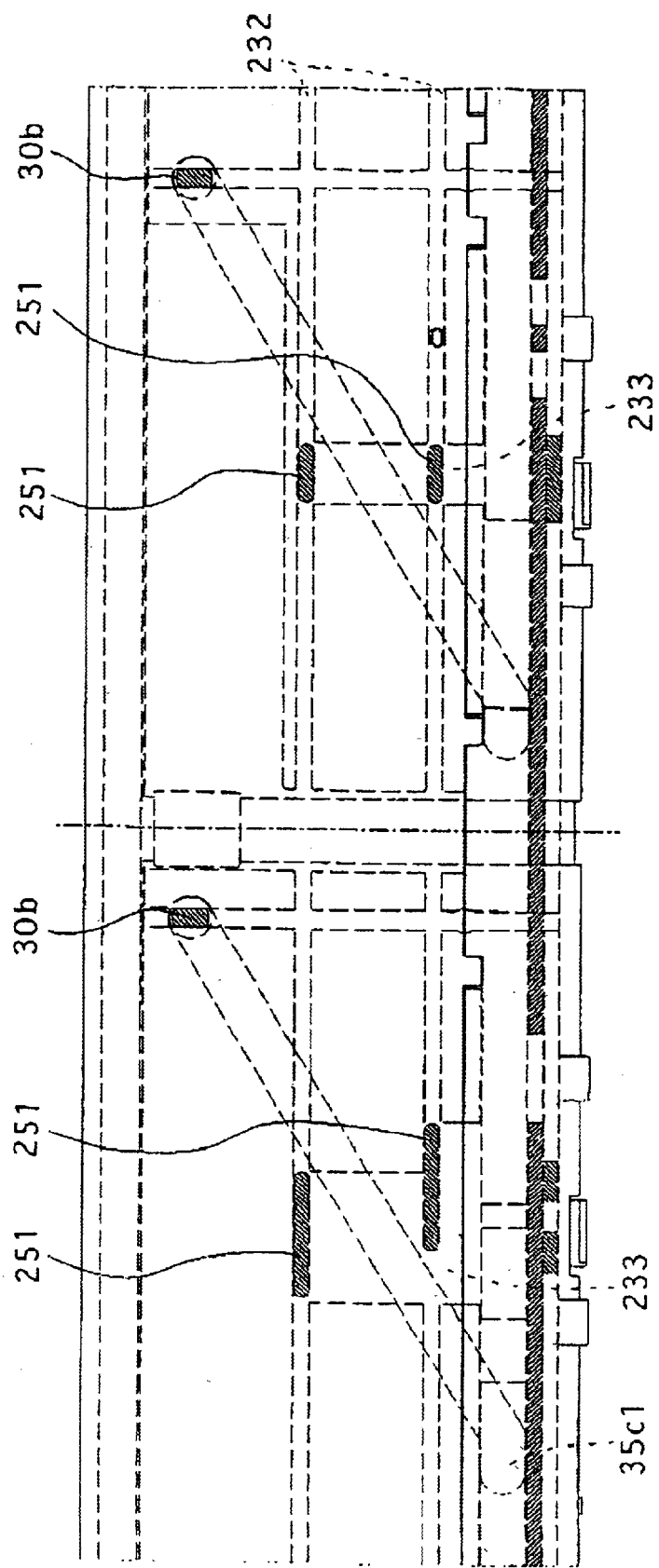
FIG. 16 is an explanatory developed view showing engagement of the second outer barrel, the second helicoid ring, the second linear guide ring and the guide heads, in an assembly/disassembly position of the zoom lens barrel assembly.
Figure 17:
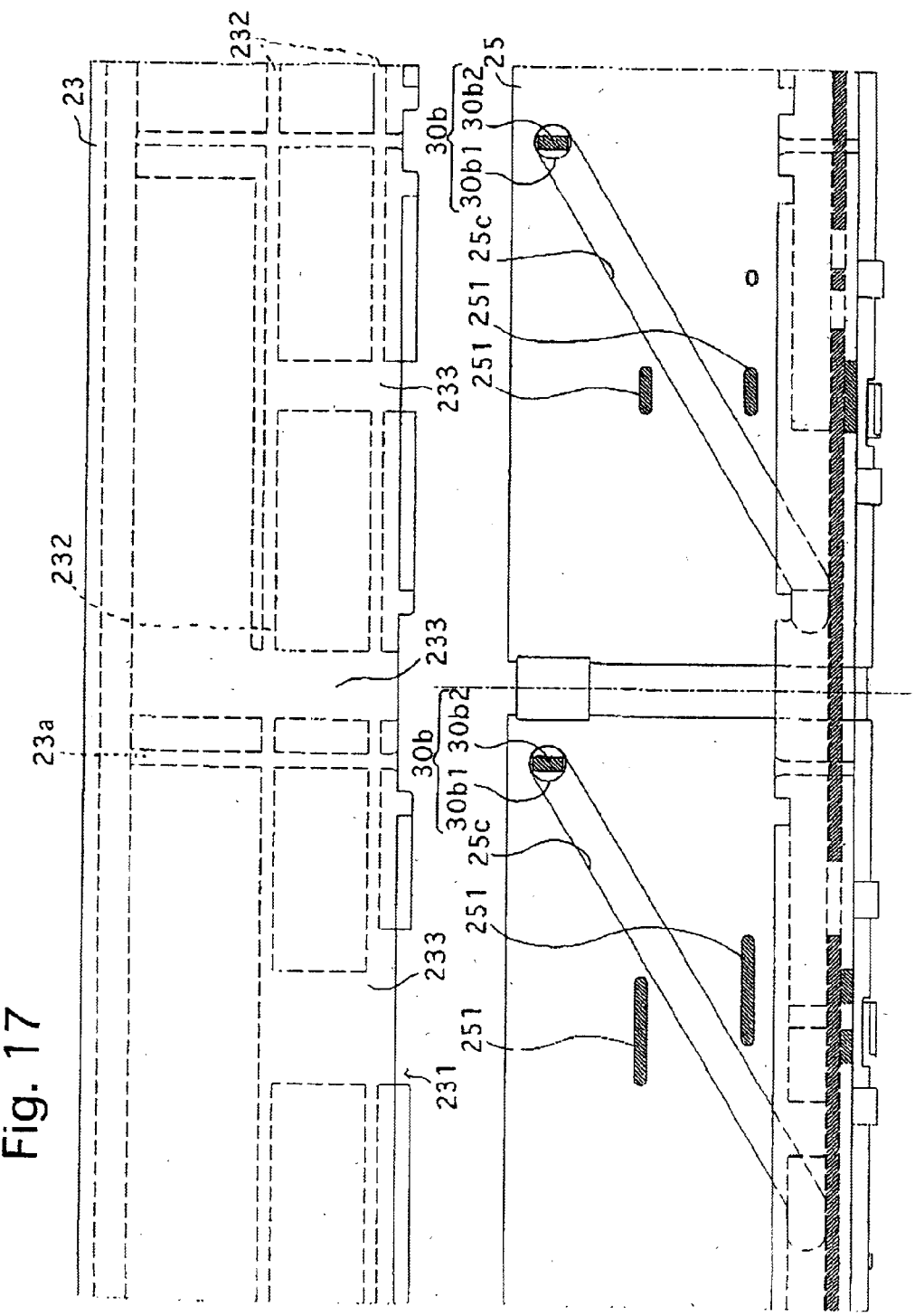
FIG. 17 is a developed view showing engagement of the second outer barrel, the second helicoid ring, the second linear guide ring and the guide heads, in the assembly/disassembly position of the zoom lens barrel assembly with the second outer barrel removed.

From the above-described telephoto extremity position, the zoom lens barrel assembly is brought into the assembly/disassembly position by removing the telephoto extremity stopper (not shown) and further driving the zooming motor 15 in the direction to extend the barrels. The second outer barrel 23, the second helicoid ring 21, the second linear guide ring 25 and the guide heads 30b in the assembly/disassembly position are shown in FIG. 16 in a developed view similar to FIG. 14. In the assembly/disassembly position, each key 251 has come out of the circumferential groove 232 and is entirely in the free space 233. Thus, in the assembly/disassembly position, the second outer barrel 23 can be moved with respect to the second linear guide ring 25 along the optical axis. In other words, the second outer barrel 23 can be removed from (see FIG. 17) or mounted back onto the second linear guide ring 25 (FIG. 16).

By pulling out the first and the second outer barrels 17 and 23 in the assembly/disassembly position, the guide heads 21b and 30b can be externally exposed (see FIG. 6). Once the guide heads 21b and 30b have been removed (see FIG. 7), the third outer barrel 30, the second helicoid ring 21, and the first helicoid ring 14 can be further rotated to extend further outward for removal by the action of the helicoids. Thus, the zoom lens barrel assembly can be disassembled when in the assembly/disassembly position.

The zoom lens barrel assembly of the present invention is integrated with the camera body and is constructed such that when the zoom lens barrel is assembled to allow the camera to take pictures, rotation of the zooming motor 15 is controlled to prevent the lens barrel assembly from extending out past the telephoto photographing position to the assembly/disassembly position. If the camera needs repairing, the zooming motor 15 can be made to operate to bring the zoom lens barrel assembly from the telephoto photographing position into the assembly/disassembly position by, for example, entering special commands.

In this embodiment, as with the second outer barrel 23 and the second linear guide ring 25, the first outer barrel 17 and the first linear guide ring 18 have circumferential grooves 172, free spaces 173, and keys 181. The first outer barrel 17 can be removed from, and mounted onto, the first linear guide ring 18 in the above-described assembly/disassembly position.

(Lens Barrier Mechanism)

A lens barrier mechanism for opening and closing the barrel opening in front of the first lens group L1 is arranged in the front portion of the fourth outer barrel 31. The lens barrier mechanism includes a cosmetic plate 90 secured to the front portion of the fourth outer barrel 31, a barrier drive ring 91, which is retained in a front wall 31b (see FIG. 2) of the fourth outer barrel 31 and can rotate about the optical axis O, a pair of outer barriers 92 and a pair of inner barriers 93, which are each rotatably supported between the barrier drive ring 91 and the cosmetic plate 90. The cosmetic plate 90 includes a projection (not shown) for rotatably supporting the outer barriers 92 and the inner barriers 93. The outer barriers 92 and the inner barriers 93 pivot about the projection and cooperate to open and close the opening of the cosmetic plate 90. A barrier biasing spring 94 biases each pair of the barriers 92 and 93 to close.

The barrier drive ring 91 includes a pair of barrier projections 91a arranged at diametrically opposite ends, and a lug arm 91b extending rearward in the optical axis direction. The barrier projections 91a engage with the outer barriers 92 or the inner barriers 93 to transmit rotation of the barrier drive ring 91 to the barriers 92 and 93. The lug arm 91b is inserted through a hole (not shown) formed in the front wall 31b arranged on the inner periphery of the front portion of the fourth outer barrel 31 into the fourth outer barrel 31. The lug arm 91b is shaped to slide against a guide slope 33e formed on the front end of the partial cylindrical arm member 33b of the third linear guide ring 33.

A drive ring biasing spring 95 biases the barrier drive ring 91 to rotate to open the barriers 92 and 93. The drive ring biasing spring 95 exerts a larger force than the barrier biasing spring 94. Thus, when the barrier drive ring 91 is free to rotate by the biasing force of the drive ring biasing spring 95, the biasing force of the drive ring biasing spring 95 is transmitted through the barrier drive ring 91, at transmitted to the barriers 92 and 93 via the barrier projection 91a, so that the barriers 92 and 93 are held open against the biasing force of the barrier biasing spring 94. When the zoom lens barrel assembly is in a photographing position between the wide-angle extremity as shown in FIG. 3 and the telephoto extremity as shown in FIG. 4, the lug arm 91b is not in contact with the guide slope 33e and the barrier drive ring 91 remains free, so that the barriers 92 and 93 are held open.

As the zoom lens barrel assembly shifts from the wide-angle extremity position as shown in FIGS. 3 and 32 to the retracted position as shown in FIGS. 2 and 31, the guide slope (barrier drive surface) 33e (see FIG. 9) of the third linear guide ring 33 comes into contact with the lug arm 91b of the barrier drive ring 91 and starts sliding against the lug arm 91b. As a result, the barrier drive ring 91 is forcibly rotated against the drive ring biasing spring 95 as it follows the guide slope 33e. This allows the barriers 92 and 93 to rotate and close. Since the barriers 92 and 93 are released from the restriction of the barrier drive ring 91 and are biased by the biasing force of the barrier biasing spring 94, each pair of the barriers 92 and 93 rotate to close and remain closed.

When the zoom lens barrel assembly shifts from the wide-angle extremity position to the retracted position, slip sections are utilized so that the third outer barrel 30 and the second outer barrel 23, and the second outer barrel 23 and the first outer barrel 17, rotate together and do not move relative to each other along the optical axis. In the present embodiment, before the entire zoom lens barrel assembly retreats to the retracted position, i.e., before the fourth outer barrel 31 retreats to the retracted position thereof with respect to the third outer barrel 30, the second outer barrel 23 retreats along the optical axis to the retracted position thereof with respect to the first outer barrel 17, and enters the slip section thereof (i.e., the slip region 25c1 of the second linear guide ring 25), and thereafter starts retreating while rotating together with the first outer barrel 17; subsequently, the third outer barrel 30 retreats along the optical axis to the retracted position thereof with respect to the second outer barrel 23 and enters the slip section thereof; and the third outer barrel 30, the second outer barrel 23, and the first outer barrel 17 start retreating toward the retracted position while rotating together. Accordingly, either at substantially the same time or after the guide slope 33e of the third linear guide ring 33 comes into contact with the lug arm 91b of the barrier drive ring 91 and starts sliding against the lug arm 91b, the second outer barrel 23 and then the third outer barrel 30 reach their respective slip sections. As a result, the fourth outer barrel 31 retreats due to the relative rotation of the fourth outer barrel 31 with respect to the third linear guide ring 33. Thus, the fourth outer barrel 31 and the third outer barrel 30, and thus the third linear guide ring 33, move along the optical axis relative to each other. This causes the barrier drive ring 91 to rotate to thereby close the barriers 92 and 93.

Conversely, when the zoom lens barrel assembly extends out from the retracted position to the wide-angle extremity position, the first, the second, and the third outer barrels 17, 23 and 30, respectively, extend out along the optical axis while rotating together. However, the second outer barrel 23 and the third outer barrel 30, when in each slip section thereof, extend out together with the first outer barrel 17 toward the wide-angle extremity while rotating together with the first outer barrel 17, whereas the fourth outer barrel 31 extends out toward the wide-angle extremity with respect to the third outer barrel 30 without relatively rotating. When the second outer barrel 23 and the third outer barrel 30 are in the slip sections thereof, the guide slope 33e of the third linear guide ring 33 moves away from the lug arm 91b so that the barrier drive ring 91, actuated by the biasing force of the drive ring biasing spring 95, rotates to open the barriers 92 and 93. As a result, the guide slope 33e moves away from the lug arm 91b and the barriers 92 and 93 are completely open before the zoom lens barrel assembly reaches the wide-angle extremity.

When the zoom lens barrel assembly extends out from the retracted position to the wide-angle extremity position, the third outer barrel 30 exits the slip section first. Thereafter, the third outer barrel 30 starts to extend with respect to the second outer barrel 23. Subsequently, the second outer barrel 23 exits the slip section thereof (i.e., the slip region 25c1 of the second linear guide ring 25), causing the second outer barrel 23 to start extending out with respect to the first outer barrel 17.

Figure 22:
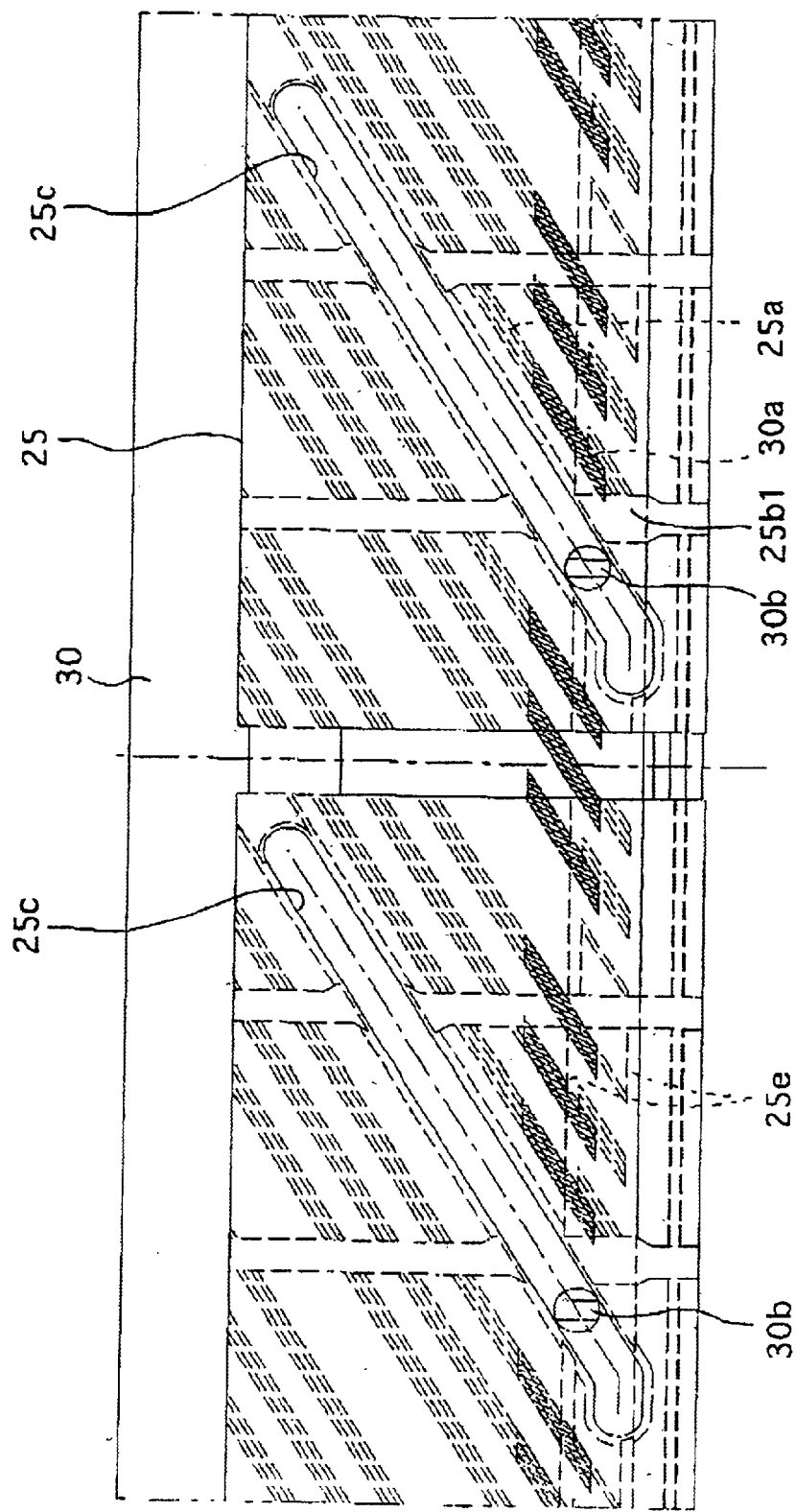
FIG. 22 is a developed view showing engagement of the female helicoids of the second linear guide ring with the male helicoids of the third outer barrel, when the zoom lens barrel assembly extends to a wide-extremity position.
Figure 23:
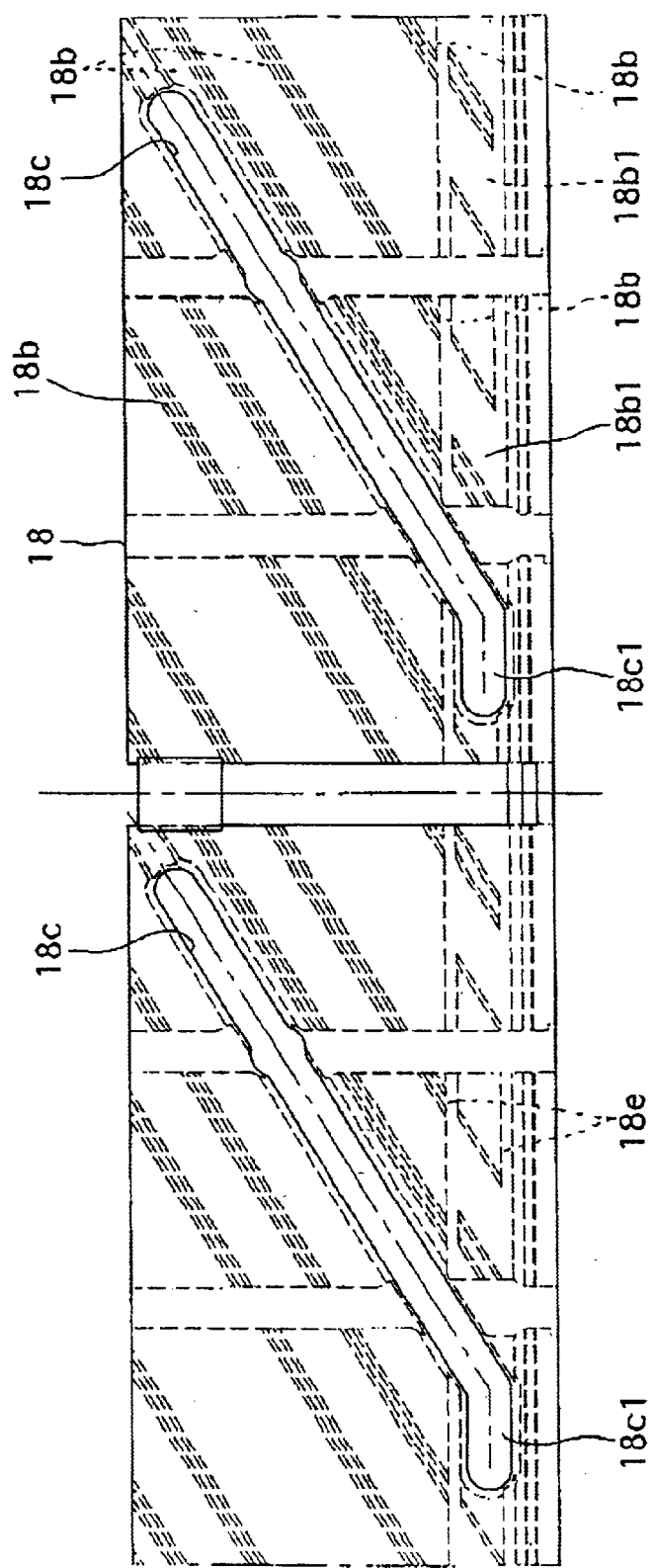
FIG. 23 is a developed view of the first linear guide ring of the zoom lens barrel assembly.
Figure 24:
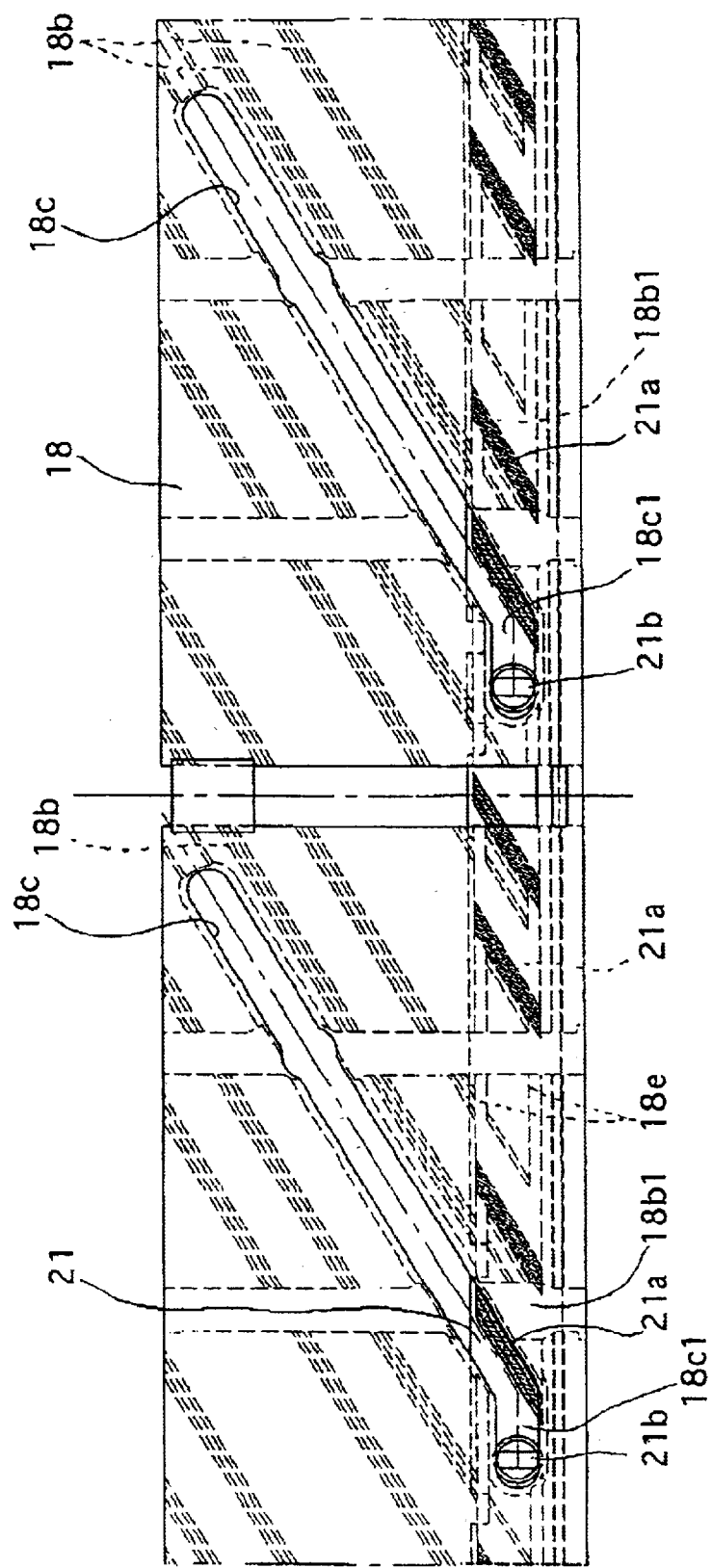
FIG. 24 is a developed view showing engagement of the first linear guide ring, the second outer barrel and the second helicoid ring, when the zoom lens barrel assembly is in the retracted position.
Figure 25:
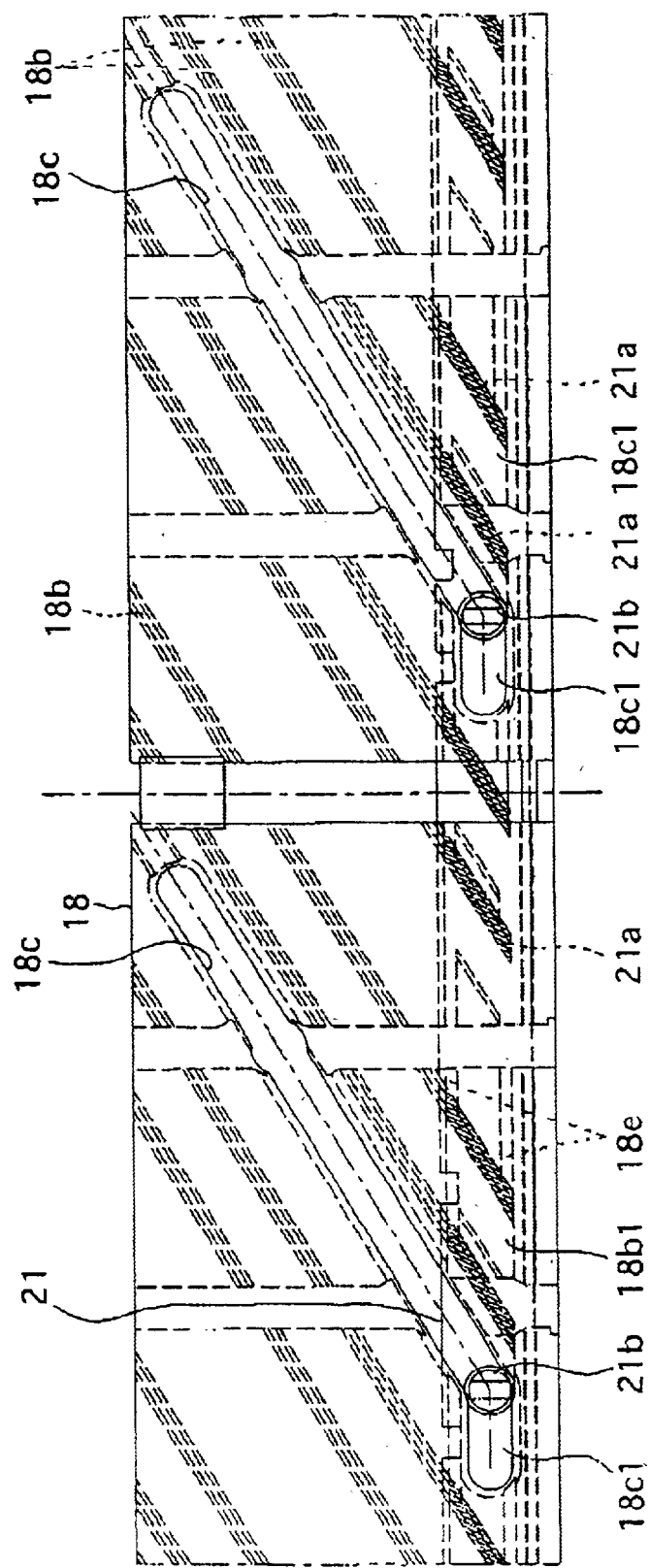
FIG. 25 is a developed view showing engagement of the first linear guide ring, the second outer barrel and the second helicoid ring, when the zoom lens barrel assembly is in the slip section boundary position.
Figure 26:
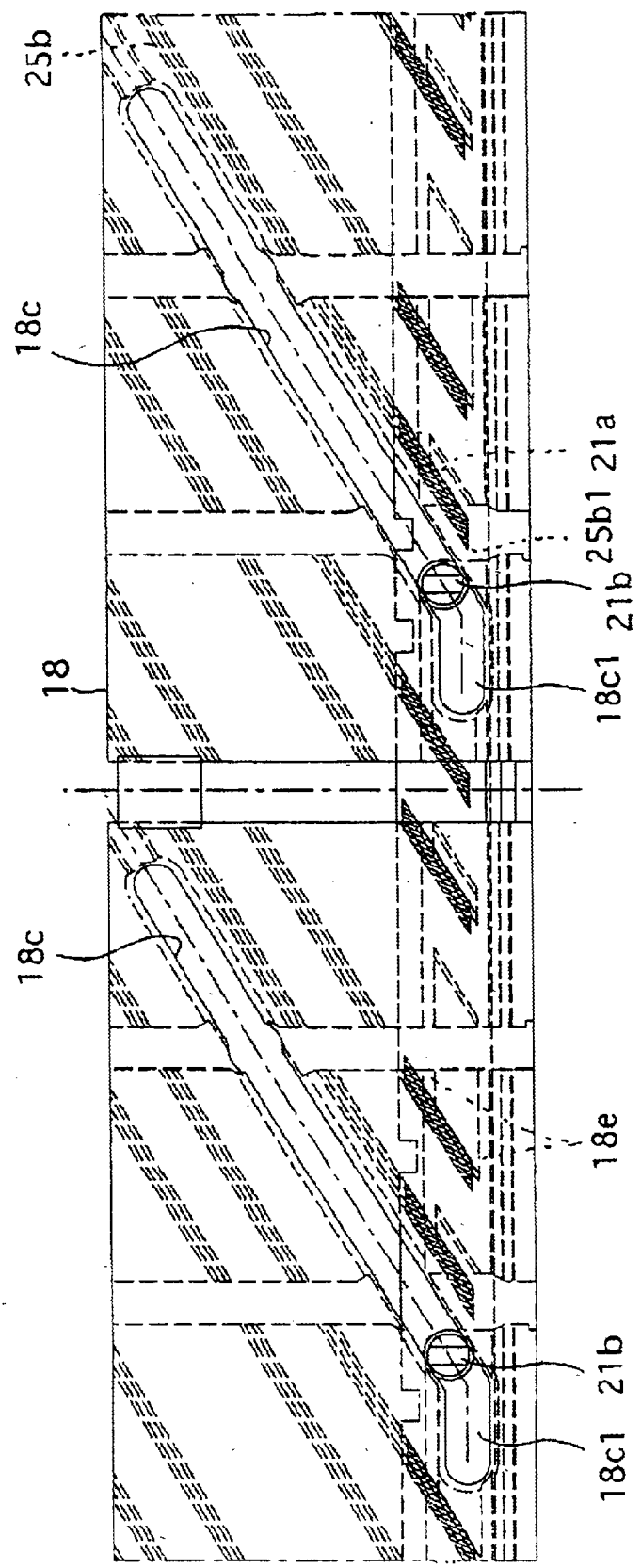
FIG. 26 is a developed view showing engagement of the first linear guide ring, the second outer barrel and the second helicoid ring, when the zoom lens barrel assembly is in the wide-angle extremity position.

Construction of the slip section of the helicoids will now be described with reference to FIGS. 18 through 27. FIG. 18A is a perspective view showing a longitudinal cross-section of the second linear guide ring 25. FIG. 18B is a perspective view showing a longitudinal cross-section of the first linear guide ring 18. FIG. 19 is a developed view of the second linear guide ring 25. Each of FIGS. 20 through 22 is a developed view showing a relationship between the second linear guide ring 25 and the third outer barrel (cam/helicoid ring) 30. FIG. 23 is a developed view of the first linear guide ring 18. Each of FIGS. 24 through 26 is a developed view showing a relationship between the first linear guide ring 18, the second outer barrel 23, and the second helicoid ring 21. Each of FIGS. 27A, 27B and 27C is an enlarged view showing the female helicoids 25b and helicoid slip sections 25b1 of the second linear guide ring 25, and the male helicoids 30a of the third outer barrel 30.

As shown in FIG. 19, the female helicoid 25b on the inner periphery of the second linear guide ring 25 includes a wide (in the circumferential direction) helicoid slip section 25b1 near the rear end (camera body side) of the second linear guide ring 25. The helicoid slip section 25b1 has substantially the same length as the male helicoid 30a of the third outer barrel 30 in the optical axis direction. Accordingly, as shown in FIG. 20, as the male helicoid 30a proceeds into the helicoid slip section 25b1, the male helicoids 30a and the female helicoids 25b are released from the confinement of the flanks thereof, so that the second linear guide ring 25 and the third outer barrel 30 can rotate relative to each other with the relative movement along the optical axis being prevented. The guide slot 25c also includes the slip section 25c1 to permit the rotation in the helicoid slip section 25b1.

Although the helicoid slip section 25b1 is designed to permit no movement of the male helicoid 30a along the optical axis, helicoid slip section 25b1 can be designed to permit a slight movement of the male helicoid 30a along the optical axis. Furthermore, the helicoid slip section 25b1 can include a thrust surface 25b2 (see FIG. 28A) and the front and the rear end surfaces of the male helicoid 30a may be configured as a flank surface to slide against the thrust surface 25b2.

When the zoom lens barrel assembly is in the retracted position, the male helicoids 30a for engaging the female helicoids 25b are located in the respective helicoid slip sections 25b1, and the guide heads 30b placed through the guide slots 25c are located in the respective slip sections 25c1 (see FIG. 20). As the zoom lens barrel assembly extends out from the retracted position toward the wide-angle extremity, the third outer barrel 30, the male helicoids 30a, and the guide heads 30b move with respect to the second linear guide ring 25 toward the wide-angle position (toward the right-hand side in FIGS. 20 through 22). With the male helicoids 30a confined in the respective helicoid slip sections 25b1, the third outer barrel 30 can only rotate with respect to the second linear guide ring 25, and the zoom lens barrel assembly proceeds to a position in which the male helicoids 30a are positioned at the boundaries of the slip sections (slip section boundary position)(see FIG. 21). When the zoom lens barrel assembly is in the slip section boundary position, the male helicoids 30a engage with the female helicoid 25b by their flanks.

As the zoom lens barrel assembly further extends out from the slip section boundary position toward the wide-angle extremity position, the third outer barrel 30, with the male helicoids 30a confined by the female helicoids 25b, moves forward with respect to the second linear guide ring 25 (toward the top of FIGS. 20 through 22) while rotating and being led by the female helicoids 25b. As a result, the zoom lens barrel assembly proceeds to the wide-angle extremity position (FIG. 22).

Although the male helicoids 30a are formed on the third outer barrel 30 and female helicoids 25b are formed on the second linear guide ring 25 in the present embodiment, male helicoids can be formed on the second linear guide ring 25 and female helicoids can be formed on the third outer barrel 30.

As with the second linear guide ring 25 and the third outer barrel 30, the first linear guide ring 18, the second outer barrel 23 and the second helicoid ring 21 include slip sections.

As shown in FIG. 23, the female helicoid 18b on the inner periphery of the first linear guide ring 18 has a wide (as viewed in the circumferential direction) helicoid slip section 18b1 near the rear end (camera body side) of the first linear guide ring 18. The helicoid slip section 18b1 has substantially the same length as the male helicoid 21a of the second helicoid ring 21 in the optical axis direction. Accordingly, as shown in FIG. 24, as the male helicoid 21a proceeds to the helicoid slip section 18b1, the male helicoids 21a and the female helicoids 18b are released from the confinement of the flanks thereof, so that the first linear guide ring 18 and the helicoid ring 21 (and thus the second outer barrel 23) can rotate relative to each other with the relative movement along the optical axis being prevented. The guide slot 18c also includes a slip section 18c1 which corresponds to the helicoid slip section 18b1 and has no lead angle.

When the zoom lens barrel assembly is in the retracted position, the male helicoids 21a for engaging with the female helicoids 18b are located in the respective helicoid slip sections 18b1, and the guide heads 21b placed through the guide slots 18c are located in the respective slip sections 18c1 (see FIG. 24 and FIG. 27A). As the zoom lens barrel assembly extends out from the retracted position toward the wide-angle extremity, the male helicoids 21a and the guide heads 21b, and thus the helicoid ring 21 and the second outer barrel 23, move with respect to the first linear guide ring 18 toward the wide-angle position (toward the right-hand side in FIGS. 24 through 26). During this relative movement, with the male helicoids 21a and the guide heads 21b located in the helicoid slip sections 18b1 and in the slip sections 18c1, respectively, the second outer barrel 23 and the second helicoid ring 21 can only rotate with respect to the first linear guide ring 18, and the zoom lens barrel assembly proceeds to a position in which the male helicoids 21a are positioned at the boundaries of the slip sections (slip section boundary position) (see FIG. 25 and FIG. 27B). When the zoom lens barrel assembly is in the slip section boundary position, the male helicoids 21a engage with the female helicoids 18b by their flanks.

As the zoom lens barrel assembly further extends out from the slip section boundary position toward the wide-angle extremity position, the second outer barrel 23 and the second helicoid ring 21, with the male helicoids 21a confined by the female helicoids 18b, move forward with respect to the first linear guide ring 18 (toward the top of FIGS. 24 through 26) and rotate while being led by the male helicoids 21a, the female helicoids 18b, and the guide slots 18c. As a result, the zoom lens barrel assembly proceeds to the wide-angle extremity position (shown in FIG. 26 and FIG. 27C).

In this embodiment, the third outer barrel 30 also has slip sections since the slipping of only the second outer barrel 23 is insufficient for the opening/closing of the barriers 92 and 93. For the third outer barrel 30, the slip sections are provided for the minimizing the amount of barrel advancement and adjusting the balance of barrel advancement.

Furthermore, in the present embodiment, the slip angle of the helicoid slip section 18b1 for slipping the second outer barrel 23 and the helicoid ring 21 is set to be larger than the slip angle of the helicoid slip section 25b1 for slipping the third outer barrel 30. If the third outer barrel 30 and the second outer barrel 23 simultaneously shift from the slip section to the helicoid section, the applied load increases significantly. This effect can be reduced by the above construction.

As described above, in the zoom lens barrel assembly of the present invention, the opening/closing of the barriers 92 and 93 are preformed by the slip motions of the third outer barrel 30, the second outer barrel 23 and the relative movement of the fourth outer barrel 31 along the optical axis. In the zoom lens barrel assembly of the present embodiment, the movement of the barrier drive ring 91 for closing and opening the barriers 92 and 93 is caused by two actions, namely, the stroke action of the fourth outer barrel 31 that takes place as the barrel assembly shifts between the retracted position and the wide-angle extremity position, and the slip action of the third outer barrel 30 and the second outer barrel 23 that takes place in the respective slip sections between the retracted position and the wide-angle extremity position. Accordingly to this construction, the long stroke length of the fourth outer barrel 31 is utilized.

Referring to FIG. 28A, a part of the female helicoids 18b of the first linear guide ring 18 is shown in an enlarged view in the vicinity of the helicoid slip sections 18b1. In general, the first linear guide ring 18 is made by injection-molding a plastic material. Accordingly, a mold is machined via electrospark machining. During the electrospark machining process, however, corners, such as those of the helicoid slip sections 18b1, are rounded (indicated by R in FIG. 28B). If the corners of the helicoid slip sections 18b1 are rounded, the length of each thrust surface 18b2 of the helicoid slip section 18b1 along the circumference of the barrel is reduced as well as the contact area with the male helicoid 21a. As a result, the surfaces interfere with the male helicoids 21a. Furthermore, if the corners of the helicoid slip sections 18b1 are rounded, the thrust surfaces 18b2 can no longer support the male helicoid 21a against the thrust force thereof with sufficient stability.

However, in the present embodiment, a circumferential groove 18e is formed along each of the front and the rear thrust surfaces 18b2 of the helicoid slip section 18b1, the surfaces being spaced apart from each other in the optical axis direction. As shown in FIG. 28C, this construction eliminates the problem of rounded corners. The circumferential groove 18e is formed to be wide enough (in the optical axis direction) to eliminate the rounded corners. Preferably, the width is substantially the same as the radius of curvature of the rounded corner that would otherwise be formed by electrospark machining.

In one embodiment, a circumferential groove 25e similar to the circumferential groove 18e of the first linear guide ring 18 is formed along each of the front and the rear thrust surfaces 25b2 of each of the helicoid-slip section 25b1 of the second linear guide ring 25.

Figure 29:
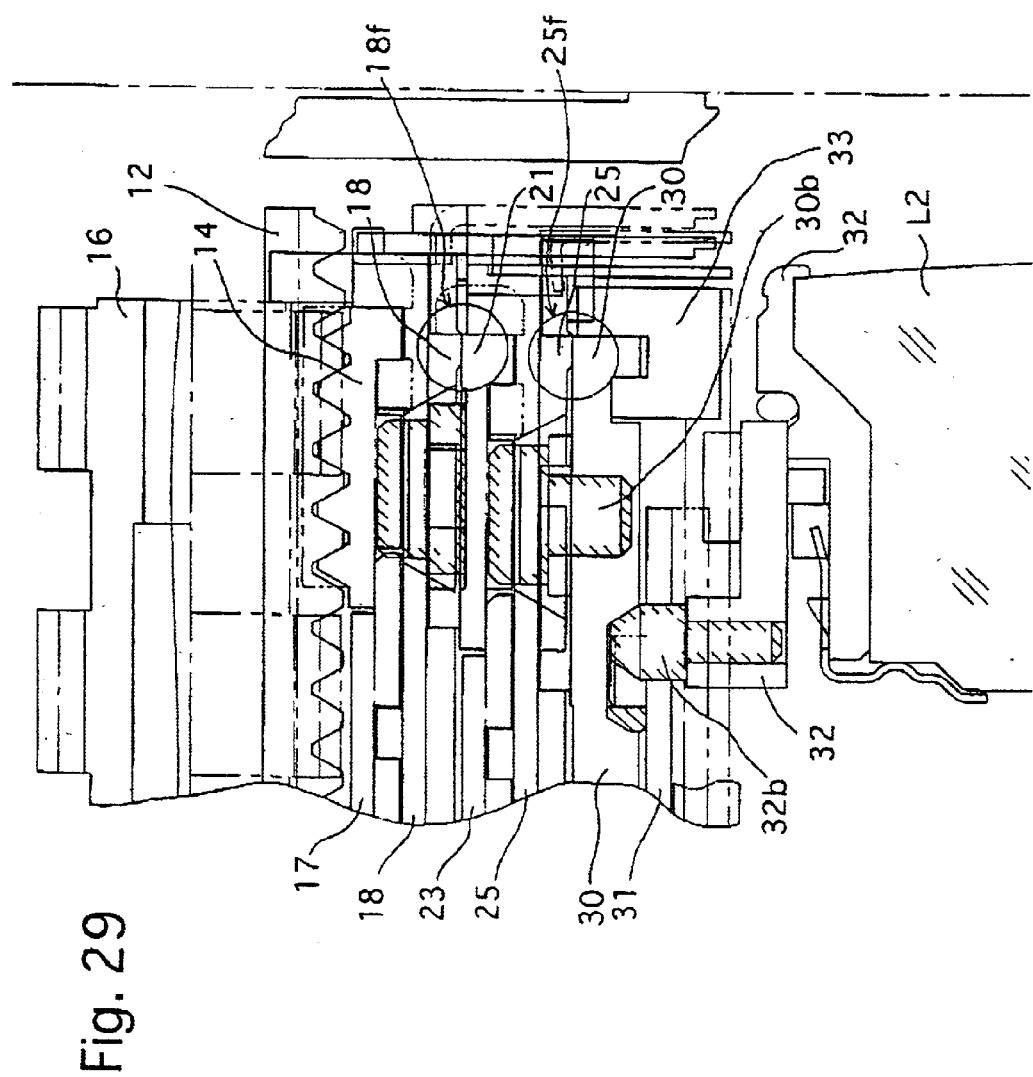
FIG. 29 is a cross-section of the upper half of the zoom lens barrel assembly in the retracted state, in which a circumferential flange is formed on the inner peripheral of the first linear guide ring and on the inner peripheral of the second linear guide ring, near the respective rear ends thereof.

When the male helicoids 21a proceed from the helicoid slip sections 18b1 into the female helicoids 18b, if the second helicoid ring 21 and the first linear guide ring 18 are not coaxially aligned or inclined with respect to each other, the end surfaces of the male helicoids 21a may catch on the thrust surfaces 18b2, preventing the male helicoids 21a from proceeding into the female helicoids 18b. In order to prevent such a problem, an embodiment of the present invention includes flanges (eccentricity-preventing members) 18f and 25f to eliminate eccentricity. The flanges 18f and 25f are formed on the inner peripheries of the first linear guide ring 18 and the second linear guide ring 25, respectively, near the rear ends of the respective guide rings (see FIGS. 18A and 18B). The radial flanges 18f and 25f slidably engage with, and close the end of, the second helicoid ring 21 and the third outer barrel 30, respectively, when the second helicoid ring 21 and the third outer barrel 30 are retreated to their respective retracted positions (see FIG. 29). In this state, the second helicoid ring 21 and the third outer barrel 30 rotate through the slip sections while sliding against the flanges 18f and 25f, respectively. In this manner, backlash between the second helicoid ring 21 and the third outer barrel 30 is prevented even when the rings are moving through the slip sections.

Figure 30:
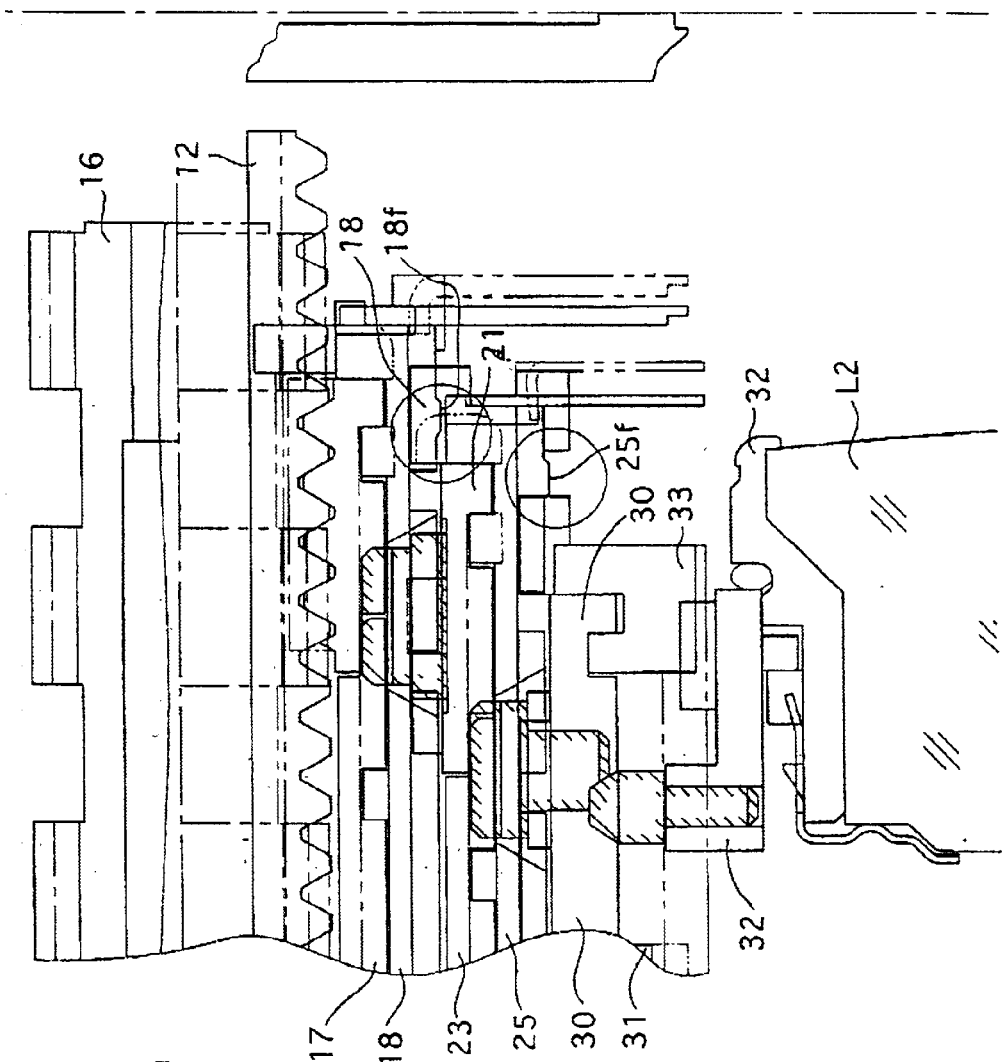
FIG. 30 is a cross-section of the upper half of the zoom lens barrel assembly in a photographing position at the wide-angle extremity, in which a circumferential flange is formed on the inner peripheral of the first linear guide ring and on the inner peripheral of the second linear guide ring, near the respective rear ends thereof.

With this construction, the radial positions of the male helicoids 21a and 30a are restricted by the flanges 18f and 25f, and as a result, the male helicoids 21a and 30a can proceed from the respective helicoid slip sections 18b1 and 25b1 into the respective female helicoids 18b and 25b in a smooth and reliable manner. Once the male helicoids 21a and 30a engage with the respective female helicoids 18b and 25b, the helicoid mechanism causes the second helicoid ring 21 and the third outer barrel 30 to advance or retreat between the wide-angle extremity position (FIG. 30) and the telephoto extremity position while rotating.

The zoom lens barrel assembly is constructed based upon a two-lens group optical system consisting of the first lens group L1 and the second lens group L2 and achieves variable focal lengths by switching the distance between the first sub-lens group S1 and the second sub-lens group S2 of the first lens group L1 retained in the shutter unit 40 between the short focal length range (i.e., wide-angle photographing range) and the long focal length range (i.e., telephoto photographing range). To achieve such a construction, the zoom paths that the first lens group L1 and the second lens group L2 follow during zooming include discontinuous switching ranges in the intermediate focal length range between the wide-angle photographing range and the telephoto photographing range (see FIGS. 36 and 37). As described above, the zooming motor 15, and thus, the first lens group L1 and the second lens group L2, do not come to a stop while the lens groups are moving in this switching range. Therefore, the switching range is not used for photographing pictures.

The shutter unit 40 is secured to the fourth outer barrel 31, the frontmost barrel of the lens barrel assembly. The first lens group L1 supported in the shutter unit 40 includes the first sub-lens group S1 retained in the rear sub-lens group frame 46, which during the switching process between the wide-angle photographing range and the telephoto photographing range moves toward or away from the second sub-lens group S2 retained in the shutter unit 40 via the front sub-lens group frame 45. Namely, the first lens group L1 and the second sub-lens group S2 move along the optical axis with the fourth outer barrel 31, except for when focusing is performed.

Figure 36:
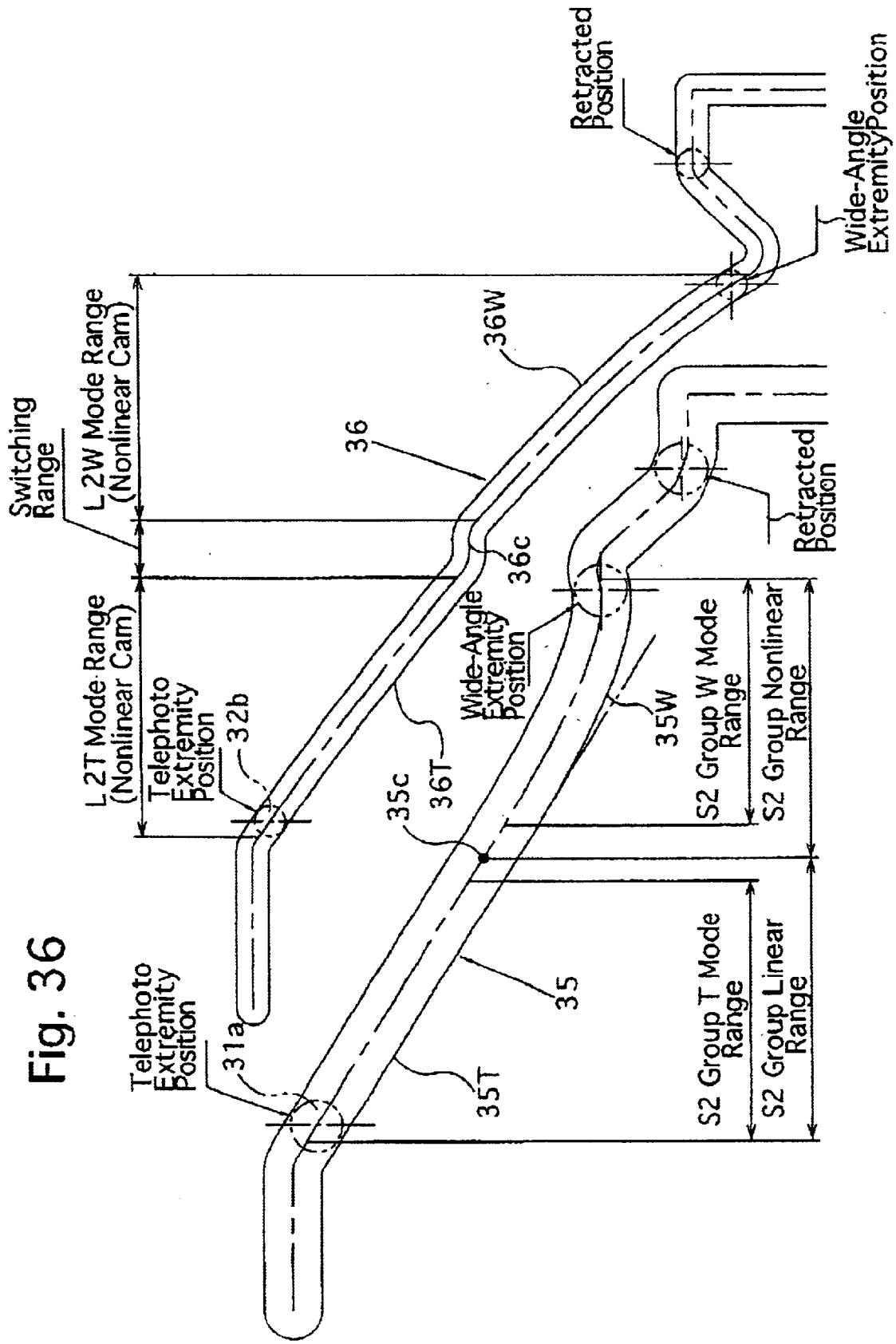
FIG. 36 is an expanded view of the inner surface of the cam ring showing an exemplary cam groove pattern of the cam ring.
Figure 37:
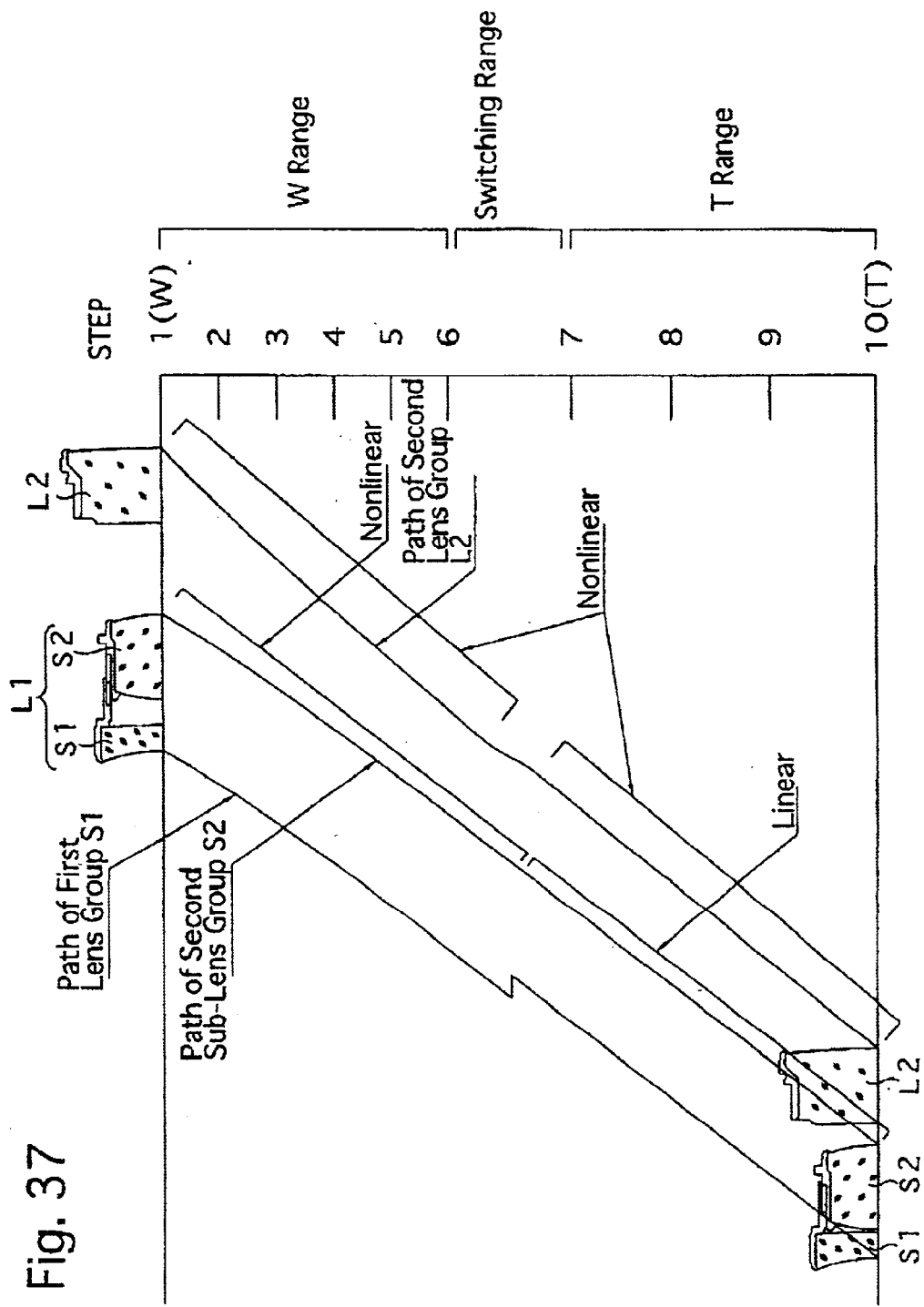
FIG. 37 is an explanatory diagram illustrating lens-group paths of the zoom lens barrel assembly having switching lens groups.

Thus, it is desirable to first determine the contour of the front lens group cam groove 35 based on the desired path of the second sub-lens group S2, and then the contour of the rear lens group cam groove 36 based on the path of the second lens group L2 that corresponds to the path of the second sub-lens group S2 (see FIG. 36). The contours of the front lens group cam groove 35 and the rear lens group cam groove 36 that ensure smooth movement of the first outer barrel 31 during zooming can be achieved. Since the zoom lens barrel assembly of the present embodiment relies upon the helicoid structure to extend the fourth outer barrel 31 and has largely variable focal lengths, the rear lens group cam groove 36 has considerably sharp curves (large leads) and a large tangential lead angle on the wide-angle side. As a result, the precision of the positions of the rear lens group may be decreased and the movement of the rear lens group may be affected.

To cope with this problem, a wide-angle range cam groove 35W of the front lens group cam groove 35 is formed to have a non-linear shape, so that the second sub-lens group S2 moves along the non-linear path in the wide-angle range. Accordingly, the rear lens group cam groove 36 can be made less susceptible to the above-described problem.

Since it is only the wide-angle range cam grooves 35W and 36W that cause the problem in the front and the rear lens group cam grooves 35 and 36 of the present zoom lens barrel assembly, it is desirable to construct the front lens group cam groove 35 for the second sub-lens group S2 in which only the wide-angle range cam groove 35W is non-linear and the telephoto range cam groove 35T is linear. The lead angle of the telephoto range cam groove 35T, which is linear, is set to be the same as the slope of a tangent of the non-linear wide-angle range cam groove 35W at the telephoto side (FIG. 36).

Accordingly, the wide-angle range cam groove 35W is smoothly connected to the telephoto range cam groove 35T, thereby ensuring smooth lens motion and smooth zooming action.

The construction of the present embodiment, in which the front lens group cam groove 35 for the second sub-lens group S2 includes the linear telephoto range cam groove 35T, facilitates the setting of the contour of the telephoto range cam groove 36T of the rear lens group cam groove 36 for the second lens group L2. Furthermore, a smooth zooming action is ensured since the telephoto range cam groove 35T has the same slope as the tangent of the wide-angle range cam groove 35W at the telephoto side.

Although in the embodiment of the present invention, the telephoto range cam groove 35T is aligned with the tangent of the wide-angle range cam groove 35W at the telephoto side, they can be substantially aligned with each other, or they may be substantially parallel to each other.

Although the present invention has been described with reference to one particular construction in which the first sub-lens group S1 moves toward or away from the second sub-lens group S2 in both of the short focal length photographing range and the long focal length photographing range, the present invention can also be applied to other constructions in which the second sub-lens group S2 is moved with respect to the first sub-lens group S1.

As can be understood from the above description, the present invention provides a zoom lens barrel assembly having a first lens group and a second lens group. The first lens group includes a first and a second sub-lens groups that can be moved toward or away from each other in a short focal length photographing range and in a long focal length photographing range. The zoom lens barrel assembly includes a rear lens group cam groove for moving the second lens group includes a first portion corresponding to the short focal length photographing range and a second portion corresponding to the long focal length photographing range and the two portions are connected by a discontinuous portion. Furthermore, a front lens group cam groove for moving the first lens group includes a non-linear portion that corresponds to the short focal length photographing range and provides a non-linear path and a linear portion that corresponds to the long focal length photographing range and provides a linear path. The linear portion is aligned with a tangent of the non-linear portion at an end of the non-linear portion that corresponds to the long focal length side of the short focal length photographing range. Accordingly, smooth movement of the first and the second lens groups along the optical axis and thus smooth zooming action of the zoom lens barrel assembly are ensured.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens barrel assembly having an optical axis comprising:
   a first lens group including a first sub-lens group and a second sub-lens group which move integrally during zooming;
   a second lens group, the first and the second lens groups moving relative to each other along the optical axis during zooming;
   a sub-lens group switching mechanism for moving one of said first and said second sub-lens groups away from the other of said first and second sub-lens groups in a short focal length photographing range and toward said other of said first and second sub-lens groups in a long focal length photographing range; and
   a zoom cam mechanism having a front lens group cam groove and a rear lens group cam groove for moving the first lens group and the second lens group toward and away from each other during zooming;
   wherein the rear lens group cam groove includes a first portion corresponding to the short focal length photographing range and a second portion corresponding to the long focal length photographing range, the first and the second portions connected to each other via a discontinuous portion; and
   wherein the front lens group cam groove includes a non-linear portion which corresponds to the short focal length photographing range and provides a non-linear path, and a linear portion which corresponds to the long focal length photographing range and provides a linear path.

2. The zoom lens barrel assembly according to claim 1, wherein said linear portion of said front lens group cam groove is aligned with a tangent of the non-linear portion at an end of the non-linear portion which corresponds to the long focal length side of the short focal length photographing range.

3. The zoom lens barrel assembly according to claim 2, wherein a lead angle of said linear portion of said front lens group cam groove extends parallel to the slope of a tangent of said non-linear portion of said front lens group cam groove.

4. The zoom lens barrel assembly according to claim 1, wherein the discontinuous portion of the rear lens group cam groove is constructed so that the first portion causes the second lens group to move toward the first lens group and the second portion causes the second lens group to move away from the first lens group.

5. The zoom lens barrel assembly according to claim 1, wherein said discontinuous portion of said rear lens group cam groove corresponds to an intermediate focal length photographing range which lies between said short focal length photographing range and said long focal length photographing range, wherein the discontinuous portion is not used in a photographing operation.

6. The zoom lens barrel assembly according to claim 1, wherein the zoom lens barrel assembly comprises a multi-stage-extension zoom lens barrel assembly which extends and retreats between a first position and a second position, said first position and said second position corresponding to a short focal length extremity and a long focal length extremity, respectively;
   wherein said multi-stage-extension zoom lens barrel assembly extends out from the most retracted position thereof by a predetermined amount to said first position and extends to a maximum position to corresponding to said second position, said discontinuous portion of the rear lens group cam groove corresponding to an intermediate focal length photographing range which lies between the short focal length photographing range and the long focal length photographing range and is not used in a photographing operation.

7. The zoom lens barrel assembly according to claim 1, wherein said sub-lens group switching mechanism is mounted on a shutter unit secured to a frontmost barrel of said zoom lens barrel assembly, wherein said sub-lens group switching mechanism moves the first sub-lens group away from the second sub-lens group in the short focal length photographing range to bring said first and second sub-lens groups into a mutually distant position on the short focal length side, and wherein the sub-lens group switching mechanism moves the first sub-lens group toward the second sub-lens group on the long focal length photographing range to bring said first and second sub-lens groups into a mutually close position on the long focal length side.

8. The zoom lens barrel assembly according to claim 7, wherein the sub-lens group switching mechanism includes a first lens frame and a second lens frame supporting the first sub-lens group and the second sub-lens group, respectively, and a lens frame shift mechanism for moving the first and the second lens frames toward and away from each other along the optical axis and moving the lens frames integrally along the optical axis according to a rotation of a bi-directional motor mounted on the shutter unit.

9. The zoom lens barrel assembly according to claim 8, wherein the shutter unit is secured to the frontmost barrel of the zoom lens barrel assembly;

wherein the frontmost barrel advances and retreats along the optical axis without rotating while following the front lens group cam groove of the zoom cam mechanism; and wherein the second lens group is supported in the rear lens group frame, which advances and retreats along the optical axis without rotating while following the rear lens group cam groove of the zoom cam mechanism.

* * * * *